US012153737B2

(12) United States Patent
Ramani et al.

(10) Patent No.: US 12,153,737 B2
(45) Date of Patent: Nov. 26, 2024

(54) SYSTEM AND METHOD FOR AUTHORING FREEHAND INTERACTIVE AUGMENTED REALITY APPLICATIONS

(71) Applicant: Purdue Research Foundation, West Lafayette, IN (US)

(72) Inventors: Karthik Ramani, West Lafayette, IN (US); Tianyi Wang, West Lafayette, IN (US); Xun Qian, West Lafayette, IN (US); Fengming He, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 85 days.

(21) Appl. No.: 17/814,965

(22) Filed: Jul. 26, 2022

(65) Prior Publication Data
US 2023/0038709 A1  Feb. 9, 2023

Related U.S. Application Data

(60) Provisional application No. 63/226,367, filed on Jul. 28, 2021.

(51) Int. Cl.
G06F 3/01 (2006.01)
G06T 13/20 (2011.01)
G06T 19/00 (2011.01)

(52) U.S. Cl.
CPC .............. *G06F 3/017* (2013.01); *G06F 3/011* (2013.01); *G06T 13/20* (2013.01); *G06T 19/006* (2013.01); *G06T 2200/24* (2013.01)

(58) Field of Classification Search
CPC .......... G06F 3/017; G06F 3/011; G06F 3/013; G06F 3/0304; G06F 3/04842;
(Continued)

(56) References Cited

U.S. PATENT DOCUMENTS 6,842,175 B1 * 1/2005 Schmalstieg ........... G06F 3/011
  345/427
8,436,821 B1 * 5/2013 Plichta ................. G06F 3/04883
  345/173
(Continued)

OTHER PUBLICATIONS

Chen et al., Disambiguation Techniques for Freehand Object Manipulations in Virtual Reality, 2020, IEEE, pp. 285-292 (Year: 2020).*
(Continued)

*Primary Examiner* — Motilewa Good-Johnson
(74) *Attorney, Agent, or Firm* — Maginot, Moore & Beck LLP

(57) ABSTRACT

An augmented reality (AR) application authoring system is disclosed. The AR application authoring system enables the real-time creation of freehand interactive AR applications with freehand inputs. The AR application authoring system enables intuitive authoring of customized freehand gesture inputs through embodied demonstration while using the surrounding environment as a contextual reference. A visual programming interface is provided with which users can define freehand interactions by matching the freehand gestures with reactions of virtual AR assets. Thus, users can create personalized freehand interactions through simple trigger-action programming logic. Further, with the support of a real-time hand gesture detection algorithm, users can seamlessly test and iterate on the authored AR experience.

20 Claims, 36 Drawing Sheets

(58) Field of Classification Search
CPC ... G06F 3/04845; G06T 13/20; G06T 19/006; G06T 2200/24; G06T 2219/2008; G06T 2219/2021; G06T 19/20; G06T 13/00

See application file for complete search history.

(56) References Cited

U.S. PATENT DOCUMENTS

| | | | | |
|---|---|---|---|---|
| 9,218,064 | B1* | 12/2015 | Li | G06F 3/0488 |
| 9,256,282 | B2* | 2/2016 | Latta | G06F 3/011 |
| 9,383,895 | B1* | 7/2016 | Vinayak | G06F 3/04883 |
| 9,400,559 | B2* | 7/2016 | Latta | G06F 3/017 |
| 9,734,393 | B2* | 8/2017 | Wang | G06V 40/28 |
| 9,983,686 | B2* | 5/2018 | Horowitz | G06T 19/006 |
| 10,529,145 | B2* | 1/2020 | Gortler | G06T 19/20 |
| 11,087,561 | B2* | 8/2021 | Fu | G06T 19/006 |
| 11,099,633 | B2* | 8/2021 | Kritzler | G02B 27/017 |
| 11,145,135 | B1* | 10/2021 | Ng | G06F 3/017 |
| 11,182,685 | B2* | 11/2021 | Holz | G06N 5/04 |
| 11,285,674 | B1* | 3/2022 | Douglas | B29C 64/386 |
| 11,347,054 | B2* | 5/2022 | Woods | G06T 19/006 |
| 11,409,364 | B2* | 8/2022 | Zhou | G06F 3/0304 |
| 11,543,933 | B2* | 1/2023 | Piya | G06F 3/011 |
| 11,804,040 | B2* | 10/2023 | Hampali | G06N 3/0464 |
| 11,854,308 | B1* | 12/2023 | Marsden | G06V 10/764 |
| 11,875,012 | B2* | 1/2024 | Benson | G06V 10/82 |
| 2005/0210417 | A1* | 9/2005 | Marvit | G06F 1/1613 715/863 |
| 2010/0241998 | A1* | 9/2010 | Latta | G06F 3/011 715/862 |
| 2010/0302138 | A1* | 12/2010 | Poot | G06F 3/017 348/143 |
| 2011/0173204 | A1* | 7/2011 | Murillo | A63F 13/213 715/863 |
| 2013/0042296 | A1* | 2/2013 | Hastings | G06Q 50/184 726/1 |
| 2018/0129869 | A1* | 5/2018 | Yu | G06V 40/172 |
| 2019/0094981 | A1* | 3/2019 | Bradski | H04N 21/414 |
| 2019/0362562 | A1* | 11/2019 | Benson | G06F 3/0304 |
| 2020/0120110 | A1* | 4/2020 | Stokes, III | H04L 63/1416 |
| 2021/0312715 | A1* | 10/2021 | Ramani | G06F 8/34 |
| 2023/0079335 | A1* | 3/2023 | Sawhney | G06V 40/28 382/103 |
| 2023/0401568 | A1* | 12/2023 | Jain | G06Q 20/3674 |
| 2024/0168602 | A1* | 5/2024 | Benson | G06V 10/82 |

OTHER PUBLICATIONS

Wang et al., GesturAR: An Authoring System for Creating Freehand Interactive Augmented Reality Applications, 2021, ACM, pp. 552-567 (Year: 2021).*

Yingjiang Li, Jianhong Sun, and Rui Li. 2016. Human Action Recognition Based on Dynamic Time Warping and Movement Trajectory. International Journal of Simulation—Systems, Science & Technology 17, 46 (2016).

Henry Lieberman, Fabio Paternò, Markus Klann, and Volker Wulf. 2006. End-user development: An emerging paradigm. In End user development. Springer, 1-8.

Hao Lü and Yang Li. 2012. Gesture coder: a tool for programming multi-touch gestures by demonstration. In Proceedings of the SIGCHI Conference on Human Factors in Computing Systems, 2875-2884.

Hao Lü and Yang Li. 2013. Gesture studio: Authoring multi-touch interactions through demonstration and declaration. In Proceedings of the SIGCHI Conference on Human Factors in Computing Systems. 257-266.

Zhihan Lv, Alaa Halawani, Shengzhong Feng, Shafiq Ur Rehman, and Haibo Li. 2015. Touch-less interactive augmented reality game on vision-based wearable device. Personal and Ubiquitous Computing 19, 3 (2015), 551-567.

Chunyong Ma, Shengsheng Zhang, Anni Wang, Yongyang Qi, and Ge Chen. 2020. Skeleton-based dynamic hand gesture recognition using an enhanced network with one-shot learning. Applied Sciences 10, 11 (2020), 3680.

Atsushi Matsubayashi, Yasutoshi Makino, and Hiroyuki Shinoda. 2019. Direct finger manipulation of 3d object image with ultrasound haptic feedback. In Proceedings of the 2019 CHI Conference on Human Factors in Computing Systems. 1-11.

Daniel Mendes, Fernando Fonseca, Bruno Araujo, Alfredo Ferreira, and Joaquim Jorge. 2014. Mid-air interactions above stereoscopic interactive tables. In 2014 IEEE Symposium on 3D User Interfaces (3DUI). IEEE, 3-10.

Byung-Woo Min, Ho-Sub Yoon, Jung Soh, Yun-Mo Yang, and Toshiaki Ejima. 1997. Hand gesture recognition using hidden Markov models. In 1997 IEEE International Conference on Systems, Man, and Cybernetics. Computational Cybernetics and Simulation, vol. 5. IEEE, 4232-4235.

MRTK 2021. MRTK: MRTK-Unity Developer Documentation. https://docs.microsoft.com/en-us/windows/mixed-reality/mrtk-unity/.

Franziska Mueller, Dushyant Mehta, Oleksandr Sotnychenko, Srinath Sridhar, Dan Casas, and Christian Theobalt. 2017. Real-time hand tracking under occlusion from an egocentric rgb-d sensor. In Proceedings of the IEEE International Conference on Computer Vision. 1154-1163.

Mathieu Nancel, Julie Wagner, Emmanuel Pietriga, Olivier Chapuis, and Wendy Mackay. 2011. Mid-air pan-and-zoom on wall-sized displays. In Proceedings of the SIGCHI Conference on Human Factors in Computing Systems. 177-186.

Michael Nebeling and Katy Madier. 2019. 360proto: Making interactive virtual reality & augmented reality prototypes from paper. In Proceedings of the 2019 CHI Conference on Human Factors in Computing Systems. 1-13.

Michael Nebeling, Janet Nebeling, Ao Yu, and Rob Rumble. 2018. Protoar: Rapid physical-digital prototyping of mobile augmented reality applications. In Proceedings of the 2018 CHI Conference on Human Factors in Computing Systems. 1-12.

Michael Nebeling and Maximilian Speicher. 2018. The trouble with augmented reality/virtual reality authoring tools. In 2018 IEEE International Symposium on Mixed and Augmented Reality Adjunct (ISMAR-Adjunct). IEEE, 333-337.

Andrew YC Nee, SK Ong, George Chryssolouris, and Dimitris Mourtzis. 2012. Augmented reality applications in design and manufacturing. CIRP annals 61, 2 (2012), 657-679.

Gary Ng, Joon Gi Shin, Alexander Plopski, Christian Sandor, and Daniel Saakes. 2018. Situated game level editing in augmented reality. In Proceedings of the Twelfth International Conference on Tangible, Embedded, and Embodied Interaction. 409-418.

SK Ong and ZB Wang. 2011. Augmented assembly technologies based on 3D bare-hand interaction. CIRP annals 60, 1 (2011), 1-4.

Jong-Seung Park. 2011. AR-Room: a rapid prototyping framework for augmented reality applications. Multimedia tools and applications 55, 3 (2011), 725-746.

Viet Toan Phan and Seung Yeon Choo. 2010. Interior design in augmented reality environment. International Journal of Computer Applications 5, 5 (2010), 16-21.

Wayne Piekarski and Bruce Thomas. 2002. ARQuake: the outdoor augmented reality gaming system. Commun. ACM 45, 1 (2002), 36-38.

Wayne Piekarski and Bruce H Thomas. 2002. Using ARToolKit for 3D hand position tracking in mobile outdoor environments. In The First IEEE International Workshop Agumented Reality Toolkit,. IEEE, 2-pp.

Thammathip Piumsomboon, David Altimira, Hyungon Kim, Adrian Clark, Gun Lee, and Mark Billinghurst. 2014. Grasp- Shell vs gesture-speech: A comparison of direct and indirect natural interaction techniques in augmented reality. In 2014 IEEE International Symposium on Mixed and Augmented Reality (Ismar). IEEE, 73-82.

Thammathip Piumsomboon, Adrian Clark, Mark Billinghurst, and Andy Cockburn. 2013. User-defined gestures for augmented reality. In IFIP Conference on Human-Computer Interaction. Springer, 282-299.

David Porfirio, Allison Sauppe, Aws Albarghouthi, and Bilge Mutlu. 2018. Authoring and verifying human-robot Interactions. In Proceedings of the 31st Annual ACM Symposium on User Interface Software and Technology. 75-86.

(56) References Cited

OTHER PUBLICATIONS

Victor Adrian Prisacariu, Olaf Kahler, Stuart Golodetz, Michael Sapienza, Tommaso Cavallari, Philip HS Torr, and David W Murray. 2017. Infinitam v3: A framework for large-scale 3d reconstruction with loop closure. arXiv preprint arXiv:1708.00783 (2017).
PyTorch 2021. PyTorch. https://pytorch.org/.
Jing Qian, Jiaju Ma, Xiangyu Li, Benjamin Attal, Haoming Lai, James Tompkin, John F Hughes, and Jeff Huang. 2019. Portal-ble: Intuitive free-hand manipulation in unbounded smartphone-based augmented reality. In Proceedings of the 32nd Annual ACM Symposium on User Interface Software and Technology. 133-145.
Matthias Schwaller, Simon Brunner, and Denis Lalanne. 2013. Two handed mid-air gestural hci: Point+ command. In International Conference on Human-Computer Interaction. Springer, 388-397.
Hartmut Seichter, Julian Looser, and Mark Billinghurst. 2008. ComposAR: An intuitive tool for authoring AR applications. In 2008 7th IEEE/ACM International Symposium on Mixed and Augmented Reality. IEEE, 177-178.
Jinwook Shim, Yoonsik Yang, Nahyung Kang, Jonghoon Seo, and Tack-Don Han. 2016. Gesture-based interactive augmented reality content authoring system using HMD. Virtual Reality 20, 1 (2016), 57-69.
Deepanjal Shrestha, Hyungwoo Lee, and Junchul Chun. 2018. Computer-vision-based bare-hand augmented reality Interface for controlling an AR object. International Journal of Computer Aided Engineering and Technology 10, 3 (2018), 257-265.
Date unknown SonyAibo 2021. Sony: aibo. https://us.aibo.com/.
Nur SyafiqahSafiee and Ajune Wanis Ismail. 2018. Ar home deco: virtual object manipulation technique using hand gesture in augmented reality. Innovations in Computing Technology and Applications 3 (2018).
Ultraleap 2021. Tracking: Leaping Motion Controller. https://www.ultraleap.com/product/leap-motion-controller/.
Unity 2021. Unity: Real-Time Development Platform. https://www.unity.com.
UnrealEngine 2021. UnrealEngine: The most powerful real-time 3D creation platform. https://www.unrealengine.com/en-us/.
Ana Villanueva, Zhengzhe Zhu, Ziyi Liu, Kylie Peppler, Thomas Redick, and Karthik Ramani. 2020. Meta-AR-app: an authoring platform for collaborative augmented reality in STEM classrooms. In Proceedings of the 2020 CHI conference on human factors in computing systems. 1-14.
Christian Von Hardenberg and François Bérard. 2001. Bare-hand human-computer interaction. In Proceedings of the 2001 workshop on Perceptive user interfaces. 1-8.
Tianyi Wang, Xun Qian, Fengming He, Xiyun Hu, Ke Huo, Yuanzhi Cao, and Karthik Ramani. 2020. CAPturAR: An Augmented Reality Tool for Authoring Human-Involved Context-Aware Applications. In Proceedings of the 33rd Annual ACM Symposium on User Interface Software and Technology. 328-341.
Matt Whitlock, Jake Mitchell, Nick Pfeufer, Brad Amnot, Ryan Craig, Bryce Wilson, Brian Chung, and Danielle Albers Szafir. 2020. MRCAT: In Situ Prototyping of Interactive AR Environments. In International Conference on Human-Computer Interaction. Springer, 235-255.
Adam S Williams, Jason Garcia, and Francisco Ortega. 2020. Understanding Multimodal User Gesture and Speech Behavior for Object Manipulation in Augmented Reality Using Elicitation. IEEE Transactions on Visualization and Computer Graphics 26, 12 (2020), 3479-3489.
Graham Wilson, Thomas Carter, Sriram Subramanian, and Stephen A Brewster. 2014. Perception of ultrasonic haptic feedback on the hand: localisation and apparent motion. In Proceedings of the SIGCHI Conference on Human Factors in Computing Systems. 1133-1142.
Jacob O Wobbrock, Meredith Ringel Morris, and Andrew D Wilson. 2009. User-defined gestures for surface computing. In Proceedings of the SIGCHI conference on human factors in computing systems. 1083-1092.

Yukang Yan, Chun Yu, Xiaojuan Ma, Xin Yi, Ke Sun, and Yuanchun Shi. 2018. Virtualgrasp: Leveraging experience of Interacting with physical objects to facilitate digital object retrieval. In Proceedings of the 2018 CHI Conference on Human Factors in Computing Systems. 1-13.
Geng Yang, Honghao Lv, Feiyu Chen, Zhibo Pang, Jin Wang, Huayong Yang, and Junhui Zhang. 2018. A novel gesture recognition system for intelligent interaction with a nursing care assistant robot. Applied Sciences 8, 12 (2018), 2349.
Hui Ye, Kin Chung Kwan, Wanchao Su, and Hongbo Fu. 2020. ARAnimator: in-situ character animation in mobile AR with user-defined motion gestures. ACM Transactions on Graphics (TOG) 39, 4 (2020), 83-1.
Shahrouz Yousefi, Mhretab Kidane, Yeray Delgado, Julio Chana, and Nico Reski. 2016. 3D gesture-based interaction for immersive experience in mobile VR. In 2016 23rd International Conference on Pattern Recognition (ICPR). IEEE, unknown 2121-2126.
Run Yu and Doug A Bowman. 2018. Force push: Exploring expressive gesture-to-force mappings for remote object manipulation in virtual reality. Frontiers in ICT 5 (2018), 25.
Ya-Ting Yue, Yong-Liang Yang, Gang Ren, and Wenping Wang. 2017. SceneCtrl: Mixed reality enhancement via efficient scene editing. In Proceedings of the 30th Annual ACM Symposium on User Interface Software and Technology. 427-436.
Bruno Zamborlin, Frederic Bevilacqua, Marco Gillies, and Mark D'inverno. 2014. Fluid gesture interaction design: Applications of continuous recognition for the design of modern gestural interfaces. ACM Transactions on Interactive Intelligent Systems (TiiS) 3, 4 (2014), 1-30.
Jürgen Zauner, Michael Haller, Alexander Brandl, and Werner Hartman. 2003. Authoring of a mixed reality assembly Instructor for hierarchical structures. In The Second IEEE and ACM International Symposium on Mixed and Augmented Reality, 2003. Proceedings. IEEE, 237-246.
Lei Zhang and Steve Oney. 2020. FlowMatic: An Immersive Authoring Tool for Creating Interactive Scenes in Virtual Reality. In Proceedings of the 33rd Annual ACM Symposium on User Interface Software and Technology. 342-353.
3D Scanner App 2021. 3D Scanner App: Capture Anything in 3D. https://www.3dscannerapp.com/. date unknown.
Günter Alce, Mattias Wallergard, and Klas Hermodsson. 2015. WozARd: a wizard of Oz method for wearable augmented reality interaction—a pilot study. Advances in human-computer interaction 2015 (2015).
Fraser Anderson, Tovi Grossman, and George Fitzmaurice. 2017. Trigger-action-circuits: Leveraging generative design to enable novices to design and build circuitry. In Proceedings of the 30th Annual ACM Symposium on User Interface Software and Technology. 331-342.
ARCore [n.d.]. ARCore. https://developers.google.com/ar.
ARKit [n.d.]. ARKit Overview. https://developer.apple.com/augmented reality/arkit/.
Rahul Arora, Rubaiat Habib Kazi, Tovi Grossman, George Fitzmaurice, and Karan Singh. 2018. Symbiosissketch: Combining 2d & 3d sketching for designing detailed 3d objects in situ. In Proceedings of the 2918 CHI Conference on Human Factors in Computing Systems. 1-15.
Rahul Arora, Rubaiat Habib Kazi, Danny M Kaufman, Wilmot Li, and Karan Singh. 2019. Magicalhands: Mid-air hand gestures for animating in vr. In Proceedings of the 32nd Annual ACM Symposium on User Interface Software and Technology. 463-477.
Daniel Ashbrook and Thad Starner. 2010. MAGIC: a motion gesture design tool. In Proceedings of the SIGCHI Conference on Human Factors in Computing Systems. 2159-2168.
Narges Ashtari, Andrea Bunt, Joanna McGrenere, Michael Nebeling, and Parmit K Chilana. 2020. Creating augmented and virtual reality applications: Current practices, challenges, and opportunities. In Proceedings of the 2020 CHI Conference on Human Factors in Computing Systems. 1-13.
Hrvoje Benko, Ricardo Jota, and Andrew Wilson. 2012. Miragetable: freehand interaction on a projected augmented reality tabletop. In Proceedings of the SIGCHI conference on human factors in computing systems. 199-208.

(56) References Cited

OTHER PUBLICATIONS

Fabio Bettio, Andrea Giachetti, Enrico Gobbetti, Fabio Marton, and Giovanni Pintore. 2007. A Practical Vision Based Approach to Unencumbered Direct Spatial Manipulation in Virtual Worlds.. In Eurographics Italian Chapter Conference. 145-150.

Volkert Buchmann, Stephen Violich, Mark Billinghurst, and Andy Cockburn. 2004. FingARtips: gesture based direct manipulation in Augmented Reality. In Proceedings of the 2nd international conference on Computer graphics and Interactive techniques in Australasia and South East Asia. 212-221.

Yuanzhi Cao, Xun Qian, Tianyi Wang, Rachel Lee, Ke Huo, and Karthik Ramani. 2020. An Exploratory Study of Augmented Reality Presence for Tutoring Machine Tasks. In Proceedings of the 2020 CHI Conference on Human Factors in Computing Systems. 1-13.

Yuanzhi Cao, Tianyi Wang, Xun Qian, Pawan S Rao, Manav Wadhawan, Ke Huo, and Karthik Ramani. 2019. GhostAR: A Time-space Editor for Embodied Authoring of Human-Robot Collaborative Task with Augmented Reality. In Proceedings of the 32nd Annual ACM Symposium on User Interface Software and Technology. 521-534.

Di Laura Chen, Ravin Balakrishnan, and Tovi Grossman. 2020. Disambiguation techniques for freehand object manipulations in virtual reality. In 2020 IEEE conference on virtual reality and 3D user interfaces (VR). IEEE, 285-292.

Jiawen Chen, Shahram Izadi, and Andrew Fitzgibbon. 2012. KinÊtre: animating the world with the human body. In Proceedings of the 25th annual ACM symposium on User interface software and technology. 435-444.

Xinghao Chen, Hengkai Guo, Guijin Wang, and Li Zhang. 2017. Motion feature augmented recurrent neural network for skeleton-based dynamic hand gesture recognition. In 2017 IEEE International Conference on Image Processing (ICIP). IEEE, 2881-2885.

Chiho Choi, Sang Ho Yoon, Chin-Ning Chen, and Karthik Ramani. 2017. Robust hand pose estimation during the interaction with an unknown object. In Proceedings of the IEEE International Conference on Computer Vision. 3123- 3132.

Anind K Dey, Raffay Hamid, Chris Beckmann, Ian Li, and Daniel Hsu. 2004. a CAPpella: programming by demonstration of context-aware applications. In Proceedings of the SIGCHI conference on Human factors in computing systems. 33-40.

Mahmoud Elmezain, Ayoub Al-Hamadi, Jorg Appenrodt, and Bernd Michaelis. 2008. A hidden markov model-based continuous gesture recognition system for hand motion trajectory. In 2008 19th International Conference on Pattern Recognition. IEEE, 1-4.

Barrett Ens, Fraser Anderson, Tovi Grossman, Michelle Annett, Pourang Irani, and George Fitzmaurice. 2017. Ivy: Exploring spatially situated visual programming for authoring and understanding intelligent environments. In Proceedings of the 43rd Graphics Interface Conference. 156-162.

FinalIK 2021. FinalIK: Final IK—RootMotion. http://www.rootmotion.com/final-ik.html.

Markus Funk, Mareike Kritzler, and Florian Michahelles. 2017. Hololens is more than air Tap: natural and intuitive Interaction with holograms. In Proceedings of the seventh international conference on the internet of things. 1-2.

Terrell Glenn, Ananya Ipsita, Caleb Carithers, Kylie Peppler, and Karthik Ramani. 2020. StoryMakAR: Bringing Stories to Life With An Augmented Reality & Physical Prototyping Toolkit for Youth. In Proceedings of the 2020 CHI Conference on Human Factors in Computing Systems. 1-14.

Celeste Groenewald, Craig Anslow, Junayed Islam, Chris Rooney, Peter J Passmore, and BL Wong. 2016. Understanding 3D mid-air hand gestures with interactive surfaces and displays: a systematic literature review. (2016).

Sinem Güven and Steven Feiner. 2003. Authoring 3D hypermedia for wearable augmented and virtual reality. In Proceedings of IEEE International Symposium on Wearable Computers (ISWC'03) 21-23.

Björn Hartmann, Leith Abdulla, Manas Mittal, and Scott R Klemmer. 2007. Authoring sensor-based interactions by demonstration with direct manipulation and pattern recognition. In Proceedings of the SIGCHI conference on Human factors in computing systems. 145-154.

Robert Held, Ankit Gupta, Brian Curless, and Maneesh Agrawala. 2012. 3D puppetry: a kinect-based interface for 3D animation . . . In UIST, vol. 12. Citeseer, 423-434.

Valentin Heun, James Hobin, and Pattie Maes. 2013. Reality editor: programming smarter objects. In Proceedings of the 2013 ACM conference on Pervasive and ubiquitous computing adjunct publication. 307-310.

Otmar Hilliges, David Kim, Shahram Izadi, Malte Weiss, and Andrew Wilson. 2012. HoloDesk: direct 3d interactions with a situated see-through display. In Proceedings of the SIGCHI Conference on Human Factors in Computing Systems. 2421-2430.

Hololens 2 2021. Hololens 2: Mixed Reality Technology for Business. https://www.microsoft.com/en-us/hololens.

Zhanpeng Huang, Weikai Li, and Pan Hui. 2015. Ubii: Towards seamless interaction between digital and physical worlds. In Proceedings of the 23rd ACM international conference on Multimedia, 341-350.

Ke Huo and Karthik Ramani. 2016. Window-Shaping: 3D Design Ideation in Mixed Reality. In Proceedings of the 2016 Symposium on Spatial User Interaction. 189-189.

Shahram Izadi, David Kim, Otmar Hilliges, David Molyneaux, Richard Newcombe, Pushmeet Kohli, Jamie Shotton, Steve Hodges, Dustin Freeman, Andrew Davison, et al. 2011. KinectFusion: real-time 3D reconstruction and Interaction using a moving depth camera. In Proceedings of the 24th annual ACM symposium on User interface software and technology. 559-568.

Rubaiat Habib Kazi, Fanny Chevalier, Tovi Grossman, and George Fitzmaurice. 2014. Kitty: sketching dynamic and Interactive illustrations. In Proceedings of the 27th annual ACM symposium on User interface software and technology. 395-405.

Annie Kelly, R Benjamin Shapiro, Jonathan de Halleux, and Thomas Ball. 2018. ARcadia: A rapid prototyping platform for real-time tangible interfaces. In Proceedings of the 2018 CHI Conference on Human Factors in Computing Systems. 1-8.

Jun-Sik Kim, MyungHwan Jeon, and Jung-Min Park. 2019. Multi-Hand Direct Manipulation of Complex Constrained Virtual Objects. In 2019 IEEE/RSJ International Conference on Intelligent Robots and Systems (IROS). IEEE, 3235-3240.

Yongkwan Kim and Seok-Hyung Bae. 2016. SketchingWithHands: 3D sketching handheld products with first-person hand posture. In Proceedings of the 29th Annual Symposium on User Interface Software and Technology. 797-808.

Gregory Koch, Richard Zemel, and Ruslan Salakhutdinov. 2015. Siamese neural networks for one-shot image recognition. In ICML deep learning workshop, vol. 2. Lille.

Sinisa Kolaric, Alberto Raposo, and Marcelo Gattass. 2008. Direct 3D manipulation using vision-based recognition of uninstrumented hands. In X Symposium on Virtual and Augmented Reality. Citeseer, 212-220.

Tobias Langlotz, Stefan Mooslechner, Stefanie Zollmann, Claus Degendorfer, Gerhard Reitmayr, and Dieter Schmalstieg. 2012. Sketching up the world: in situ authoring for mobile augmented reality. Personal and ubiquitous date unknown computing 16, 6 (2012), 623-630.

David Ledo, Jo Vermeulen, Sheelagh Carpendale, Saul Greenberg, Lora Oehlberg, and Sebastian Boring. 2019. Astral: Prototyping Mobile and Smart Object Interactive Behaviours Using Familiar Applications. In Proceedings of the 2019 on Designing Interactive Systems Conference. 711-724.

Bokyung Lee, Minjoo Cho, Joonhee Min, and Daniel Saakes. 2016. Posing and acting as input for personalizing furniture. In Proceedings of the 9th Nordic Conference on Human-Computer Interaction. 1-10.

Gun A Lee, Gerard J Kim, and Mark Billinghurst. 2005. Immersive authoring: What you experience is what you get (wyxiwyg). Commun. ACM 48, 7 (2005), 76-81.

Gun A Lee, Claudia Nelles, Mark Billinghurst, and Gerard Jounghyun Kim. 2004. Immersive authoring of tangible augmented reality applications. In Third IEEE and ACM International Symposium on Mixed and Augmented Reality. IEEE, 172-181.

(56) References Cited

OTHER PUBLICATIONS

Jae Yeol Lee, Gue Won Rhee, and Dong Woo Seo. 2010. Hand gesture-based tangible interactions for manipulating virtual objects in a mixed reality environment The International Journal of Advanced Manufacturing Technology 51, 9-12 (2010), 1069-1082.

Minkyung Lee, Mark Billinghurst, Woonhyuk Baek, Richard Green, and Woontack Woo. 2013. A usability study of multimodal input in an augmented reality environment. Virtual Reality 17, 4 (2013), 293-305.

Minkyung Lee, Richard Green, and Mark Billinghurst. 2008. 3D natural hand interaction for AR applications In 2008 23rd International Conference Image and Vision Computing New Zealand. IEEE, 1-6.

Germán Leiva and Michel Beaudouin-Lafon. 2018. Montage: a video prototyping system to reduce re-shooting and increase re-usability. In Proceedings of the 31st Annual ACM Symposium on User Interface Software and Technology. 675-682.

Germán Leiva, Cuong Nguyen, Rubaiat Habib Kazi, and Paul Asente. 2020. Pronto: Rapid Augmented Reality Video Prototyping Using Sketches and Enaction. In Proceedings of the 2020 CHI Conference on Human Factors in Computing Systems. 1-13.

* cited by examiner

Algorithm 1 Calculate *state* series from a *dynamic* gesture

1: procedure CALCULATESTATES($[f_1, f_2, \cdots, f_N]$)
2:     *States* ← *array*[]
3:     get state $s_1$ from $f_1$
4:     add $s_1$ to *States*
5:     for $i \leftarrow 2, N$ do
6:         get state $s_i$ from $f_i$
7:         $s_d$ ← the last element of *States*
8:         if SiameseNetwork($s_i.Pose, s_d.Pose$) is *true* then
9:             if $s_i.mDir \neq s_d.mDir$ or $s_i.pRot \neq s_d.pRot$ then
10:                 $s_{new}$ ← ($s_d.Pose, s_i.mDir, s_i.pRot$)
11:                 add $s_{new}$ to *States*
12:         else
13:             add $s_i$ to *States*
14:     return *States*

FIG. 11

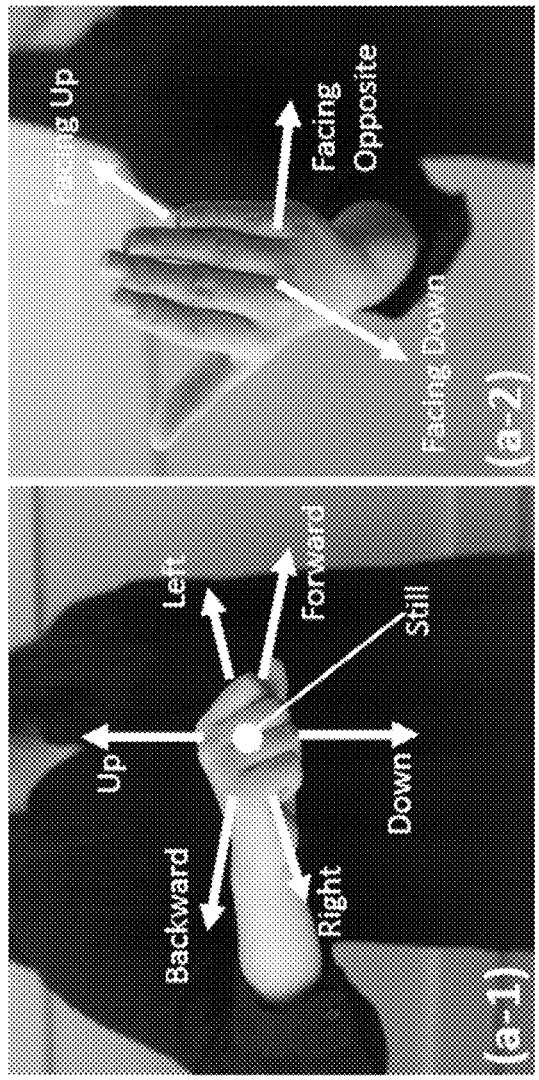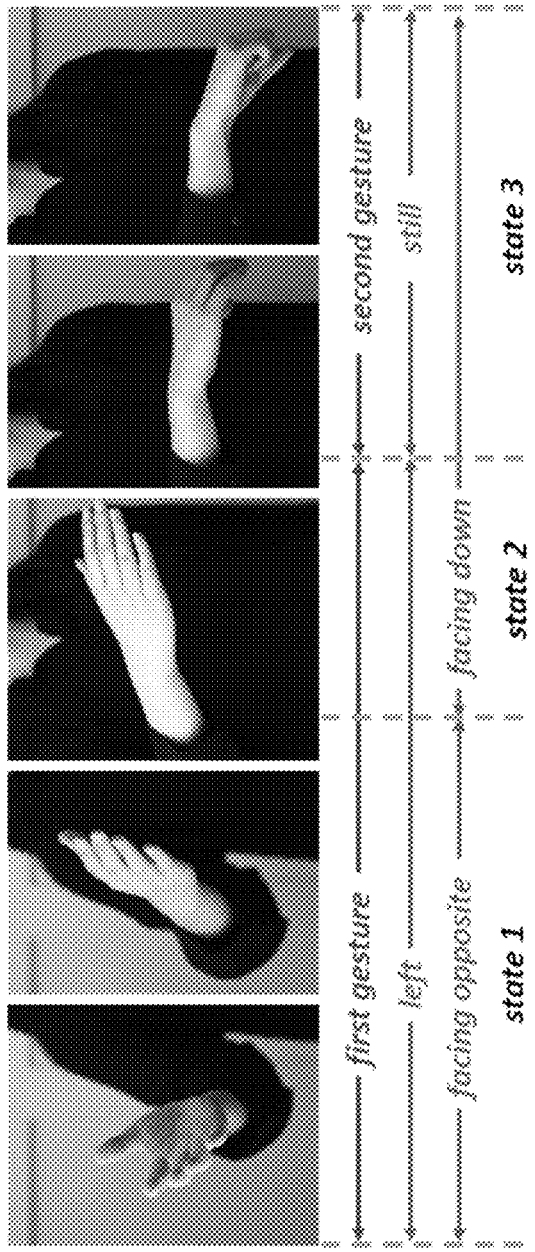
FIG. 12

SYSTEM AND METHOD FOR AUTHORING FREEHAND INTERACTIVE AUGMENTED REALITY APPLICATIONS

This application claims the benefit of priority of U.S. provisional application Ser. No. 63/226,367, filed on Jul. 28, 2021 the disclosure of which is herein incorporated by reference in its entirety.

GOVERNMENT LICENSE RIGHTS

This invention was made with government support under contract number DUE 1839971 awarded by the National Science Foundation. The government has certain rights in the invention.

FIELD

The device and method disclosed in this document relates to augmented reality and, more particularly, to authoring freehand interactive augmented reality applications.

BACKGROUND

Unless otherwise indicated herein, the materials described in this section are not admitted to be the prior art by inclusion in this section.

Augmented Reality (AR) technology has been broadly adopted in a variety of areas including manufacturing, design, education, and entertainment. Interacting with virtual content plays an essential role in most of these AR experiences. As a dominant approach for manipulating real-world objects, hand gestures have been accepted as an intuitive method for interacting with virtual AR content, especially while using hands-free AR head-mounted devices (AR-HMD). Leveraging the recent advances in hand tracking techniques, researchers have facilitated detection of natural gestures such as touching, grasping, and holding virtual objects without external tracking devices. Such freehand interactions greatly improve the immersion of interactions within AR experiences.

Many prior techniques focus on predefined interactions for virtual manipulations, which are unable to cover the complexity and diversity of the hand-based interactions used in our everyday life. Interacting with different objects usually requires specific hand gestures. For example, a prior work called "VirtualGrasp" has shown that different gesture preferences have been found when grasping books, cups, and pens in a virtual environment. Furthermore, one object may have various reactions when encountered with different gestures. For instance, a virtual soda can be held tightly with one or two hands, placed on the palm, or squeezed. While it is difficult for an AR application to include all the hand-object interactions in advance, it is a goal to empower end-users to author personalized and context-aware hand-related interactions. Moreover, end-users have more in-depth knowledge about their activities and gesture preferences.

Freehand interactive AR applications typically detect hand gesture inputs in real-time to invoke the corresponding responses of the virtual contents. However, building algorithms to recognize a certain gesture requires professional expertise. Popular programming-based authoring tools (Unity3D, Unreal, ARCore, ARKit, etc.) have a steep learning curve and are therefore cumbersome for non-professional users to use to create AR applications.

SUMMARY

A method for authoring an augmented reality (AR) application is disclosed. The method comprises defining, with a processor, a hand gesture by recording a demonstration of hand motions by a user in an environment with at least one sensor. The method further comprises displaying, on a display, an AR graphical user interface including, superimposed on the environment, (i) a virtual object and (ii) a graphical representation of the defined hand gesture. The method further comprises associating, with the processor, based on user inputs received from the user, the hand gesture with an animation or a manipulation of the virtual object to be displayed in response to or synchronously with performance of the defined hand gesture. The method further comprises displaying, in the AR graphical user interface on the display, the animation or the manipulation of the virtual object in response to or synchronously with detecting a real-time performance of the defined hand gesture.

An augmented reality device for authoring an augmented reality (AR) application is disclosed. The augmented reality device comprises: a memory; a display screen configured to display an AR graphical user interface; at least one sensor configured to measure sensor data; and a processor operably connected to the memory, the display screen, and the at least one sensor. The processor is configured to define, and store in the memory, a hand gesture by operating at least one sensor to record a demonstration of hand motions by a user in an environment. The processor is further configured to operate the display screen to display, in the AR graphical user interface, (i) a virtual object and (ii) a graphical representation of the defined hand gesture, superimposed on the environment. The processor is configured to determine, and store in the memory, based on user inputs received from the user, an association between the hand gesture and an animation or a manipulation of the virtual object to be displayed in response to or synchronously with performance of the defined hand gesture. The processor is configured to operate the display screen to display, in the AR graphical user interface, the animation or the manipulation of the virtual object in response to or synchronously with detecting a real-time performance of the defined hand gesture.

BRIEF DESCRIPTION OF THE DRAWINGS

The foregoing aspects and other features of the system and method are explained in the following description, taken in connection with the accompanying drawings.

FIG. 11 shows pseudocode detailing an algorithm for calculating state series from a dynamic gesture.

FIG. 12 shows labels used to describe hand movement and rotation, as well as the process of converting a dynamic gesture into a list of states.

DETAILED DESCRIPTION

Figure 1A:
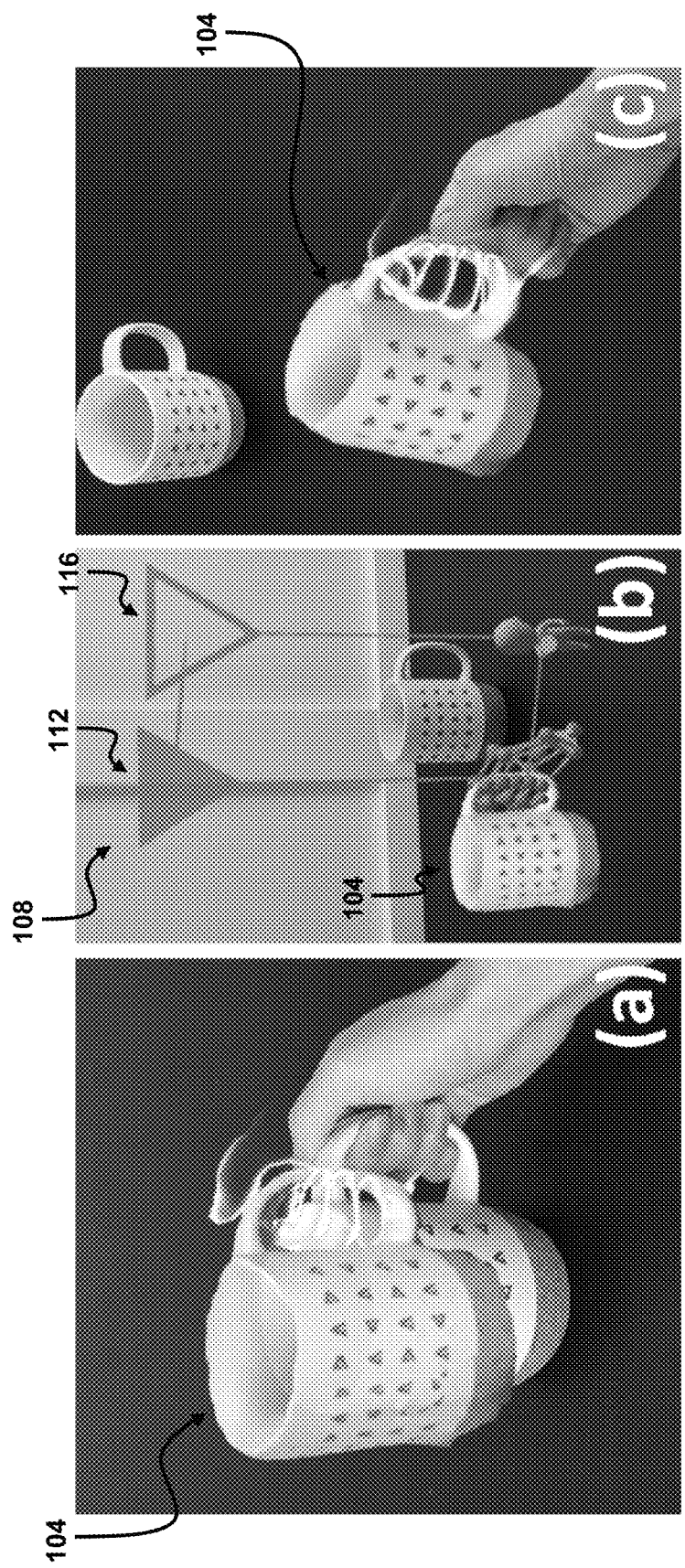
FIG. 1A summarizes the creation of an exemplary AR application using an AR application authoring system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

Figure 1B:
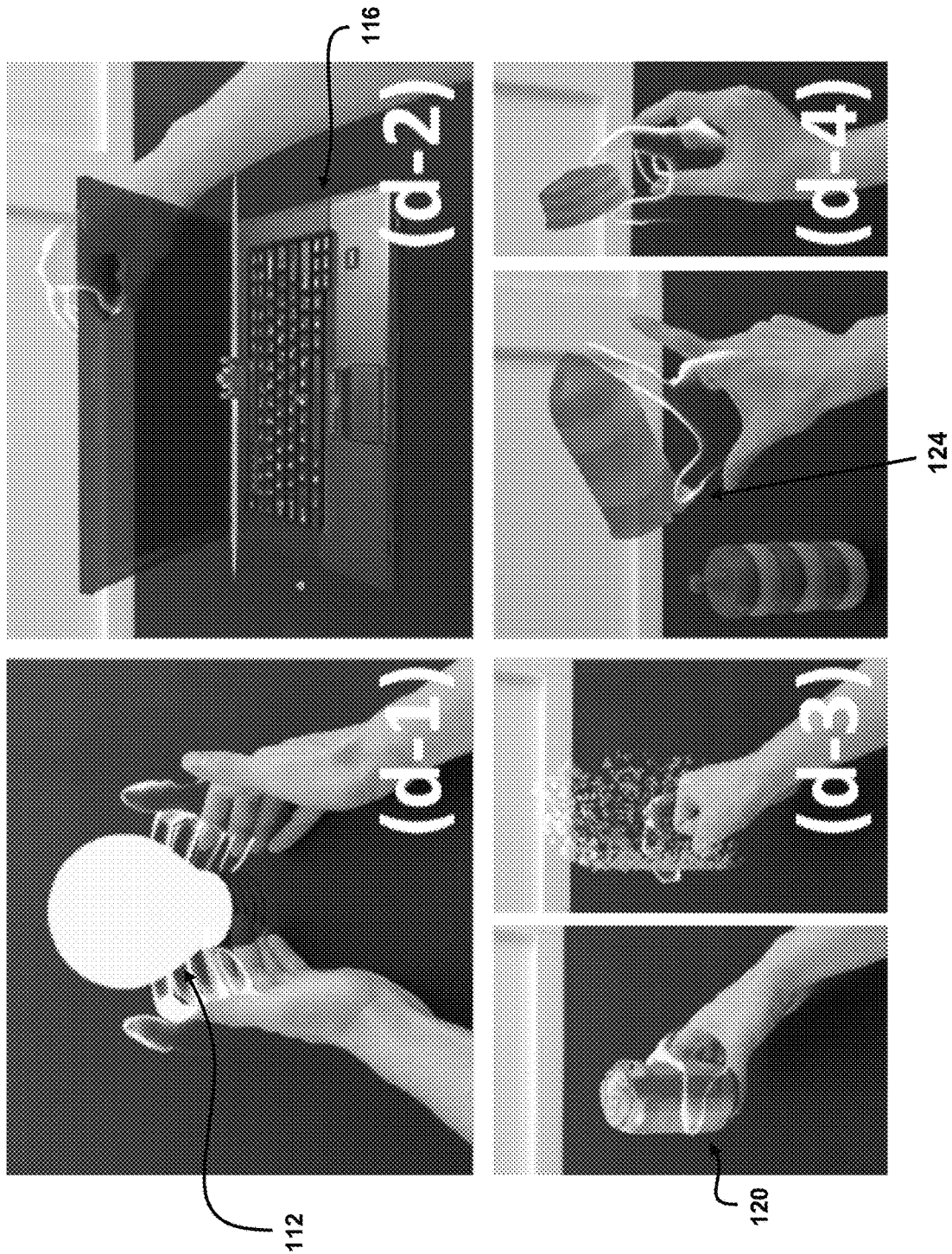
FIG. 1B illustrates additional exemplary freehand interactions that can be defined using the AR application authoring system.
Figure 2:
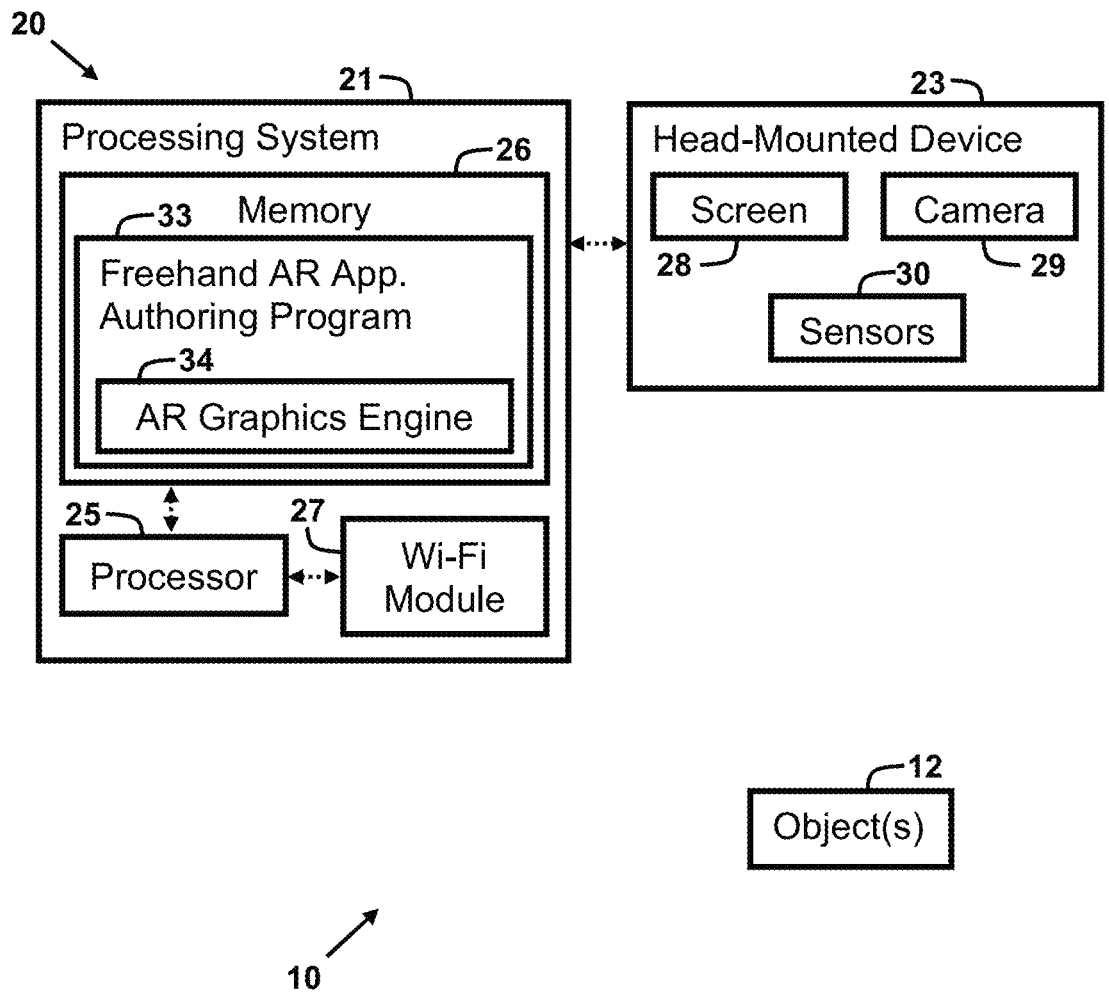
FIG. 2 shows exemplary components of the AR application authoring system.

With reference to FIGS. 1A-B and 2, an augmented reality (AR) application authoring system 10 is introduced. The AR application authoring system 10 enables the real-time creation of freehand interactive AR applications with freehand inputs. The AR application authoring system 10 enables intuitive authoring of customized freehand gesture inputs through embodied demonstration while using the surrounding environment as a contextual reference. A visual programming interface is provided with which users can define freehand interactions by matching the freehand gestures with reactions of virtual AR assets. Thus, users can create personalized freehand interactions through simple trigger-action programming logic. Further, with the support of a real-time hand gesture detection algorithm, users can seamlessly test and iterate on the authored AR experience.

The AR application authoring system 10 provides several advantages over conventional end-user programming interfaces for freehand interactive AR applications. Particularly, the AR application authoring system 10 advantageously provides a comprehensive in-situ authoring workflow for end-users to create and perform customized freehand interactions through embodied demonstration. Embodied demonstration provides users with an intuitive way to create gesture-enabled virtual content. Via the demonstration of a few examples, users can build customized gesture detection applications without the need to understand or investigate low-level details. In this way, even non-expert AR consumers can design freehand interactions according to their personal preference and specific surrounding contexts. The immersive experience supported by AR-HMD fosters the evolution of authoring workflow in an in-situ and ad-hoc fashion. The WYSIWYG (what you see is what you get) metaphor enables users to directly build 3D models and create animations by manipulating virtual objects. Additionally, the AR application authoring system 10 advantageously utilizes a freehand interaction model that spatially and temporally maps hand inputs to corresponding responsive behaviors of the virtual AR assets based using a real-time hand gesture detection algorithm. Finally, the AR application authoring system 10 advantageously provides an AR interface for generating virtual AR assets, demonstrating hand gestures, and creating freehand interactive AR applications through visual programming.

FIG. 1A summarizes the creation of an exemplary AR application using an AR application authoring system 10. In illustration (a), a user demonstrates a grabbing gesture next to a virtual cup 104 to define a trigger for a freehand interactive AR application. In illustration (b), the user interacts with a visual programming interface 108 to select a virtual action to be performed and connects it with the previously defined grabbing gesture. In illustration (c), the user tests the previously defined interaction by performing the grabbing gesture with respect to the virtual cup 104. The virtual cup 104 responds the grabbing gesture by performing a following action in which the virtual cup 104 is animated so as to follow the position of the user's hand, as if the user had picked up the virtual cup 104. In this way, the AR application authoring system 10 provides a streamlined and intuitive tool for creating AR applications involving freehand interactions with virtual AR assets.

FIG. 1B illustrates additional exemplary freehand interactions that can be defined using the AR application authoring system 10 in which a virtual action is performed in response to a freehand gesture. In the example of illustration (d-1), a virtual light bulb 112 is lit in response to the user performing a holding gesture. In the example of illustration (d-2), the user opens the lid of a virtual laptop 116 in response to the user performing a grabbing gesture. In the example of illustration (d-3), a virtual soda can 120 is broken in response to the user performing a clenching gesture. In the example of illustration (d-4), the length of a toy spring 124 changes synchronously with the user performing a pinching gesture.

FIG. 2 shows exemplary components of the AR system 20 of the AR application authoring system. It should be appreciated that the components of the AR system 20 shown and described are merely exemplary and that the AR system 20 may comprise any alternative configuration. Moreover, in the illustration of FIG. 2, only a single AR system 20 is shown. However, in practice the AR application authoring system may include one or multiple AR systems 20.

To enable the AR authoring environment, the AR application authoring system 10 at least includes an AR system 20, at least part of which is worn or held by a user, and one or more objects 12 in the environment that scanned or interacted with by the user. The AR system 20 preferably includes an AR head-mounted display (AR-HMD) 23 having at least a camera and a display screen, but may include any mobile AR device, such as, but not limited to, a smartphone, a tablet computer, a handheld camera, or the like having a display screen and a camera. In one example, the AR-HMD 23 is in the form of an AR or virtual reality headset (e.g., Microsoft's HoloLens, Oculus Rift, or Oculus Quest) or equivalent AR glasses having an integrated or attached front-facing stereo-camera 29 (e.g., ZED Dual 4MP Camera (720p, 60 fps)).

In the illustrated exemplary embodiment, the AR system 20 includes a processing system 21, the AR-HMD 23, and (optionally) external sensors (not shown). In some embodiments, the processing system 21 may comprise a discrete computer that is configured to communicate with the AR-HMD 23 via one or more wired or wireless connections. In some embodiments, the processing system 21 takes the form of a backpack computer connected to the AR-HMD 23. However, in alternative embodiments, the processing system 21 is integrated with the AR-HMD 23. Moreover, the processing system 21 may incorporate server-side cloud processing systems.

As shown in FIG. 2, the processing system 21 comprises a processor 25 and a memory 26. The memory 26 is configured to store data and program instructions that, when executed by the processor 25, enable the AR system 20 to perform various operations described herein. The memory 26 may be of any type of device capable of storing information accessible by the processor 25, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 25 may include a system with a central processing unit, graphics processing units, multiple processing units, dedicated circuitry for achieving functionality, programmable logic, or other processing systems.

The processing system 21 further comprises one or more transceivers, modems, or other communication devices configured to enable communications with various other devices. Particularly, in the illustrated embodiment, the processing system 21 comprises a Wi-Fi module 27. The Wi-Fi module 27 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. As discussed in further detail below, the processor 25 is configured to operate the Wi-Fi module 27 to send and receive messages, such as control and data messages, to and from the IoT devices via the Wi-Fi network and/or Wi-Fi router. It will be appreciated, however, that other communication technologies, such as Bluetooth, Z-Wave, Zigbee, or any other radio frequency-based communication technology can be used to enable data communications between devices in the system 10.

In the illustrated exemplary embodiment, the AR-HMD 23 comprises a display screen 28 and the camera 29. The camera 29 is configured to capture a plurality of images of the environment 50 as the head mounted AR device 23 is moved through the environment 50 by the user 15. The camera 29 is configured to generate image frames of the environment 50, each of which comprises a two-dimensional array of pixels. Each pixel has corresponding photometric information (intensity, color, and/or brightness). In some embodiments, the camera 29 is configured to generate RGB-D images in which each pixel has corresponding photometric information and geometric information (depth and/or distance). In such embodiments, the camera 29 may, for example, take the form of two RGB cameras configured to capture stereoscopic images, from which depth and/or distance information can be derived, or an RGB camera with an associated IR camera configured to provide depth and/or distance information.

The display screen 28 may comprise any of various known types of displays, such as LCD or OLED screens. In at least one embodiment, the display screen 28 is a transparent screen, through which a user can view the outside world, on which certain graphical elements are superimposed onto the user's view of the outside world. In the case of a non-transparent display screen 28, the graphical elements may be superimposed on real-time images/video captured by the camera 29. In further embodiments, the display screen 28 may comprise a touch screen configured to receive touch inputs from a user.

In some embodiments, the AR-HMD 23 may further comprise a variety of sensors 30. In some embodiments, the sensors 30 include sensors configured to measure one or more accelerations and/or rotational rates of the AR-HMD 23. In one embodiment, the sensors 30 comprises one or more accelerometers configured to measure linear accelerations of the AR-HMD 23 along one or more axes (e.g., roll, pitch, and yaw axes) and/or one or more gyroscopes configured to measure rotational rates of the AR-HMD 23 along one or more axes (e.g., roll, pitch, and yaw axes). In some embodiments, the sensors 30 include Lidar or IR cameras. In some embodiments, the sensors 30 may include inside-out motion tracking sensors configured to track human body motion of the user within the environment, in particular positions and movements of the head, arms, and hands of the user.

The AR-HMD 23 may also include a battery or other power source (not shown) configured to power the various components within the AR-HMD 23, which may include the processing system 21, as mentioned above. In one embodiment, the battery of the AR-HMD 23 is a rechargeable battery configured to be charged when the AR-HMD 23 is connected to a battery charger configured for use with the AR-HMD 23.

The program instructions stored on the memory 26 include a freehand interactive AR application authoring program 33. As discussed in further detail below, the processor 25 is configured to execute the freehand interactive AR application authoring program 33 to enable the authorship and performance of freehand interactive AR applications by the user. In one embodiment, the freehand interactive AR application authoring program 33 is implemented with the support of Microsoft Mixed Reality Toolkit (MRTK), Final IK, and mesh effect libraries 2 3 4. In one embodiment, the freehand interactive AR application authoring program 33 includes an AR graphics engine 34 (e.g., Unity3D engine), which provides an intuitive visual interface for the freehand interactive AR application authoring program 33. Particularly, the processor 25 is configured to execute the AR graphics engine 34 to superimpose on the display screen 28 graphical elements for the purpose of authoring freehand interactive AR applications, as well as providing graphics and information as a part of the performance of the freehand interactive AR applications. In the case of a non-transparent display screen 28, the graphical elements may be superimposed on real-time images/video captured by the camera 29.

Freehand Interaction Authoring Workflow

Figure 3:
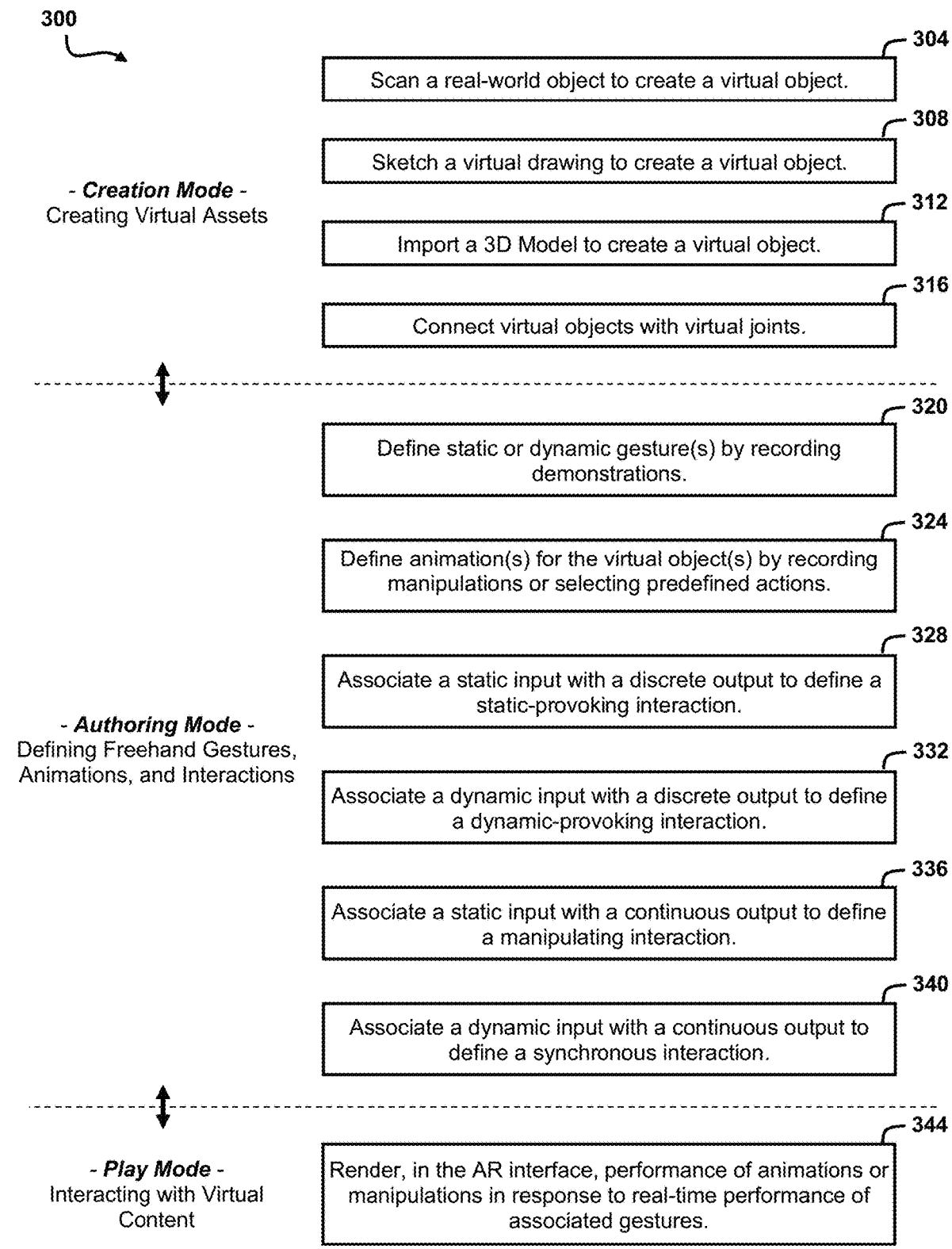
FIG. 3 shows a flow diagram that summarizes a workflow for authoring freehand interactive AR applications using the AR application authoring system.

FIG. 3 shows a flow diagram that summarizes a workflow 300 for authoring freehand interactive AR applications using the AR application authoring system 10. Particularly, the AR application authoring system 10 is configured to enable interactive embodied authoring and testing of freehand interactive AR applications using an AR-based graphical user interface on the display 28. To this end, the AR system 20 is configured to provide a variety of AR graphical user interfaces and interactions therewith which can be accessed in the following three modes of the AR system 20: Creation Mode, Authoring Mode, and Play Mode. In the Creation Mode, the AR system 20 enables the user to create, modify, and view virtual assets, such as virtual objects, that can be interacted with in the freehand interactive AR application. In the Authoring Mode, the AR system 20 enables the user to define freehand gestures for interacting with the virtual objects and define animations and other actions for the virtual objects. In the Authoring Mode, the AR system 20 further enables the user to define interactions by combining the defined gestures and other predefined triggers with corresponding animations and other predefined actions. Finally, in the Play Mode, the AR system 20 enables the user to test the authored the freehand interactive AR application, including the defined interactions.

A variety of methods and processes are described below for enabling the operations and interactions of the Creation Mode, Authoring Mode, and Play Mode of the AR system 20. In these descriptions, statements that a method, process, workflow, processor, and/or system is performing some task or function refers to a controller or processor (e.g., the processor 25) executing programmed instructions (e.g., the freehand interactive AR application authoring program 33 or the AR graphics engine 34) stored in non-transitory computer readable storage media (e.g., the memory 26) operatively connected to the controller or processor to manipulate data or to operate one or more components in the AR application authoring system 10 to perform the task or function. Additionally, the steps of the methods may be performed in any feasible chronological order, regardless of the order shown in the figures or the order in which the steps are described.

Additionally, various AR graphical user interfaces are described for operating the AR system 20. In many cases, the AR graphical user interfaces include graphical elements that are superimposed onto the user's view of the outside world or, in the case of a non-transparent display screen 28, superimposed on real-time images/video captured by the camera 29. In order to provide these AR graphical user interfaces, the processor 25 executes instructions of the AR graphics engine 34 to render these graphical elements and operates the display 28 to superimpose the graphical elements onto the user's view of the outside world or onto the real-time images/video of the outside world. In many cases, the graphical elements are rendered at a position that depends upon positional or orientation information received from any suitable combination of the sensors 30 and the camera 29, so as to simulate the presence of the graphical elements in real-world the environment. However, it will be appreciated by those of ordinary skill in the art that, in many cases, an equivalent non-AR graphical user interface can also be used to operate the freehand interactive AR application authoring program 33, such as a user interface and display provided on a further computing device such as laptop computer, tablet computer, desktop computer, or a smartphone.

Moreover, various user interactions with the AR graphical user interfaces and with interactive graphical elements thereof are described. In order to provide these user interactions, the processor 25 may render interactive graphical elements in the AR graphical user interface, receive user inputs from, for example via gestures performed in view of the one of the camera 29 or other sensor, or from a physical user interface, and execute instructions of the freehand interactive AR application authoring program 33 to perform some operation in response to the user inputs.

Finally, various forms of motion tracking are described in which spatial positions and motions of the user or of other objects in the environment are tracked. In order to provide this tracking of spatial positions and motions, the processor 25 executes instructions of the freehand interactive AR application authoring program 33 to receive and process sensor data from any suitable combination of the sensors 30 and the camera 29, and may optionally utilize visual and/or visual-inertial odometry methods such as simultaneous localization and mapping (SLAM) techniques.

Figure 4:
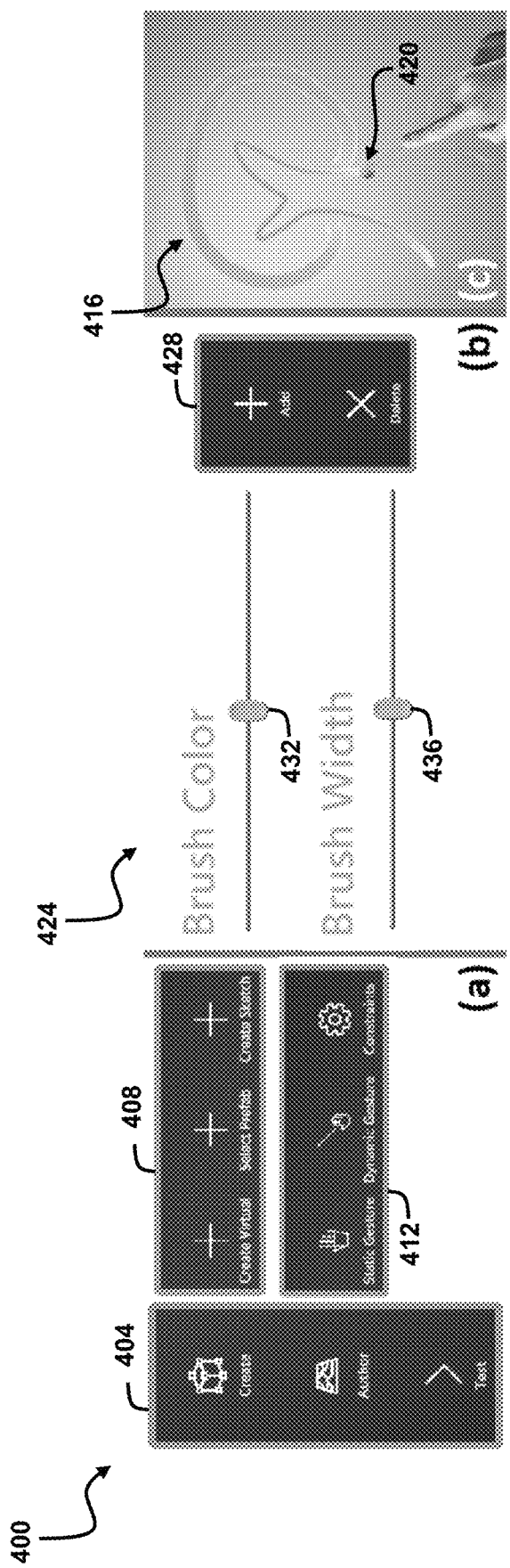
FIG. 4 shows user interface elements of the AR application authoring system.

In at least some embodiments, the AR graphical user interfaces include an interactive menu via which the user can navigate between the modes of the AR system 20 and utilized the available functionality of each mode. FIG. 4 shows, in illustration (a), an exemplary menu 400 for navigating between the Creation Mode, the Authoring Mode, and the Play Mode of the AR system 20. In some embodiments, the menu 400 is a floating menu that superimposed upon environment within the AR graphical user interfaces and may, for example, float next to a left hand or non-dominant hand of the user. The menu 400 has a main menu column 404 with menu options for navigating between the three modes. Additionally, the menu 400 has sub-menu rows 408 and 412, which include menu options corresponding to the Creation Mode and the Authoring Mode, respectively. The sub-menu row that does not belong to the current mode will be hidden.

Creation Mode

In response to the user selecting the "Create" option in the main menu column 404 of the menu 400, the AR system 20 enters the Creation Mode and displays corresponding AR graphical user interfaces on the display 28. The AR graphical user interfaces of the Creation Mode enable the user to create, modify, and view virtual assets, such as virtual objects, that can be interacted with in a freehand interactive AR application. In particular, in the Creation Mode, users can create virtual objects by scanning a real-world object using the AR system 20, by sketching a virtual drawing in mid-air, or by importing a 3D model from a data source. Additionally, in the Creation Mode, users can connect two or more virtual objects with virtual joints to create complex virtual systems or complex virtual objects. Finally, in the Creation Mode, users can view, modify, and arrange the virtual assets that they have created. These features and functions that are available to the user in the Creation Mode are described in greater detail below.

With reference to FIG. 3, in the Creation Mode, the workflow 300 may include scanning a real-world object to create a virtual object (block 304). Particularly, the processor 25 is configured to operate and received data from one or more of the camera 29 and the sensors 30 scan a real-world object 12 and generate a virtual object representing the real-world object 12. In at least one embodiment, the processor 25 is configured to generate a model, in particular a polygon mesh model, for the virtual object based on photometric image data received from the camera 29 of the real-world object 12 and based on geometric data received from the sensors 30 or derived using visual and/or visual-inertial odometry methods such as SLAM based on sensor data received from the camera 29 and the sensors 30.

In at least one embodiment, in response to the user selecting the "Create Virtual" option in the sub menu row 408 of the menu 400, the processor 25 begins a scanning process. During the scanning process, in at least one embodiment, the user can touch a surface of the real-world object 12 with his or her finger to direct the scanning process. Particularly, the processor 25 tracks a position of the hand of the user (e.g., a right hand or dominant hand of the user) or a position of a particular finger (e.g., index finger on the right hand or dominant hand of the user). As the user moves his or her hand or finger along or near a surface of the real-world object, the processor 25 scans the region of the real-world object 12 that is near the position of the hand or finger, and adds corresponding information (e.g., pieces of the polygon mesh) to the model of the virtual object.

In some embodiments, prior to the scanning process, the processor 25 automatically scans the entire environment and builds a polygon mesh model of the entire environment. The processor 25 generates and stores the polygon mesh model of the environment with the real-world environment, but does not display the model to the user in the AR graphical user interface. Then, as the user moves his or her index finger near the real-world object 12, the processor 25 reveals, in the AR graphical user interface, the polygon meshes that intersect with a region (e.g., a small spherical region) around the user's index finger tip. As polygon meshes are revealed, the processor 25 adds the revealed polygon meshes to the model for the virtual object that is being created. In one embodiment, the processor 25 renders the virtual spherical scanning tip positioned at a tip of the index finger of the user's right hand to provide a visual reference for the region of the polygon mesh that is revealed as the user moves his or her finger along the real-world object 12.

Figure 5A:
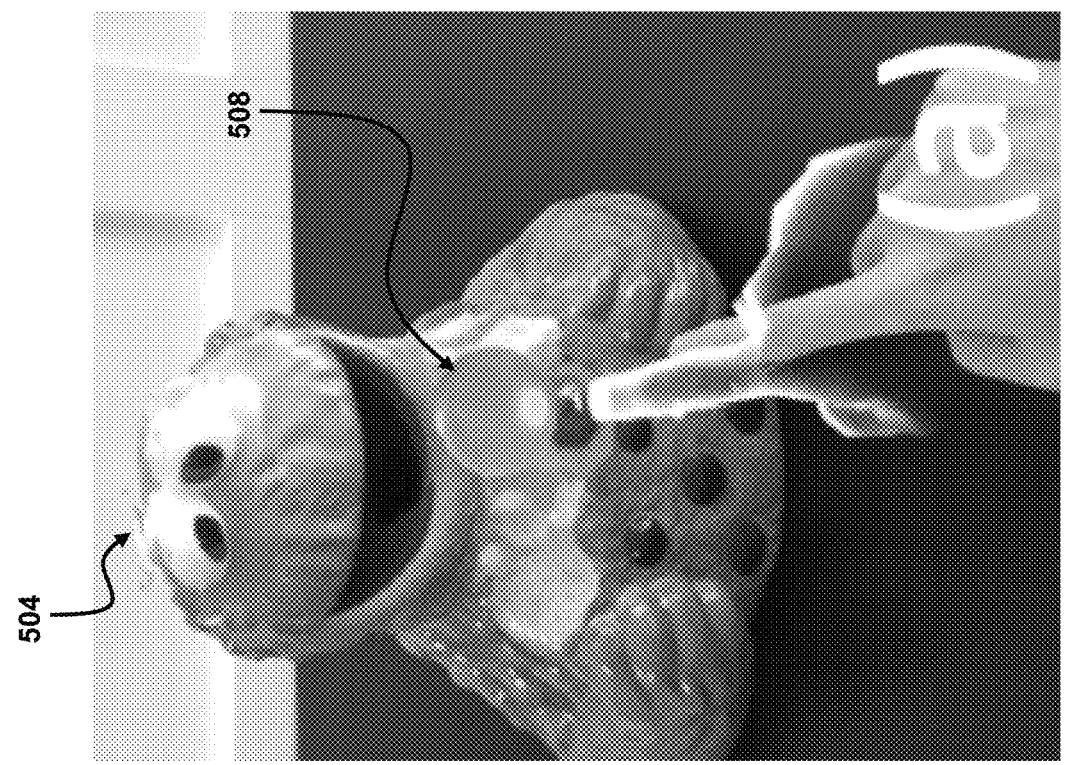
FIGS. 5A-E show the creation of an interactive virtual monster using the AR application authoring system.

FIGS. 5A-E shows the creation of an interactive virtual monster using the AR application authoring system 10. In FIG. 5A, an environment is illustrated which includes a real-world object, in particular a toy monster 504. In the AR graphical user interface, a spherical scanning tip 508 is rendered and positioned at a tip of the index finger of the user's right hand. As the user moves his or her finger along the surface of the toy monster 504, polygon meshes are revealed in the AR graphical user interface to indicate the portions of the toy monster 504 that have been scanned. In at least some embodiments, by way of interactions with the AR graphical user interface, the user can also delete portions of the scanned polygon mesh model for the virtual object, in case an error was made, and can rescan corresponding sections of the toy monster 504.

Returning to FIG. 3, in the Creation Mode, the workflow 300 may include sketching a virtual drawing to create a virtual object (block 308). Particularly, during a sketching process, the processor 25 is configured to track a hand of the user as he or she sketches a drawing in mid-air in the environment, and generate a virtual object representing the drawing based on the path of the hand as he or she sketched the drawing in mid-air.

In at least one embodiment, in response to the user selecting the "Create Sketch" option in the sub menu row 408 of the menu 400, the processor 25 begins a sketching process. During the sketching process, the processor 25 tracks a position of the hand of the user (e.g., a right hand or dominant hand of the user) or a position of a particular finger (e.g., index finger on the right hand or dominant hand of the user). As the user moves his or her hand or finger through the air, the processor 25 displays, in the AR graphical user interface, a virtual marking superimposed in the environment along the path of the user's hand or finger. In at least one embodiment, the processor 25 renders, in the AR graphical user interface, a virtual brush tip 420 positioned at a tip of the index finger of the user's right hand to provide a visual reference for the region that is to be marked. When the user has finished sketching, the processor 25 generates a virtual object representing the drawing based on the path of the hand as he or she sketched the drawing in mid-air. FIG. 4 shows, in illustration (c), shows an AR graphical user interface including a virtual object 416 superimposed upon the environment that represents a drawing that was sketched by the user. As can be seen, the AR graphical user interface includes the virtual brush tip 420 positioned at a tip of the index finger of the user's right hand.

FIG. 4 further shows, in illustration (b), the menu 424 for sketching drawings in mid-air. In some embodiments, the menu 424 is a floating menu that superimposed upon environment within the AR graphical user interfaces and may, for example, float next to a right hand or dominant hand of the user. By pressing the "add" option of the sub-menu column 428, the user can begin tracing a portion of a drawing. By pressing the "delete" option of the sub-menu column 428, the user can delete a portion of a drawing. In one embodiment, the user deletes a portion from a drawing by first selecting the portion by touching it with his or her hand. Once selected, the portion will be highlight (e.g., with a red glow or outline) and the user can delete the selected portion by performing a "pinch" gesture with his or her hand. By adjusting a slider 432, the user can change a color of the sketch markings being drawn in the air. By adjusting a slider 436, the user can change a width of the sketches being drawn in the air.

Returning to FIG. 3, in the Creation Mode, the workflow 300 may include importing a 3D Model to create a virtual object (block 312). Particularly, the processor 25 is configured to import data of a 3D model from a data source and generate a virtual object based on the 3D model. In at least one embodiment, in response to the user selecting the "Select Prefab" option in the sub menu row 408 of the menu 400, the processor 25 displays a menu in the AR graphical user interface that enables the user to browse a selection of 3D models available at the data source, such as a plurality of 3D models for everyday objects or other commonly used objects for AR applications.

Finally, in the Creation Mode, the workflow 300 may include connecting virtual objects with virtual joints (block 316). Particularly, the processor 25 is configured to, based on user inputs received via the AR graphical user interfaces, generate virtual objects by joining two previously generated virtual objects with a virtual joint or connector. More particularly, in addition to simple rigid 3D models, the AR graphical user interfaces enable the user to build complex virtual assemblies or systems using mechanical constraints represented as virtual joints or connectors. The processor 25 receives user selections of two virtual objects and selection of a type of virtual joint that is to provide a mechanical constraint for the virtual assembly or system. The processor 25 receives user inputs indicating a positioning and/or attachment location of the virtual joint with respect to each of the virtual objects connected to the virtual joint. Based on these user inputs, the processor 25 defines the virtual assembly or system and renders the virtual objects of the virtual assembly or system according to predetermined mechanical constraints defined by each type of virtual joint or connector.

Figure 6:
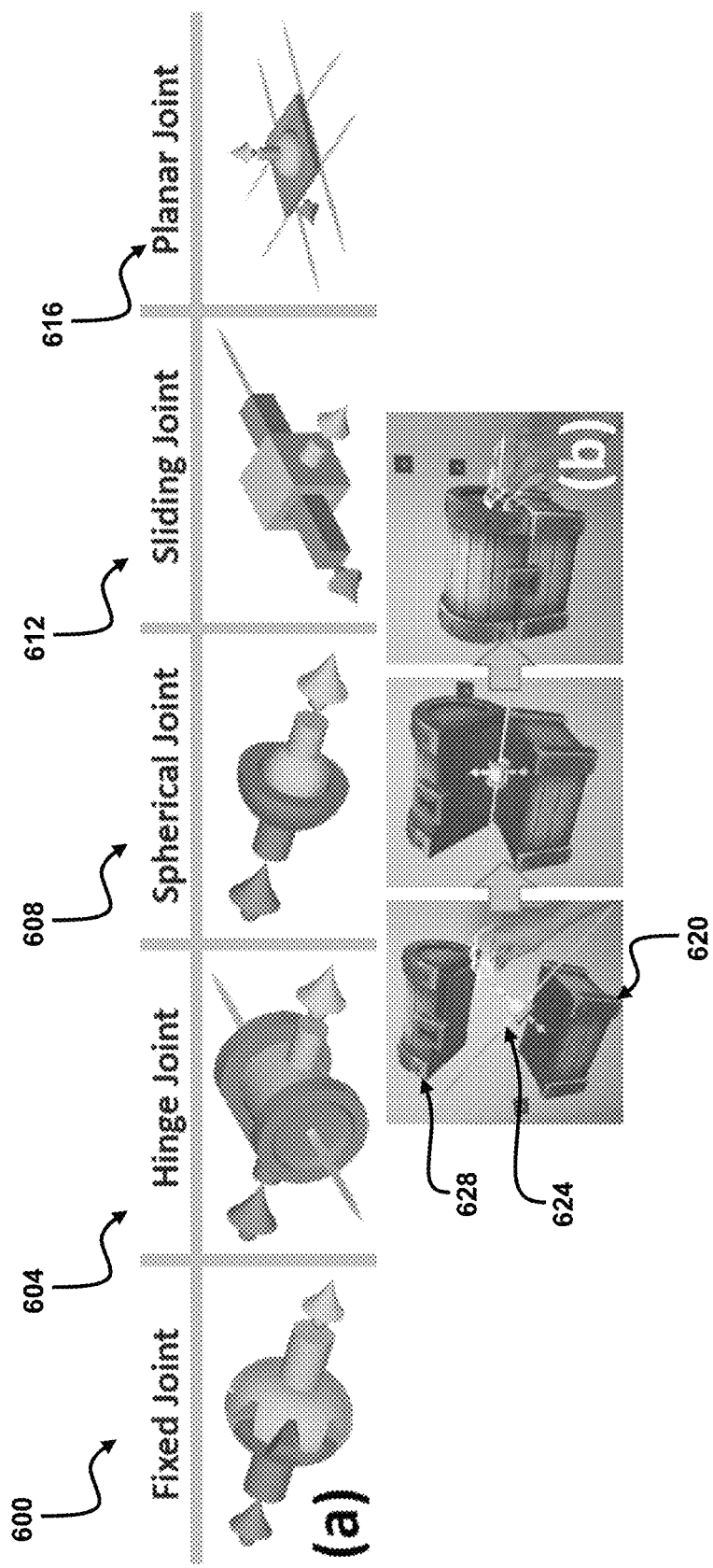
FIG. 6 shows complex assemblies having mechanical constraints built using virtual joints in the AR application authoring system.

FIG. 6 shows, in illustration (a), a plurality of exemplary virtual joints that can be used to interconnect virtual objects to create complex virtual assemblies and systems. In each case, the virtual joint defines mechanical constraint, such as a relative positional constraint and/or a relative orientational constraint, between two virtual objects. A fixed joint 600 connects two virtual objects such that they have a fixed relative position and orientation to one another. A hinge joint 604 connects two virtual objects such that they are hingedly connected to one another along a hinge axis, enabling one or both of the virtual objects to pivot about the hinge axis. A spherical joint 608 connects two virtual objects such that they maintain a constant distance from one another, but enabling one of the virtual objects to pan around the other virtual object in a spherical manner. A sliding joint 612 connects two virtual objects such that they maintain constant orientations relative to one another, but enabling one of the virtual objects to slide along a linear axis defined relative to the other of the virtual objects. A planar joint 616 connects two virtual objects such that they maintain constant orientations relative to one another, but enabling one of the virtual objects to slide along a plane defined relative to the other of the virtual objects.

FIG. 6 further shows, in illustration (b), an exemplary complex virtual assembly in the form of a virtual treasure chest. The virtual treasure chest is comprised of a virtual box 620 object connected by a hinge joint 624 to a virtual lid 628. To define the treasure chest, the user first connects the virtual box 620 and virtual lid 628 to the hinge joint 624, and arranges the three elements in the environment to define the spatial relationship between the three elements. The hinge joint 624 constrains the movement of the virtual lid 628 such that it may only pivot about the hinge axis defined along one of the top edges of the virtual box 620.

Authoring Mode

In response to the user selecting the "Author" option in the main menu column 404 of the menu 400, the AR system 20 enters the Authoring Mode and displays corresponding AR graphical user interfaces on the display 28. The AR graphical user interfaces of the Authoring Mode enable the user to define freehand gestures for interacting with the virtual objects, define animations and other actions for the virtual objects, and define interactions using the defined gestures, animations, and actions. Particularly, in the Authoring Mode, users can define gestures by embodied demonstration of those gestures. Additionally, in the Authoring Mode, users can define animations for the virtual objects by recording a virtual manipulation of the virtual objects or by selecting predefined actions. Finally, in the Authoring Mode, users can define freehand interactions by pairing gestures or other predefined triggers with animations or other predefined actions. These features and functions that are available to the user in the Authoring Mode are described in greater detail below.

In the Authoring Mode, the AR system 20 enables an intuitive authoring experience and a minimized learning curve by providing a trigger-action programming model reflecting the inputs and outputs of the freehand interactions. To this end, the Authoring Mode provides users with two conceptual primitives: triggers and actions. In order to design an interaction for an freehand interactive AR application, the user pairs at least one trigger with at least one action. In the illustrated exemplary AR graphical user interfaces, a visual programming interface represents triggers as a solid triangle and represents actions a hollow triangle, as shown in the visual programming interface 108 of illustration (b) of FIG. 1A.

A trigger is an event that is can be detected in the Play Mode and which provides particular information to one or more associated actions when detected. An action receives information from the associated trigger when it is detected and causes virtual assets of the freehand interactive AR application to perform a responsive animation, behavior, or the like based on the received information. Typically, there are two kinds of information: a signal (for a discrete output interaction) and value (for continuous output interaction). A trigger or action can emit or receive both types of the information.

Figure 7:
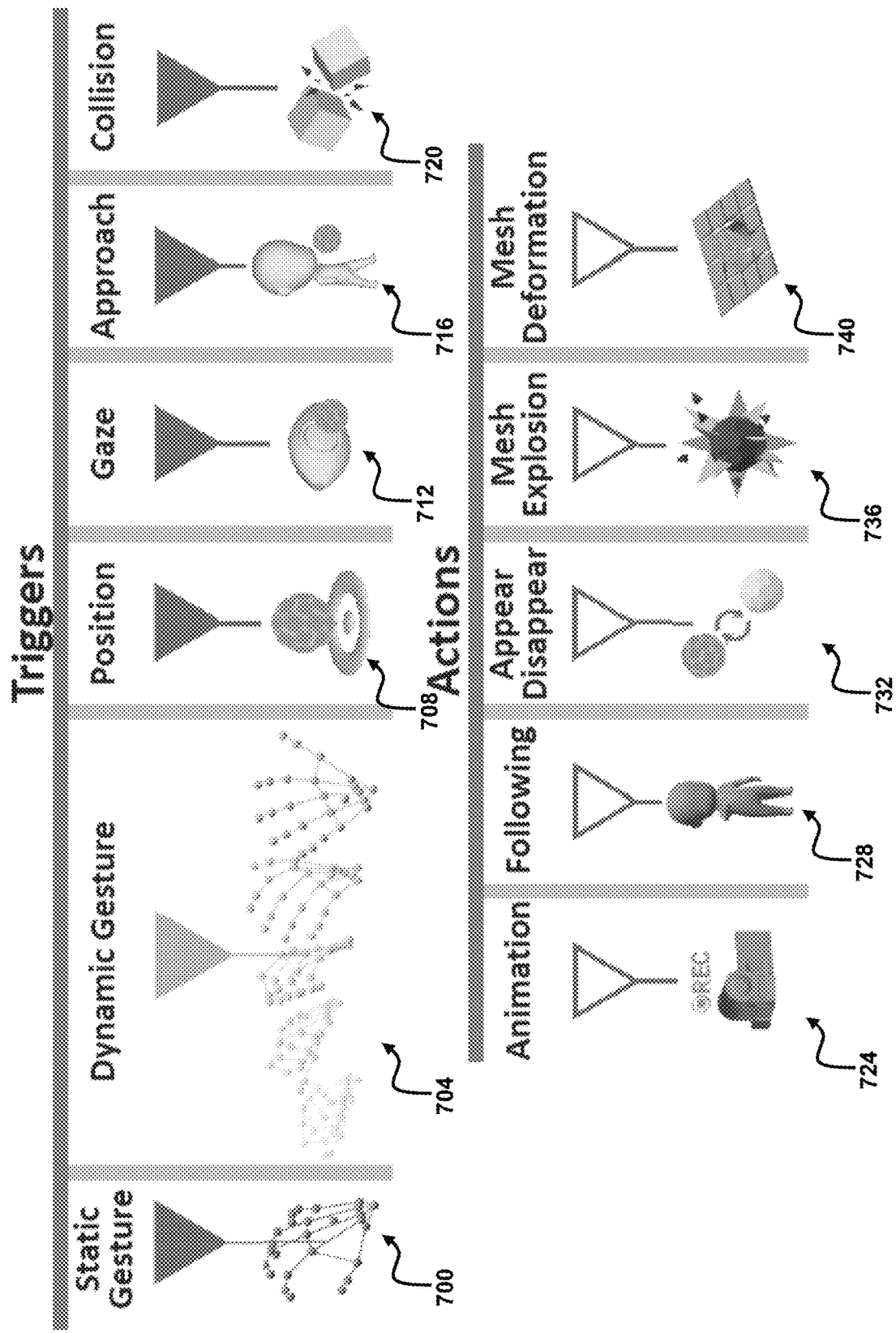
FIG. 7 shows an exemplary set of the triggers and actions supported by the AR application authoring system.

FIG. 7 summarizes the various types of triggers and actions that can be used to program interactions for the freehand interactive AR application in the Authoring Mode. Firstly, the Authoring Mode enables the user to define two types of freehand gestures by demonstration: static gestures 700 and dynamic gestures 704. A static gesture 700 is a gesture in which one or both hands of the user assume a particular hand pose. In functioning as a trigger, a static gesture 700 provides both (1) a signal having a true or false value indicating whether the static gesture 700 is currently being performed and (2) a value indicating a transformation of the hands, i.e., a change in position and orientation since the static gesture was initially performed. In contrast, a dynamic gesture 704 is a gesture in which one or both hands of the user perform a particular sequence of hand poses over time. In functioning as a trigger, a dynamic gesture 704 provides both (1) a signal having a true or false value indicating whether the dynamic gesture 704 is currently being performed and (2) a value (e.g., between 0 and 1) indicating a progress of dynamic gesture 704, i.e., a progress through the particular sequence of hand poses.

In addition to freehand gestures, the Authoring Mode also provides several predefined triggers that can be selected by the user. Particularly, a position trigger 708 provides a signal having a true or false value indicating whether a particular virtual object is located a particular position in the environment. A gaze trigger 712 provides a signal having a true or false value indicating whether the user is gazing at a particular virtual object. An approach trigger 716 provides a signal having a true or false value indicating whether a distance between the user and a particular virtual object is less than a particular threshold. A collision trigger 720 provides a signal having a true or false value indicating whether a particular virtual object intersects with another particular virtual object.

The Authoring Mode enables the user to define an animation action 724 for virtual objects by recording a manipulation of the virtual object. In functioning as an action paired with a trigger, the animation action 724 receives one or both of a signal that starts playing the animation for a particular virtual object and a value that controls a progress of the animation for a particular virtual object.

In addition to recorded animations, the Authoring Mode also provides several predefined actions that can be selected by the user. Particularly, a following action 728 receives a value from a trigger indicating the transformation of the user's hands or of another virtual object and causes a particular virtual object to maintain a constant relative transformation and/or pose with respect to the user's hands or the other virtual object, so as to "follow" the user's hands or the other virtual object. An appear/disappear action 732 receives a signal from a trigger indicating that some triggering event has occurred and causes a particular virtual object to appear in the environment or disappear from the environment. A mesh explosion action 736 receives a signal from a trigger indicating that some triggering event has occurred and causes a particular virtual object to explode or disintegrate using a predefined explosion or disintegration animation. A mesh deformation action 740 receives a signal from a trigger indicating that some triggering event has occurred and causes a particular virtual object to deform in a predefined or user defined manner The trigger-action programming model of the Authoring Mode defines an interaction depending on two components, an input that is initiated by a subject of the interaction, and an output that is generated by an object of the interaction in response to the input. Generally, the input is a hand gesture or a signal from a predefined trigger and the output is the animation or other predefined behavior of a particular virtual object. The Authoring Mode utilizes two types of input and two types of output. Particularly, the two types of input include (1) Static input, which is a specific state of the hands, including hand pose, position, direction and handedness, and (2) Dynamic input, which is a time series of hand states. Additionally, the two types of output include (1) Discrete output, which responds right after the gesture completion, and (2) Continuous output, which responds during the gesture. Therefore, the Authoring Mode enables four categories of AR interactions, which are summarized in the Table 1:

TABLE 1

| input | output | |
|---|---|---|
| | Discrete | Continuous |
| Static | static-provoking | manipulating |
| Dynamic | dynamic-provoking | synchronous |

In the Authoring Mode, an interaction is valid once the selected trigger and action send and receive the same type of information. To ensure valid authoring, the AR system 20 rejects connections between the mismatched triggers and actions. It should also be appreciated that the Authoring Mode enables users can connect multiple actions to one trigger to activate them together or connect multiple triggers to one action so that every trigger can activate the same action.

The type of the interaction is decided by the particular combination. For example, a static gesture trigger 700 combined with a following action 728 yields a manipulating interaction. A static gesture trigger 700, a position trigger 708, a gaze trigger 712, an approach trigger 716, or a collision trigger 720 combined with an animation action 724, an appear/disappear action 732, a mesh explosion action 736, or a mesh deformation action 740 yields to a static provoking interaction. A dynamic gesture trigger 704 combined with an appear/disappear action 732, a mesh explosion action 736, or a mesh deformation action 740 yields to a dynamic-provoking interaction. Finally, a dynamic gesture trigger 704 combined with an animation action 724 yields either a dynamic provoking interaction or a synchronous interaction. As will be described in greater detail below, a synchronous interaction is defined if the dynamic gesture trigger 704 is created after and in relation to the animation action 724, and a dynamic-provoking interaction is defined if the dynamic gesture trigger 704 is created independently of the animation action 724.

Figure 5B:
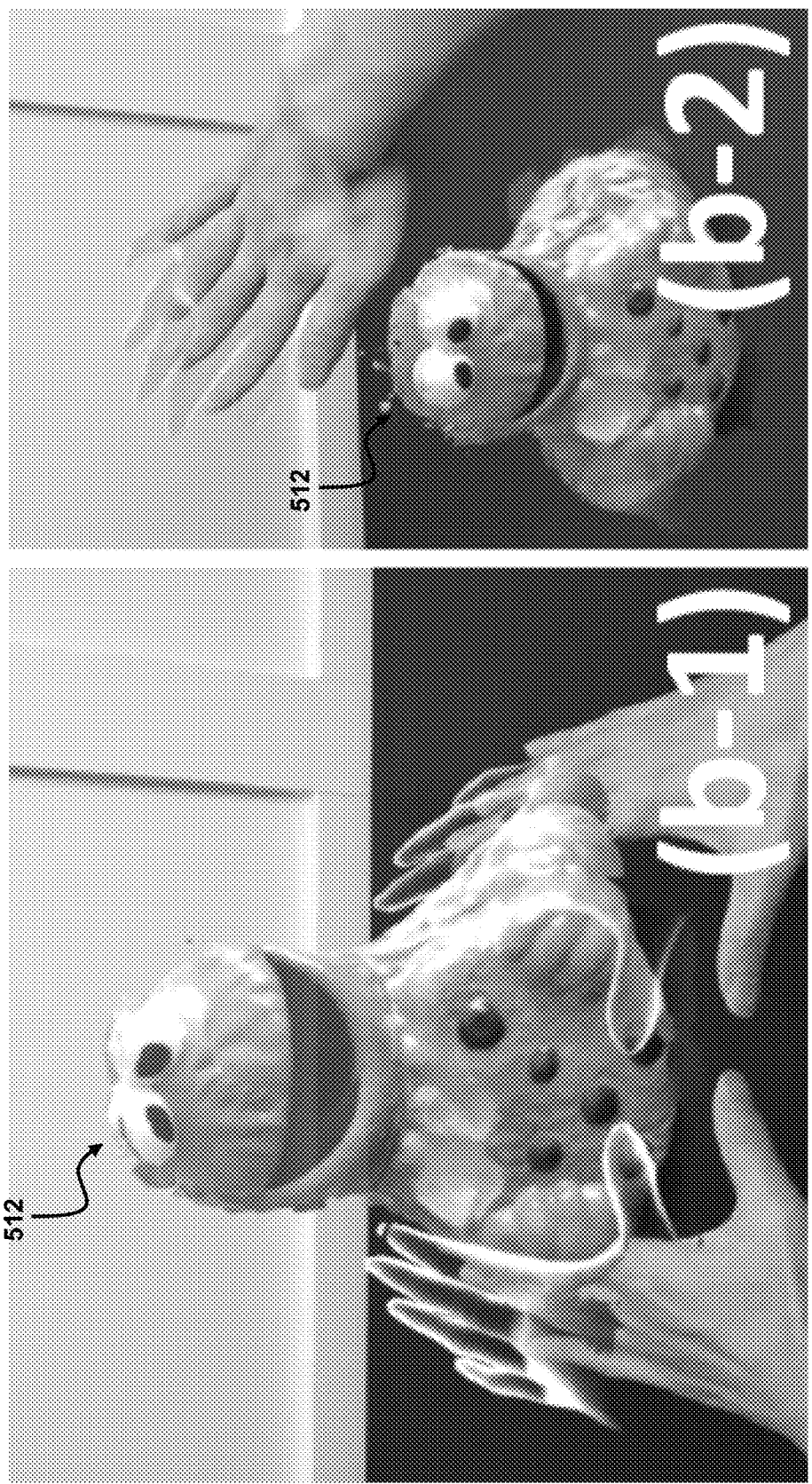

Returning to FIG. 3, in the Authoring Mode, the workflow 300 may include defining static or dynamic gesture(s) by recording demonstrations (block 320). In the Authoring Mode, the processor 25 renders, in the AR graphical user interfaces, graphical representations of the virtual objects or other assets created in the Creation Mode, superimposed on the environment. With these virtual objects or other assets as visual, spatial, and temporal references, the user can define static gestures and dynamic gestures by embodied demonstration in view of the camera 29 and/or other sensors 30. With reference to FIG. 5B, the illustration (b-1) shows a user demonstrating a static "two-hand holding" gesture with respect to a virtual monster 512 that was previously generated by scanning the toy monster 504. Similarly, the illustration (b-2) shows the user demonstrating a dynamic "patting head" gesture with respect to the virtual monster 512.

During a demonstration of a hand gesture by the user, the processor 25 operates the camera 29 and/or other sensors 30 to record sensor data in the environment and defines the hand gesture on based on the recorded sensor data from the camera 29 and/or other sensors 30, using a hand tracking algorithm. The processor 25 defines a static gesture as a particular hand pose (i.e., a particular position and orientation of the user's hand). Likewise, the processor 25 defines a dynamic gesture as a particular sequence of hand poses over time.

Figure 8A:
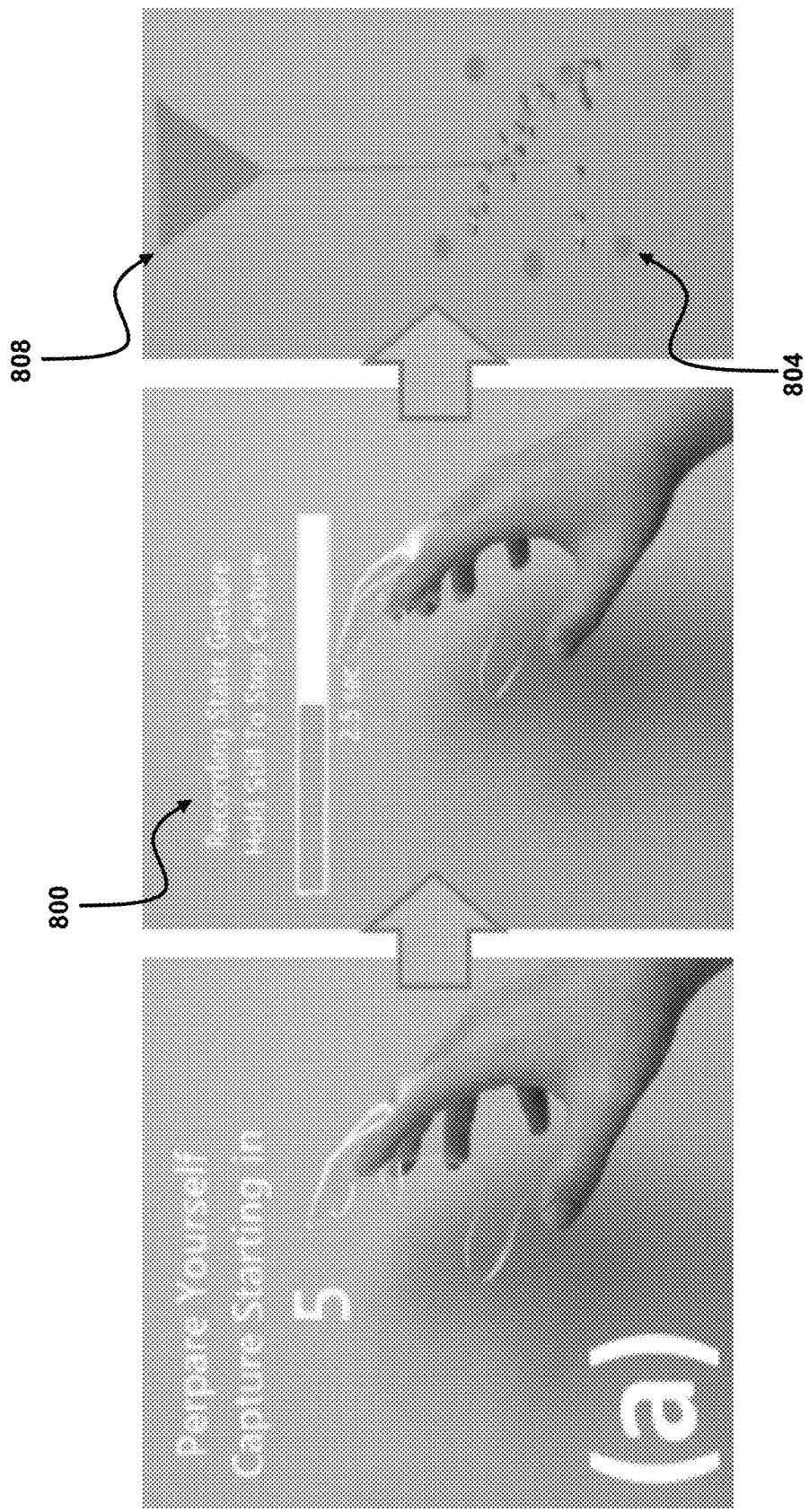
FIG. 8A-D show processes for demonstrating hand gestures using the AR application authoring system.

FIG. 8A illustrates the process of demonstrating a static hand gesture in greater detail. In response to the user selecting the "Static Gesture" option in the sub-menu row 412 of the menu 400, the processor 25 begins a static gesture demonstration process. During demonstration process, the processor 25 operates the camera 29 and/or other sensors 30 to capture a plurality of measurement samples. The processor 25 detects that a hand of the user has remained still during the demonstration for a predetermined threshold amount of time and defines the static hand gesture according to the pose of the hand of the user with which the hand remained still for the threshold amount of time. In the illustrated example, after the demonstration process begins, the user may be provided a period of time (e.g., 5 seconds) to prepare before demonstrating the hand pose of the static gesture, as shown in the illustration on the left of FIG. 8A. The user holds his or her hand in the same pose for the threshold amount of time (e.g., 2 seconds), as shown in the middle illustration. In one embodiment, the AR graphical user interface displays a visual indicator, such as a progress bar 800, that indicates the progress of the threshold amount of time to complete the demonstration. The progress bar 800 resets if the user moves his or her hand before the threshold amount of time has elapse and restarts once the user holds his or her hand still in a desired pose. Finally, as shown in the illustration on the right, the AR graphical user interface displays a graphical representation of the static gesture 804 in the form of skeleton model that shows the positions and orientations of key joints of the hand that define the hand pose of the static gesture. Additionally, the static gesture is annotated with a solid triangle 808 to indicate that it is a trigger.

Figure 8B:
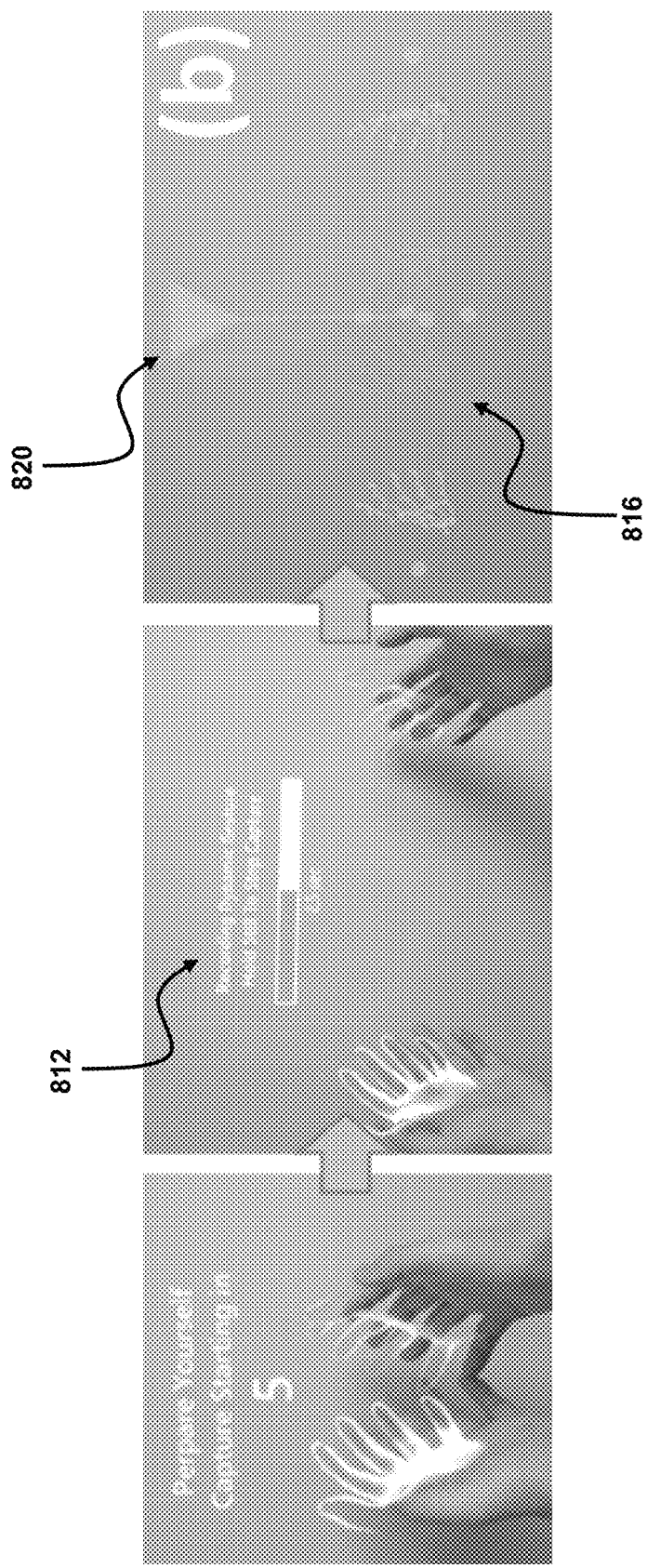

FIG. 8B illustrates the process of demonstrating a dynamic hand gesture in greater detail. In response to the user selecting the "Dynamic Gesture" option in the sub-menu row 412 of the menu 400, the processor 25 begins a dynamic gesture demonstration process. During demonstration process, the processor 25 operates the camera 29 and/or other sensors 30 to capture a plurality of measurement samples. The processor 25 detects that a hand of the user has remained still during the demonstration for a predetermined threshold amount of time and defines dynamic hand gesture as the motions of the hand performed prior to the hand remaining still for the threshold amount of time. To arrive at the sequence of hand poses that comprise the dynamic gesture, the processor 25 removes the measurement samples corresponding to the hand remaining still for the threshold amount of time. In the illustrated example, after the demonstration process begins, the user may be provided a period of time (e.g., 5 seconds) to prepare before demonstrating the hand motions of the dynamic gesture, as shown in the illustration on the left of FIG. 8B. The user moves his or her hand through the environment to demonstrate the dynamic hand gesture and stops the demonstration by holding his or her hand in the same pose for the threshold amount of time (e.g., 2 seconds), as shown in the middle illustration. In one embodiment, the AR graphical user interface displays a visual indicator, such as a progress bar 812, that indicates the progress of the threshold amount of time to stop the demonstration. Finally, as shown in the illustration on the right, the AR graphical user interface displays a graphical representation of the dynamic gesture 816 in the form of skeleton model that shows the positions and orientations of key joints of the hand that define the sequence of hand poses over time of the dynamic gesture. Additionally, the dynamic gesture is annotated with a solid triangle 820 to indicate that it is a trigger.

As noted above, upon completion of the demonstration, a skeleton model of the hand gesture is displayed as the trigger object of the demonstrated gesture. This skeleton model also serves to represent the position and detection range of the demonstrated gesture. The Authoring Mode enables the user to move skeleton model or resize its detection area, as shown in the FIG. 8D. Particularly, in response to the user selecting the "Constraints" option in the sub-menu row 412 of the menu 400, the AR graphical user interfaces display a bounding box 824 for one of more the defined gestures. The bounding box 824 has virtual handles 828 on each surface thereof, which can be "grabbed" by the user (e.g., with a pinching gesture) to move, reorient, or resize the bounding box 824. For example, in one embodiment, the user can grab one or a pair of virtual handles 828 and reposition the bounding box 824 in the environment by moving his or her hand. Additionally, the user can grab a one or a pair of virtual handles 828 on different sides of the bounding box 824 and adjust a corresponding dimension of the bounding box 824 by changing a distance between his or her hands. Similarly, while grabbing one or a pair of virtual handles 828, the user can rotate the bounding box 824 by rotating his or her hands. Thus, by interacting with the virtual handles 828 of the bounding box 824, the user can move skeleton model or resize its detection area. The gesture will only be detected when the hand enters the bounding box to prevent false positive detection. Additionally, users can set the bounding box 824 to have a fixed position and orientation relative to a particular virtual object, to have a fixed position and orientation in the world coordinate space, or to have a fixed position and orientation relative to the user.

In addition to demonstrating static and dynamic hand gestures, the user can select various predefined triggers from the same menus. Particularly, the processor 25 generates a predefined trigger in response to a user selection of the predefined trigger and user inputs configuring any parameters of the predefined trigger. As discussed above, in addition to hand gestures, the Authoring Mode provides predefined triggers including a position trigger, a gaze trigger, an approach trigger, and a collision trigger.

Returning to FIG. 3, the workflow 300 may include defining animation(s) for the virtual object(s) by recording manipulations or selecting predefined actions (block 324). Particularly, Authoring Mode also enables the user edit virtual object behaviors. For each virtual object, the AR graphical user interfaces displays all of the virtual object's possible behaviors (animation action, following action, etc.) in a nearby menu. A user can create corresponding actions in the AR graphical user interfaces by selecting the action from the menu.

Figure 5C:
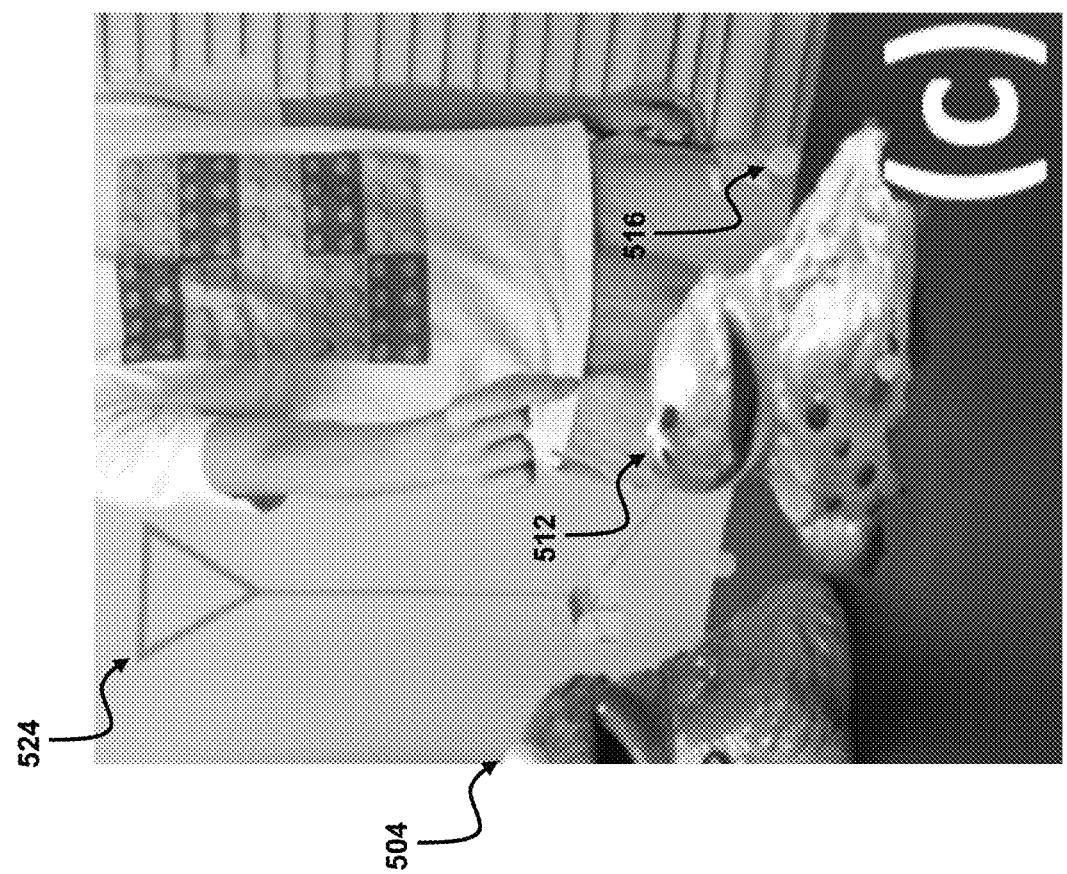

If the user selects an animation action, the AR graphical user interface enables the user to create an animation by directly moving, rotating or scaling the virtual object with hand manipulations. The processor 25 defines the animation action for the virtual object by recording user inputs that demonstrate a manipulation of the virtual object. FIG. 5C shows an exemplary AR graphical user interface for recording an animation by manipulating the virtual monster 512. Particularly, in the illustrated example, the user creates a "squashing" animation by scaling along the vertical axis of the virtual monster 512.

In the illustrated embodiment, the AR graphical user interface enables the user to demonstrate an animation by manipulating the virtual object using techniques similar to those of the bounding box 824, discussed above. Particularly, the AR graphical user interface displays virtual handles 516 around the virtual monster 512, which can be "grabbed" by the user (e.g., with a pinching gesture) to move, reorient, or resize the virtual monster 512. For example, in one embodiment, the user can grab one or a pair of virtual handles 516 and reposition the virtual monster 512 in the environment by moving his or her hand. Additionally, the user can grab a one or a pair of virtual handles 516 on different sides of the virtual monster 512 and adjust a corresponding dimension of the virtual monster 512 by changing a distance between his or her hands. Similarly, while grabbing a one or a pair of virtual handles 516, the user can rotate the virtual monster 512 by rotating his or her hands. Thus, by interacting with the virtual handles 516 of the bounding box 824, the user can manipulate the position, orientation, and dimension scaling of the virtual monster 512 to demonstrate an animation. In the example of FIG. 5C, the user grabs a top most virtual handle 516 and moves his or her hand down to demonstrate the "monster is squashed" animation action.

In addition to recording animations by demonstrating manipulations of the virtual objects, the user can select various predefined actions from the same menus. Particularly, the processor 25 associates a predefined action with a virtual object in response to a user selection of the predefined action and user inputs configuring any parameters of the predefined action. As discussed above, in addition to recorded animation actions, the Authoring Mode provides predefined actions including a following action, an appear/disappear action, a mesh explosion action, and a mesh deformation action.

Once hand gestures or other triggers have been have been defined and animations or other actions have been associated with particular virtual objects, the Authoring Mode enables the user to define the interactions using a visual programming interface within the AR graphical user interface. As noted above, in the illustrated exemplary AR graphical user interfaces, the visual programming interface represents triggers as a solid triangle and represents actions a hollow triangle, as shown in the visual programming interface 108 of illustration (b) of FIG. 1A. The last step of the authoring process is to connect the triggers and actions, which can be done simply in a drag-and-drop manner within the AR graphical user interface. For example, to make the connection, the user first pinches the solid triangle icon of a trigger and picks up a connection line from it. Then the user approaches the hollow triangle icon of an action and releases the fingers to drop the connection line on the hollow triangle. In one embodiment, once the user finishes connecting the triggers and actions, the AR graphical user interface color-codes the connection for each interaction with a different color to better visualize the logic.

Returning to FIG. 3, the workflow 300 may include associating a static input with a discrete output to define a static-provoking interaction (block 328). Static-provoking interactions are those in which virtual objects respond right after a static input is detected. As mentioned above, a static-provoking interaction can be defined by combining a Static input with a Discrete output. Thus, a static-provoking interaction can be formed using the visual programming interface of the AR graphical user interface to connect (1) a trigger, such as a static gesture trigger, a position trigger, a gaze trigger, an approach trigger, or a collision trigger, which provides a signal indicating that respective triggering event has occurred and (2) an action, such as animation action, an appear/disappear action, a mesh explosion action, or a mesh deformation action, which receives the signal indicating that respective triggering event has occurred.

In the example of FIG. 1B, illustration (d-1), a static-provoking interaction is shown in which the light bulb 112 glows after a user performs a two-handed holding gesture beneath it. To form this static-provoking interaction, a static "two-handed holding" gesture trigger is connected to a light bulb glowing animation action associated with the virtual light bulb 112.

The workflow 300 may include associating a dynamic input with a discrete output to define a dynamic-provoking interaction (block 332). Dynamic-provoking interactions are those in which virtual contents respond right after a dynamic input is detected. As mentioned above, a dynamic-provoking interaction can be defined by combining a Dynamic input with a Discrete output. Thus, a dynamic-provoking interaction can be formed using the visual programming interface of the AR graphical user interface to connect (1) a dynamic gesture trigger, which provides a signal indicating that the respective dynamic gesture has occurred and (2) an action, such as animation action, an appear/disappear action, a mesh explosion action, or a mesh deformation action, which receives the signal indicating that the respective dynamic gesture has occurred.

It should be noted that, a dynamic gesture trigger combined with an animation trigger only forms dynamic-provoking interaction if the dynamic gesture was defined independently of the animation. As will be discussed in greater detail below, if the dynamic gesture is defined after and in relation to the animation, then a synchronous interaction is formed.

In the example of FIG. 1B, illustration (d-3), a dynamic-provoking interaction is shown in which a user breaks the virtual soda can 120 by clenching his or her fist. To form this dynamic-provoking interaction, a dynamic "clenching fist" gesture trigger is connected to a mesh explosion action associated with the virtual soda can 120.

Figure 5D:
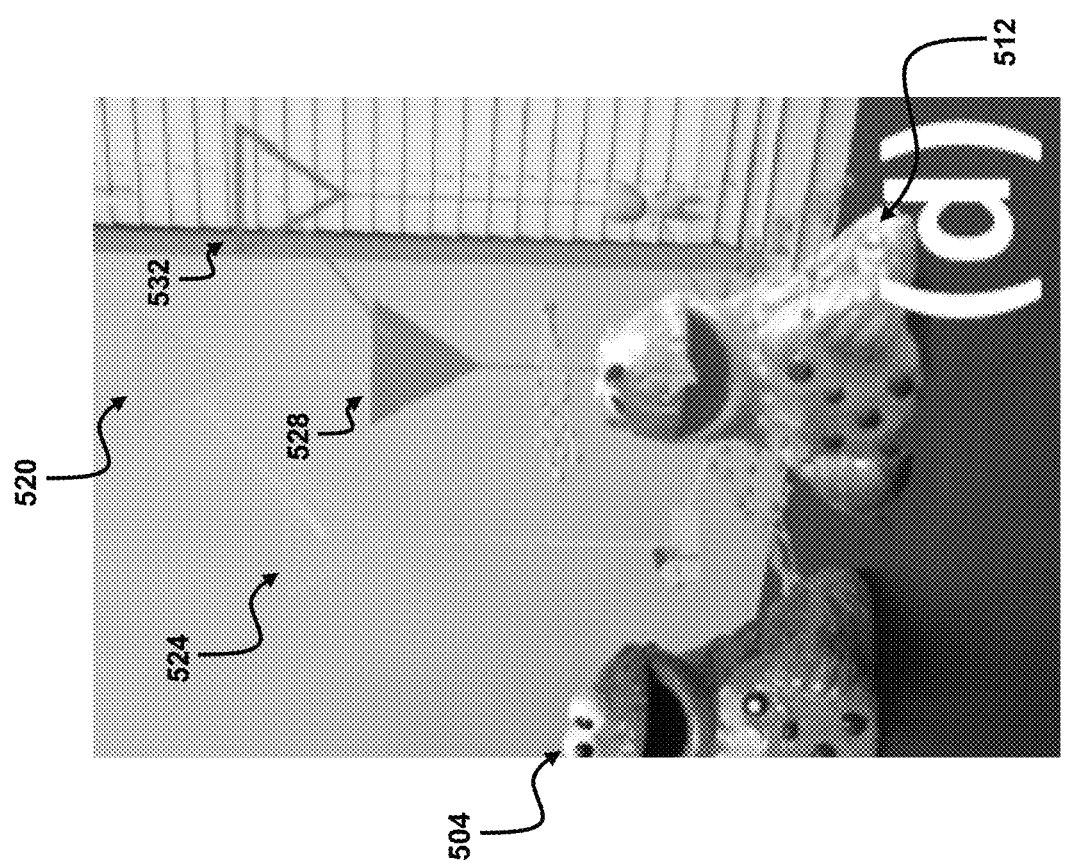
Figure 5E:
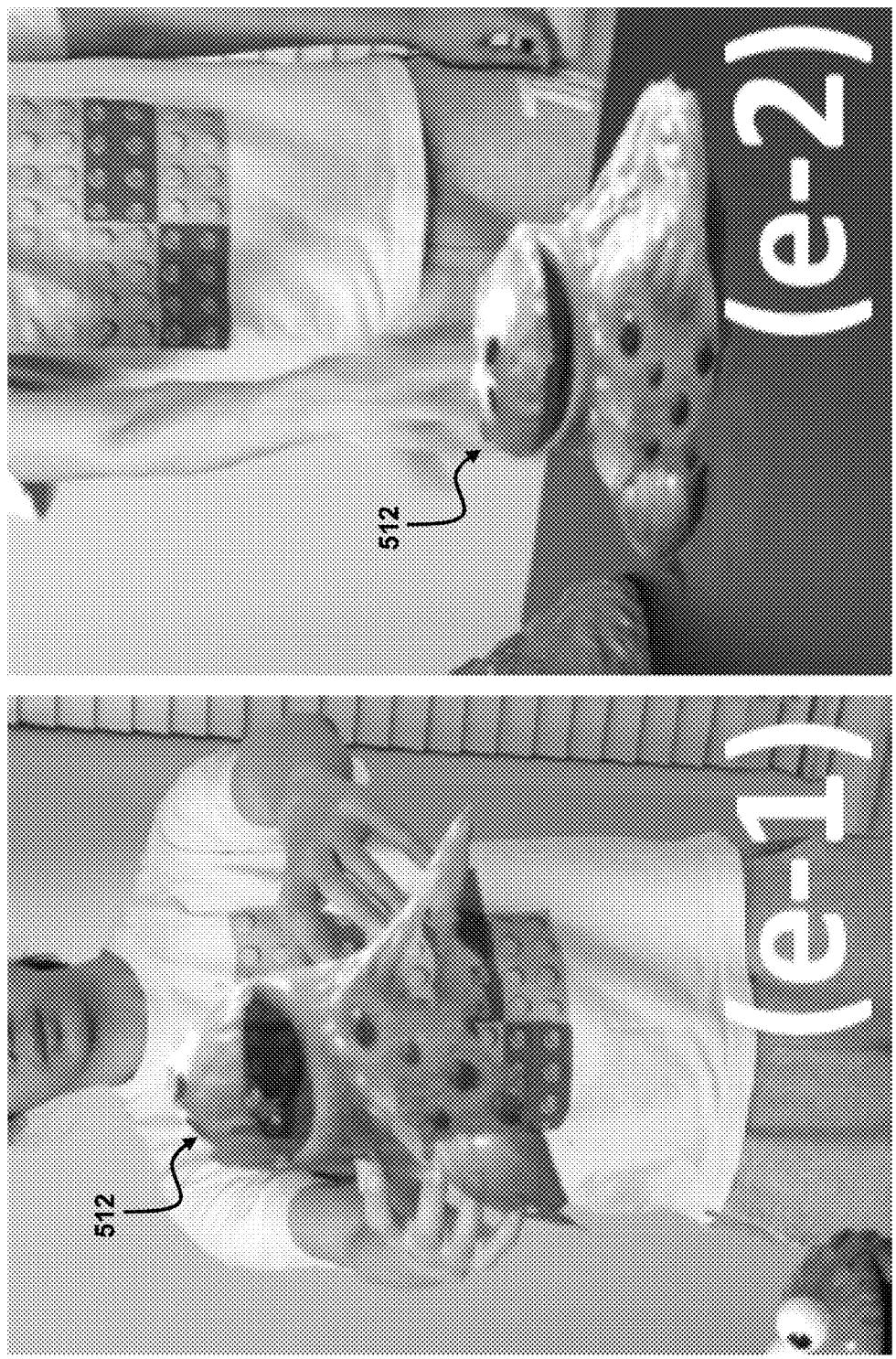

FIG. 5E shows, in illustration (e-1), another exemplary dynamic-provoking interaction in which the virtual monster 512 is squashed by a patting gesture. To form this dynamic-provoking interaction, a dynamic "patting head" gesture trigger 520 is connected to a "squashing" animation action 524 associated with virtual monster 512, as shown in FIG. 5D.

The workflow 300 may include associating a static input with a continuous output to define a manipulating interaction (block 336). Manipulating interactions are those in which virtual assets continuously react to a static input. The most common scenario, a virtual object maintains a constant relative transformation and/or pose with respect to the user's hands or the other virtual object, so as to "follow" the user's hands or the other virtual object. As mentioned above, a manipulating interaction can be defined by combining a Static input with a Continuous output. Thus, a manipulating interaction can be formed using the visual programming interface of the AR graphical user interface to connect (1) a static gesture trigger, which provides a value indicating the transformation of the user's hands or of another virtual object and (2) a following action, which receives the value indicating the transformation of the user's hands or of another virtual object.

In the example of FIG. 1A, illustration (c), an exemplary manipulating interaction is shown in which the virtual cup 104 is moved around by a holding gesture. To form this manipulating interaction, a static "one-hand holding" gesture trigger 112 is connected to a following action 116 associated with the virtual cup 104, as shown in FIG. 1A, illustration (b).

In the example of FIG. 1B, illustration (d-2), another exemplary manipulating interaction in which the virtual laptop lid of a virtual laptop 116 follows the user's hand while being constrained and rotating along a virtual hinge joint. To form this manipulating interaction, a static "one-hand holding" gesture trigger is connected to a following action associated with the lid of the virtual laptop 116.

FIG. 5E shows, in illustration (e-1), yet another exemplary manipulating interaction in which the virtual monster 512 is moved around by a holding gesture. To form this manipulating interaction, a static "two-hand holding" gesture trigger 528 is connected to a following action 532 associated with the virtual monster 512, as shown in FIG. 5D.

The workflow 300 may include associating a dynamic input with a continuous output to define a synchronous interaction (block 340). Synchronous interactions are those in which a virtual asset responds synchronously to a dynamic input, such resizing a virtual object with the distance between the hands. As mentioned above, a synchronous interaction can be defined by combining a Dynamic input is combined with a Continuous output. Thus, a synchronous interaction can be formed using the visual programming interface of the AR graphical user interface to connect (1) a dynamic gesture trigger, which provides a value indicating a progress of dynamic gesture, i.e., a progress through the particular sequence of hand poses, and (2) an animation action, which receives the value indicating a progress of the dynamic gesture.

In the example of FIG. 1B, illustration (d-4), a synchronous interaction is shown in which a user stretches the toy spring 124 using a pinching gesture. To form this synchronous interaction, a dynamic "pinching" gesture trigger is connected to a synchronous "stretching" animation action associated with the toy spring 124.

As noted above, a dynamic gesture trigger combined with an animation trigger only forms a synchronous interaction if the dynamic gesture is defined after and in relation to the animation. Otherwise, if the dynamic gesture was defined independently of the animation, then a dynamic-provoking interaction is formed.

To record an dynamic gesture in relation to an animation, the AR graphical user interface displays a previously recorded animation of a selected virtual object as a dynamic gesture is being demonstrated. The processor 25 records the demonstration of dynamic gesture during the displaying of the animation the virtual object and defines the dynamic hand gesture as the motions of the hand over time in relation to a progression of the animation of the virtual object over time. More particularly, as discussed in greater detail below, the processor 25 maps a key value of the dynamic gesture (e.g., a distance between hands and/or a progress of the dynamic gesture) to a progress of the animation.

Figure 8C:
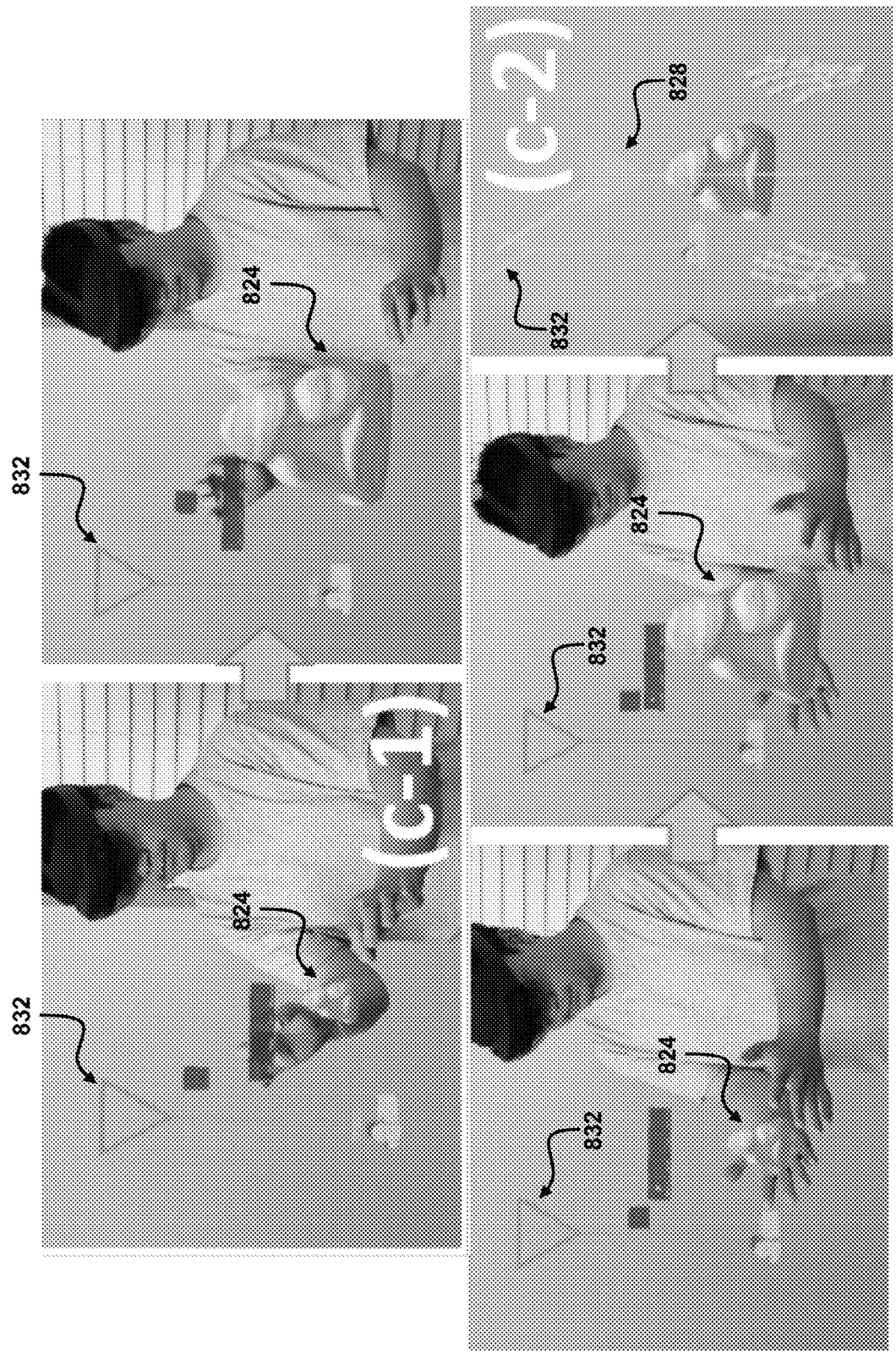

FIG. 8C shows a process for creating a synchronous interaction by defining a dynamic gesture in relation to an animation after the animation has been recorded. Particularly, as shown in the illustration (c-1), the user first creates a "rock scaling" animation 832 of a virtual rock 824, using the same process discussed above with respect to block 324. Next, as shown in the illustration (c-2), the user demonstrates a dynamic gesture by aligning the hands with the size of the virtual rock 824 as the "rock scaling" animation 832 is animated. The processor 25 pairs a key value of the dynamic gesture (i.e., the distance between the hands) to the progress of the rock scaling animation 832. The user connects the dynamic gesture trigger 828 to the "rock scaling" animation action 832 to form a synchronous interaction that enables the user to synchronously control the size of the rock with both hands.

Play Mode

In response to the user selecting the "Test" option in the main menu column 404 of the menu 400, the AR system 20 enters the Play Mode and displays corresponding AR graphical user interfaces on the display 28. The AR graphical user interfaces of the Play Mode enable the user to test the authored the freehand interactive AR application, including the defined interactions. Particularly, in the Play Mode, the user can try out the programmed AR interactions on-the-fly. In the Play Mode, the AR system 20 tracks each the triggers authored by the user. Associated actions are activated when any connected trigger is detected. Moreover, in Play Mode, all the trigger and action icons of the visual programming interface are hidden, while the skeleton hand models are left as visual hints to the user of the defined gestures included in the freehand interactive AR application. These features and functions that are available to the user in the Play Mode are described in greater detail below.

With reference to FIG. 3, the workflow 300 includes rendering, in the AR interface, performance of animations or manipulations in response to real-time performance of associated gestures (bock 344). Particularly, the processor 25 displays, in the AR graphical user interface on the display 28, an animation or manipulation of a virtual object in response to or synchronously with detecting a real-time performance of the defined hand gesture in a defined region, or in response to detecting another trigger that was associated with the particular animation or manipulation.

To perform a static-provoking interaction, the processor 25 provides a triggering signal in response to detecting a real-time performance of a hand gesture in which the hand of the user has the static pose of the associated static hand gesture or in response to detecting an associated predefined trigger. In response to the triggering signal, the processor 25 causes the associated animation or other action of the virtual object to be displayed in the AR graphical user interface on the display 28.

To perform a dynamic-provoking interaction, the processor 25 provides a triggering signal in response to detecting a real-time performance of a hand gesture in which the hand of the user has the dynamic sequence of poses over time of the associated dynamic hand gesture or in response to detecting an associated predefined trigger. In response to the triggering signal, the processor 25 causes the associated animation or other action of the virtual object to be displayed in the AR graphical user interface on the display 28.

To perform a manipulating interaction, the processor 25 detects a real-time performance of a hand gesture in which the hand of the user has the static pose of the associated static hand gesture and determines a value indicating a transformation of the hand of the user while the hand of the user maintains the static pose of the associated static hand gesture. Based the determined value, the processor 25 causes the virtual object to be displayed in the AR graphical user interface on the display 28 so as to maintain a constant pose relative to the hand of the user, so as to appear to "follow" the user's hand while he or she performs the static hand pose.

To perform a synchronous interaction, the processor 25 detects a real-time performance of a hand gesture in which the hand of the user has the dynamic sequence of poses over time of the associated dynamic hand gesture and determines a value indicating a progression of the hand through defined dynamic sequence of poses. Based the determined value, the processor 25 causes the virtual object to be displayed in the AR graphical user interface on the display 28 such that the animation of the virtual object progresses synchronously with the progression of the hand through defined dynamic sequence of poses, based on the value.

The AR application authoring system 10 incorporates a real-time hand gesture detection algorithm for detecting detects a user's hand gesture for recognition of static gesture triggers and dynamic gesture triggers, as well as extracting key values from dynamic gestures in synchronous interactions in Play Mode. The processor 25 detects the position and pose of the hand, in the form of hand joints data, based on images captured in real-time by the camera 29. In at least one embodiment, as seen in illustration (a) of FIG. 9, the processor 25 utilizes ten hand joint angles for hand pose detection. Since the hand poses are commonly performed by bending different fingers, the processor 25 uses the bending angles of the hand joint data, in addition to the positions of the hand joints. In one embodiment, the processor 25 performs the hand tracking using a native API provided by the AR-HMD 23 (e.g., API 1 from Microsoft's HoloLens). The processor 25 detects a static gesture based on the position and pose of the hand. For instance, a user can only grab a cup when the hand approaches the handle and performs the grabbing pose, as seen in illustration (c) of FIG. 1A.

Figure 9:
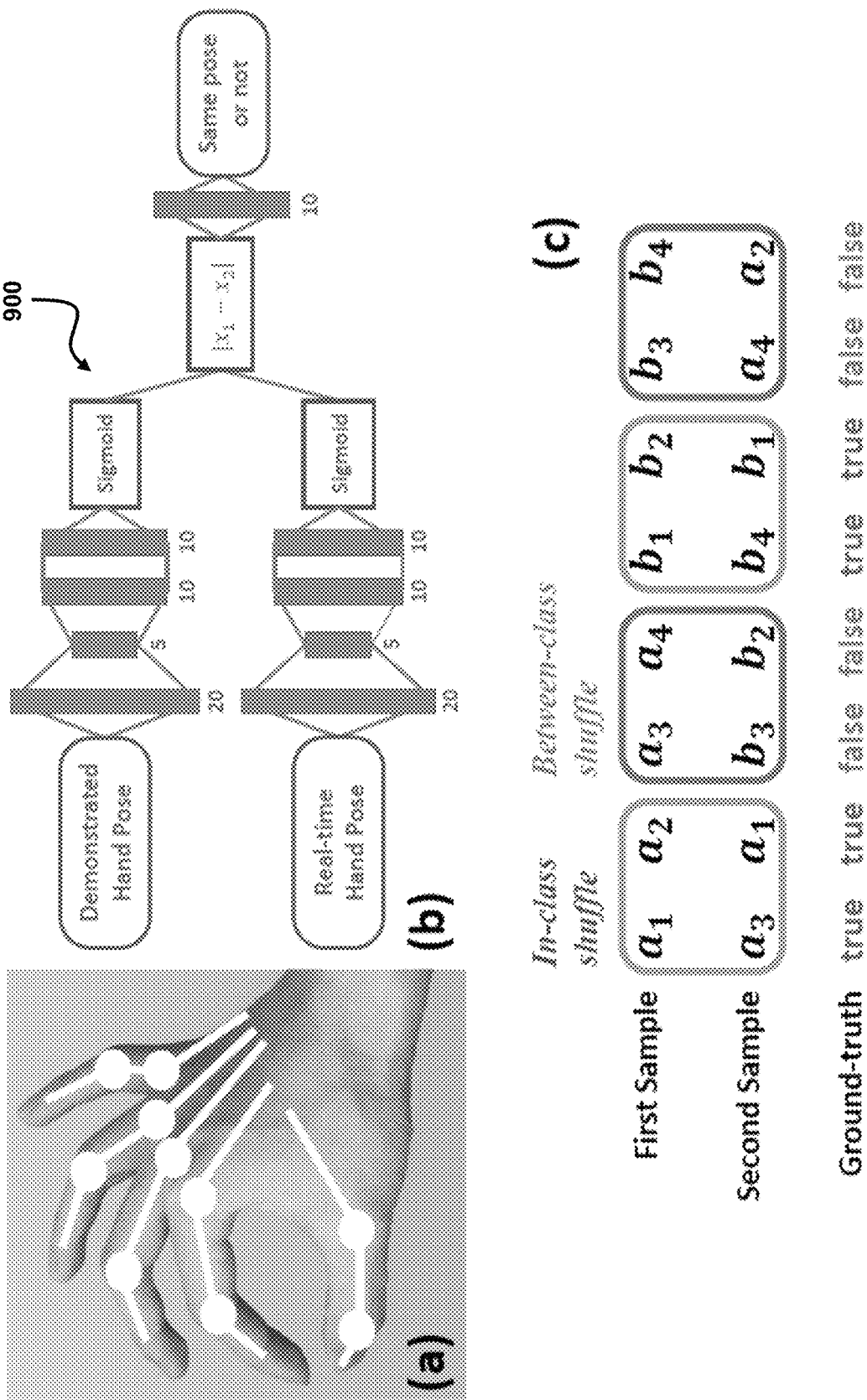
FIG. 9 shows the hand pose detection algorithm used by the AR application authoring system.

While the overall hand position is easy to track, the hand pose is flexible and versatile. Therefore, in at least some embodiments, rather than a classification algorithm that can only detect limited hand poses, the processor 25 adopts the method of one-shot learning. Particularly, a Siamese neural network 900, which is a small neural network with fully connected layers, is trained to classify whether a real-time hand pose and the previously demonstrated hand pose belong to the same gesture or not. FIG. 9, illustration (b), shows a structure of the Siamese neural network 900 used by the processor 25. The top and bottom branches of the network share same structure and parameters. This network 900 compares the real-time hand pose and the previously demonstrated hand pose and returns a true or false label that indicates whether the real-time hand pose and the previously demonstrated hand pose belong to the same gesture. Due to the symmetry of hands, the Siamese neural network can be applied to either hand. As for the two hand gestures, the processor 25 processes the left-hand and right-hand poses separately. The processor 25 detects a two-hand gesture only when both hand poses are matched.

Figure 10:
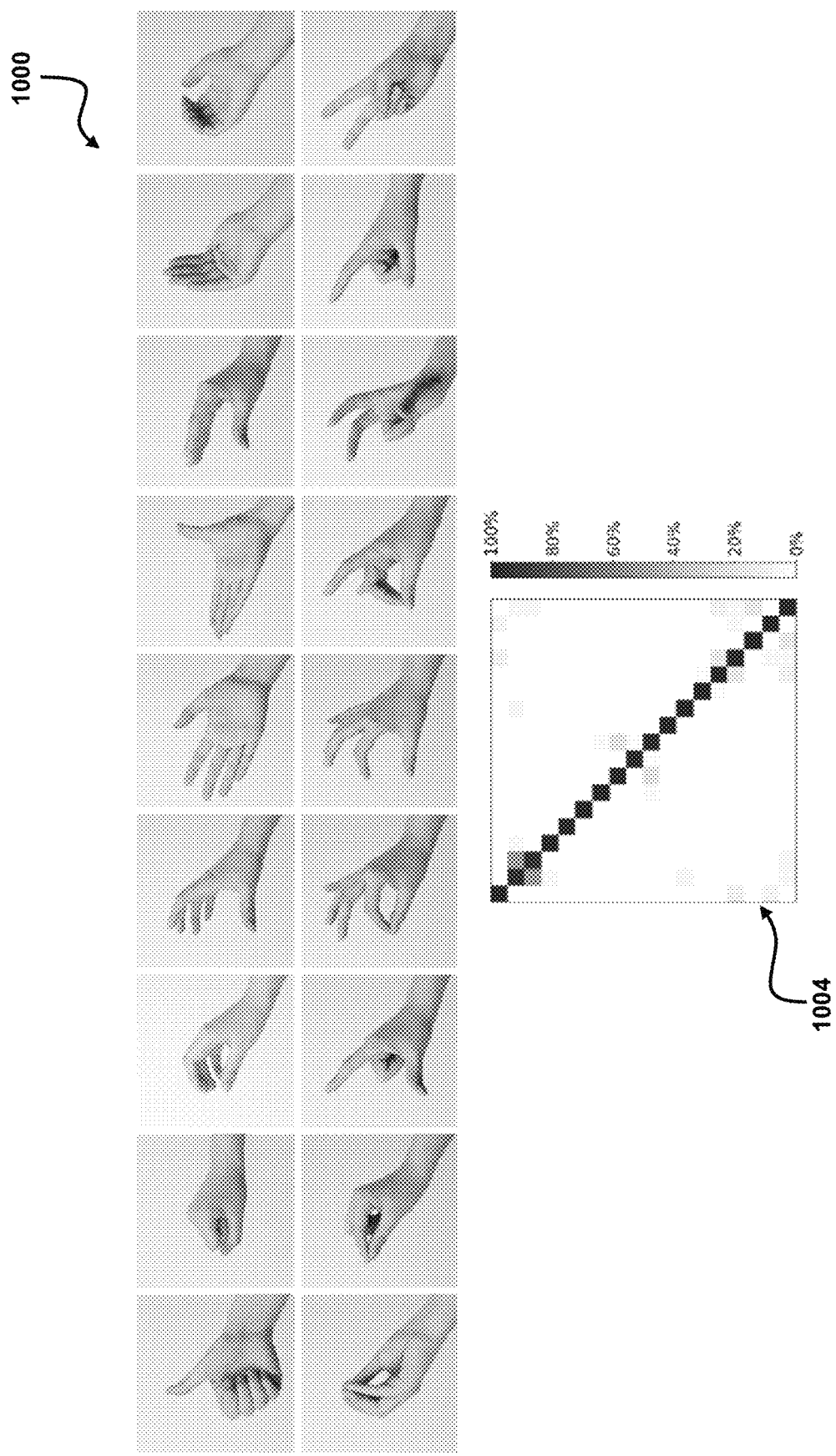
FIG. 10 shows a training dataset and performance for hand gesture detection.

In one embodiment, the Siamese neural network 900 is trained using a customized hand pose dataset 1000 with 18 classes of the hand poses, as shown in the top illustrations of FIG. 10. In the top illustrations of FIG. 10, the gestures in the upper row involve palm and whole hand, while the gestures in the lower row focus on finger-based manipulation. To train the Siamese neural network 900, pairs of samples are randomly selected from the dataset as inputs. The ground truth label is set as true if the two samples belong to the same class, and vice versa. To make sure the training data is balanced, i.e., the numbers of true pairs and false pairs in each training epoch are same, an in-class shuffle and a cross class shuffle are performed on the dataset. Particularly, illustration (c) of FIG. 9 shows a data augmentation method for training the Siamese network 900 used by the AR application authoring system 10. Particularly, $a_1$ (i=1~4) and $b_i$ (i=1~4) represent hand poses that belong to the two different classes. In each epoch, an in-class shuffle on half of the data to produce true pairs is performed and a cross-class shuffle on the other half to produce false pairs is performed. In one embodiment, the Siamese neural network 900 for one-shot hand gesture classification is trained on a local PC using PyTorch and runs on the AR system 20 through Unity Barracuda 5. The AR application authoring system 10 can achieve, for example, an accuracy of 98.56% on a validation dataset, with the result presented in a confusion matrix 1004, shown in the bottom illustration of FIG. 10. Particularly, the confusion matrix 1004 shows the accuracy achieved on the validation dataset. The shading represents the percentage of true labels among all predicted labels.

In contrast to static gestures, the processor 25 detects a dynamic gesture using changing-state method. Based on sensor data received from camera 29 and/or other sensors 30, the processor 25 records a dynamic gesture as a time series of hand status data $[f_1, f_2, \ldots, f_N]$. Each frame $f_i$ contains hand information including joint positions, palm position, moving speed, etc. It is time-consuming to directly analyze the entire time series. To distill key features from the time series, the processor 25 applies a state to describe the status of a hand at each frame. A state contains three attributes, namely the hand pose (Pose), moving direction (mDir), and palm rotation (pRot). The moving direction (mDir) and palm rotation (pRot) are evaluated with respect to the user's local coordinate systems.

Figure 8D:
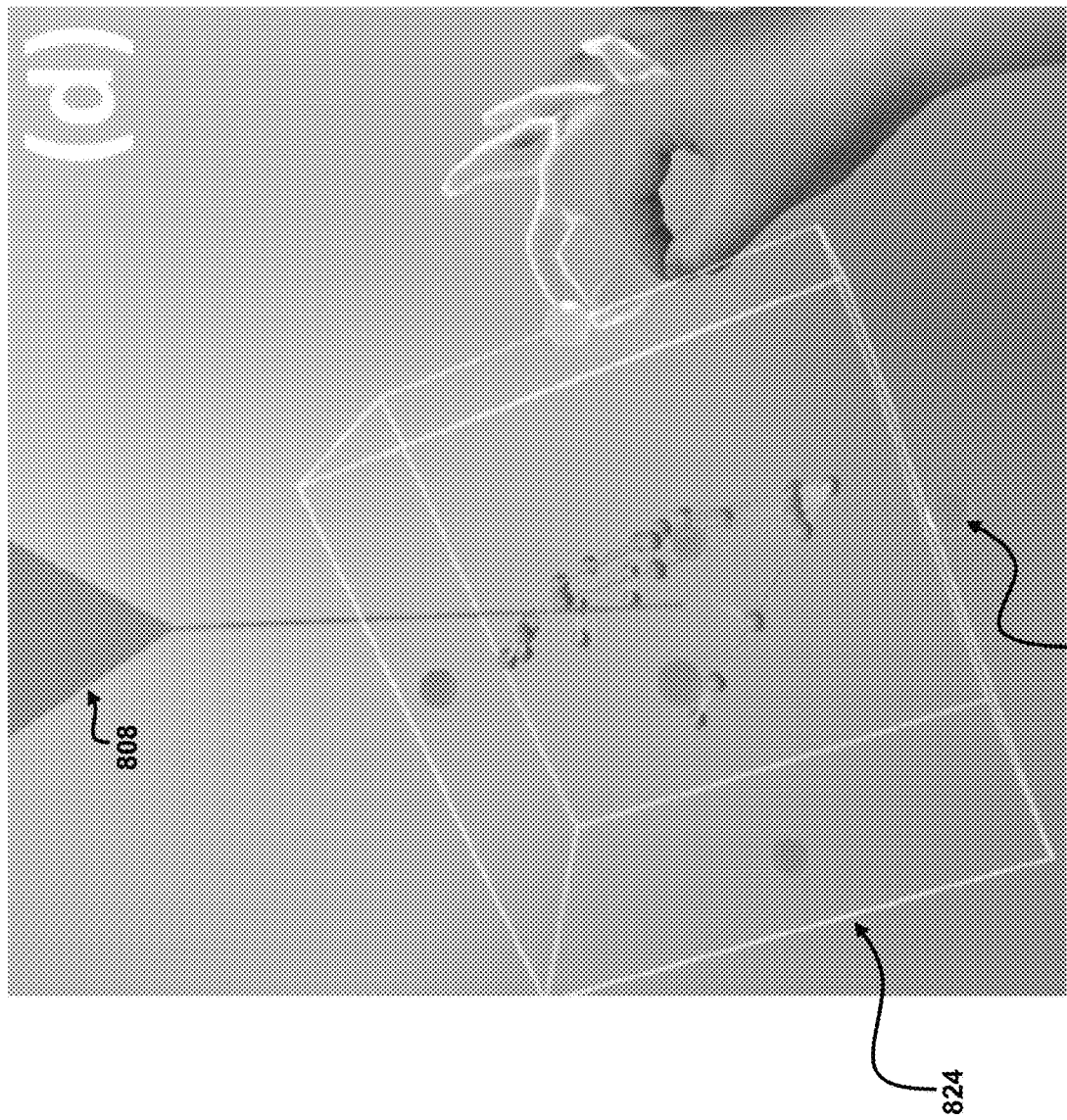

FIG. 11 shows pseudocode detailing an Algorithm 1 for calculating state series from a dynamic gesture. Typically, a dynamic gesture can be transferred into a list with two to six states. In Play Mode, the processor 25 applies a similar state encoding algorithm to the real-time hand tracking data (just change the frame $f_i$ in the for loop to the real-time data) and saves the states in a queue. To detect a dynamic gesture, the processor 25 compares the latest elements of the queue with its state list. If all the states are sequentially matched, the processor 25 determines that the user is performing that gesture. For the gestures that involve both hands, the processor 25 handles the left and right hand tracking data separately. Such gestures are detected when the state lists of both hands are matched. Additionally, to avoid false-positive detection, the processor 25 only detects a gesture when the user's hands enter the gesturing space of the authored gesture, as seen in FIG. 8D. The Algorithm 1 is advantageous compared to traditional techniques for handling the temporal and spatial information contained in a dynamic gesture, such as dynamic time warping (DTW), hidden Markov models (HMM), or neural networks, because these methods need a large amount of training data and massive computational power.

In one embodiment, the processor 25 uses text labels rather than numerical values to note the moving direction and palm rotation. Particularly, FIG. 12 shows the labels used to describe the hand movement and palm rotation. In one embodiment, as seen in FIG. 12, illustration (a-1), the hand movement is characterized by six moving directions (Up, Down, Left, Right, Forward and Backward) or Still (not moving). Additionally, as seen in FIG. 12, illustration (a-2), three labels are used to describe the rotation of the palm. The three labels include, respectively, Facing Up (i.e., the palm faces toward the user's head), Facing Down (i.e., the back of the hand faces toward the user's head), and Facing Opposite (i.e., the palm faces the other side of the body).

Further, the processor 25 uses the Siamese neural network 900 to determine whether the hand poses in two adjacent frames are in the same class. In this way, in some embodiments, the processor 25 combines the adjacent frames with same state and encodes the dynamic gesture into a shortlist of states. Particularly, FIG. 12, illustration (b), shows the process of converting a dynamic gesture into a list of states. The hand changes to a new state when any of the three attributes changes.

Figure 13:
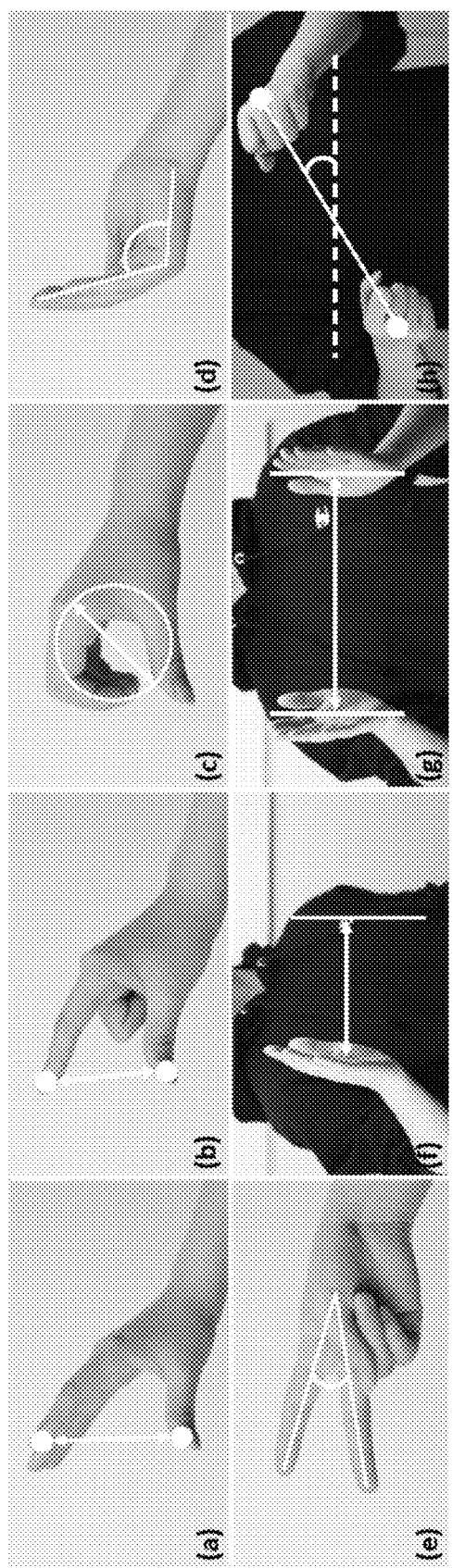
FIG. 13 shows a process for temporal and spatial mapping of a in synchronous interaction.

FIG. 13 shows a process for temporal and spatial mapping of a synchronous interaction. Particularly, to achieve the synchronization between a dynamic gesture and a virtual content animation in a synchronous interaction, the processor 25 first extracts a numeric key value, such as the distance between hands or the angle between fingers, from the dynamic gesture. Next, the processor 25 maps the key value to the progress of the animation to achieve temporal and spatial correlation between the hands and the virtual contents. Considering the type of hand gestures, the processor 25 determines the numeric key value in different ways. For instance, in the example of FIG. 13, illustrations at (a) and (b), the pinching and clamping gestures are mapped to fingertip distances. In the example of FIG. 13, illustration (c), the holding and grasping gesture are mapped to a circle formed by the hand. In the example of FIG. 13, illustrations (d) and (e), some gestures that involve finger bending are mapped to the bending angles. In the example of FIG. 13, illustration (f), the gestures that involve hand movement are mapped to the moving distance. In the example of FIG. 13, illustrations (g) and (h), the two hand gestures are mapped to the distance or angle between the hands. In the Authoring Mode, after the user has demonstrated a dynamic gesture in a synchronous interaction, the gesture is classified into one of the types mentioned above using the changing-state method, and the corresponding key value is extracted.

Exemplary Interactive AR Applications

Figure 14A:
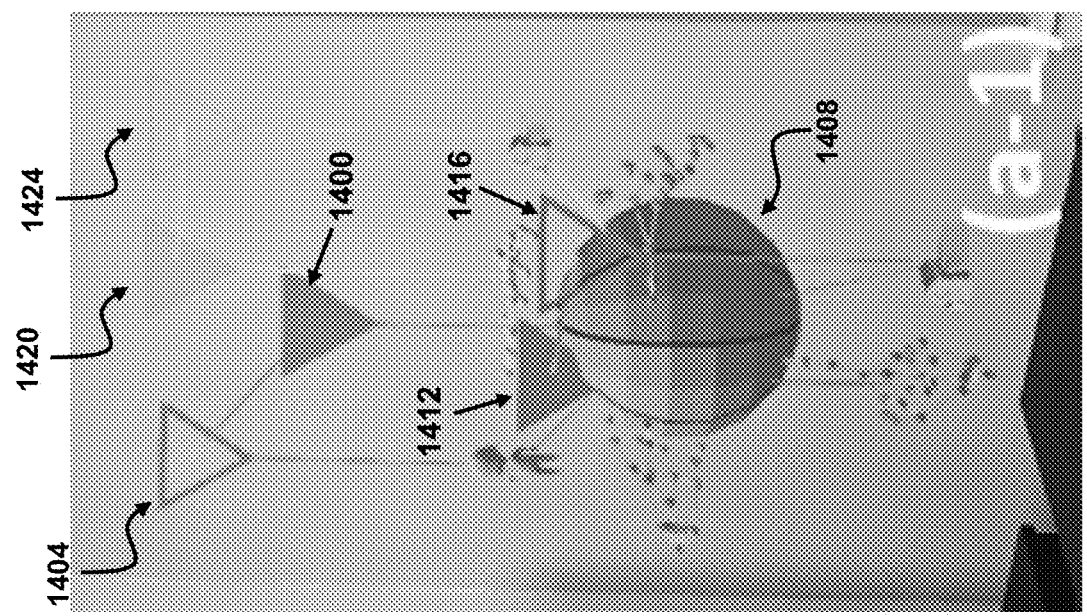
FIGS. 14A-B show a first exemplary freehand interactive AR application that incorporates realistic object manipulation.
Figure 14B:
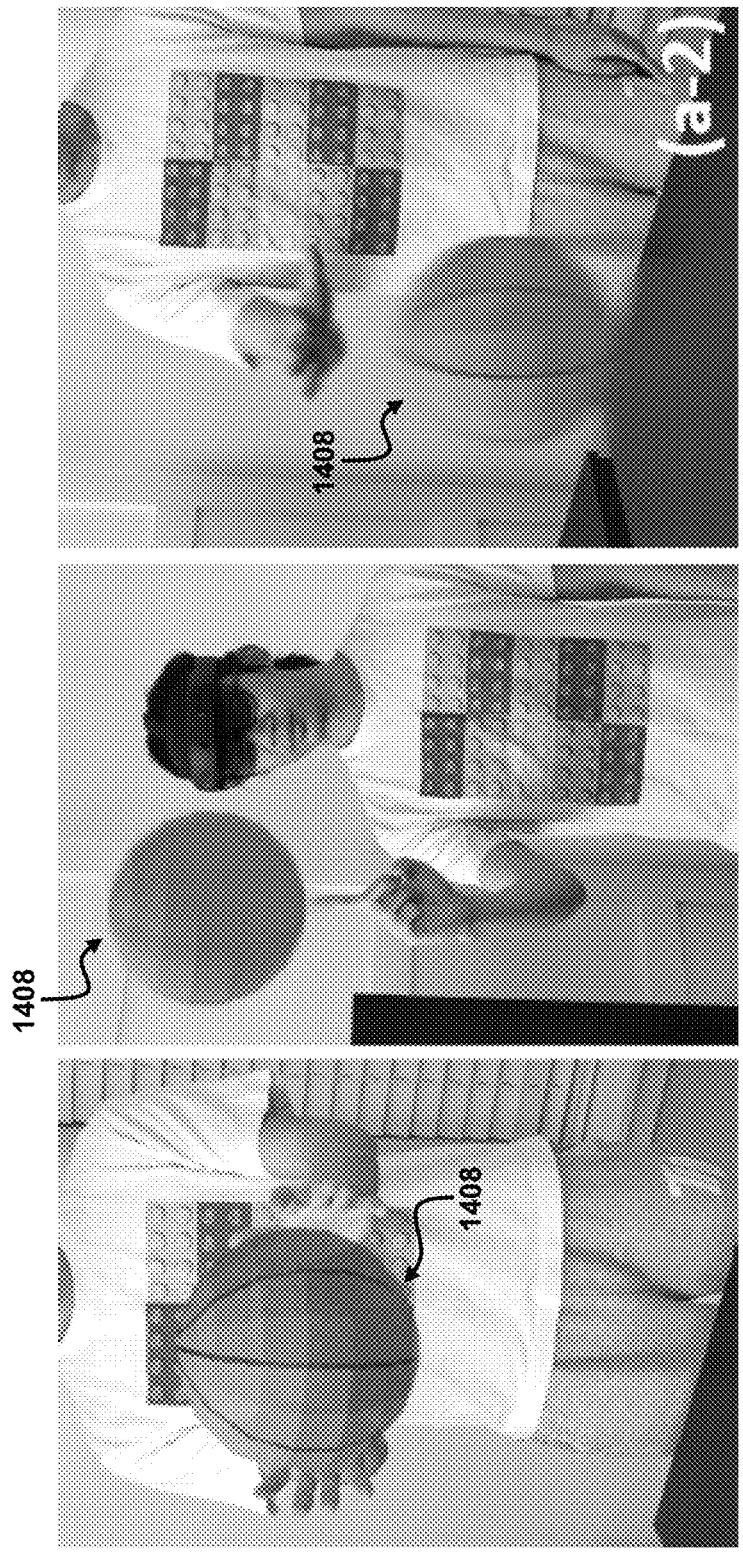

FIGS. 14A and 14B show a first exemplary freehand interactive AR application that incorporates realistic object manipulation. Particularly, many objects in real-life respond differently when hands interact with them in different ways. For instance, a basketball can be held with two hands, spun on one finger, or bounced when the user pats on it. Programming such various types of behaviors using traditional methods needs substantial effort. However, the AR application authoring system 10 enables users to simply demonstrate the hand gestures and connect them to different behaviors respectively. As shown in FIG. 14A, a user connects the two-hand 'holding' static gesture trigger 1400 with a following action 1404 of a virtual basketball 1408, a pointing gesture trigger 1412 with a 'spinning' animation action 1416, and a 'patting' dynamic gesture trigger with a 'bouncing' animation action 1420. Then, as shown in FIG. 14B, the user can interact with the virtual basketball 1408 in a similar way as real basketballs. Particularly, the user can hold the virtual basketball 1408 using both hands, spin the virtual basketball 1408 on the index finger, and dribble the virtual basketball 1408.

Figure 15A:
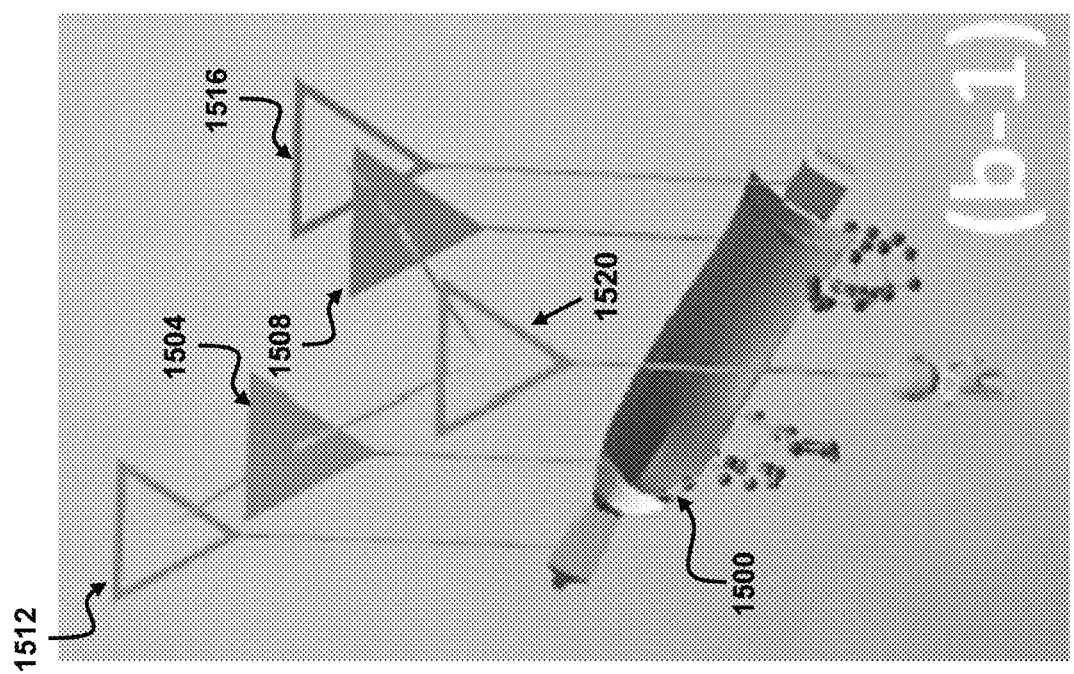
FIGS. 15A-B show a second exemplary freehand interactive AR application in which the purpose of a gesture can be intuitively inferred through its spatial property.
Figure 15B:
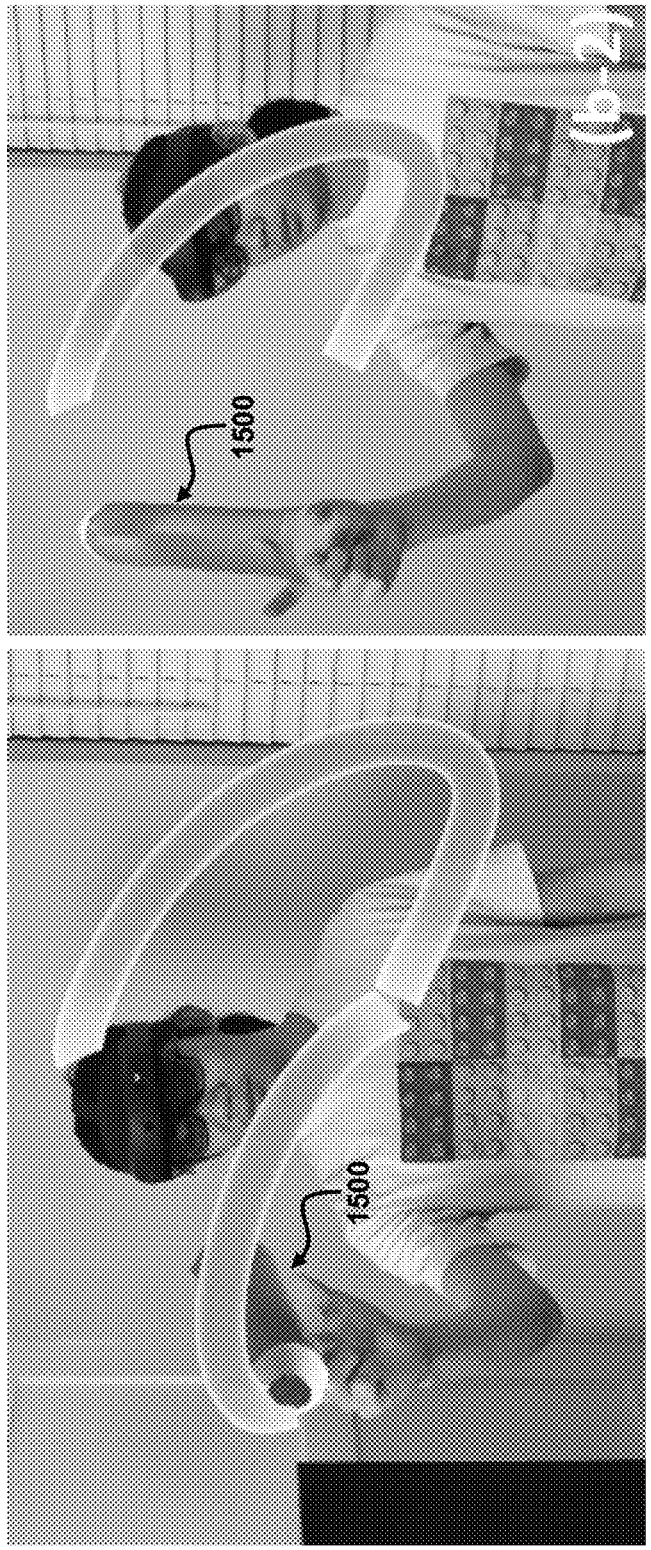

FIGS. 15A and 15B show a second exemplary freehand interactive AR application in which the purpose of a gesture can be intuitively inferred through its spatial property. In particular, holding the head of a virtual pencil 1500 enables a 'writing' functionality while holding the tail of the virtual pencil 1500 enables a 'erasing' functionality. Benefiting from in-situ visualization and spatial awareness, the AR application authoring system 10 enables the user can demonstrate a first 'holding' gesture trigger 1504 at the head of the virtual pencil 1500 and a second 'holding gesture' trigger 1508 at the tail of the virtual pencil 1500, and connect them to the 'writing' action 1512 and 'erasing' action 1516 respectively, as shown in FIG. 15A. The users also connect both gestures to a following action 1520 to let the virtual pencil 1500 follow the movement of the hand. This way, the user can either write or erase by grabbing different parts of the virtual pencil 1500, as shown in FIG. 15B. Particularly, the user can hold the tip of the virtual pencil 1500 to write, or erase a stroke when holding the bottom of the virtual pencil 1500.

Figure 16A:
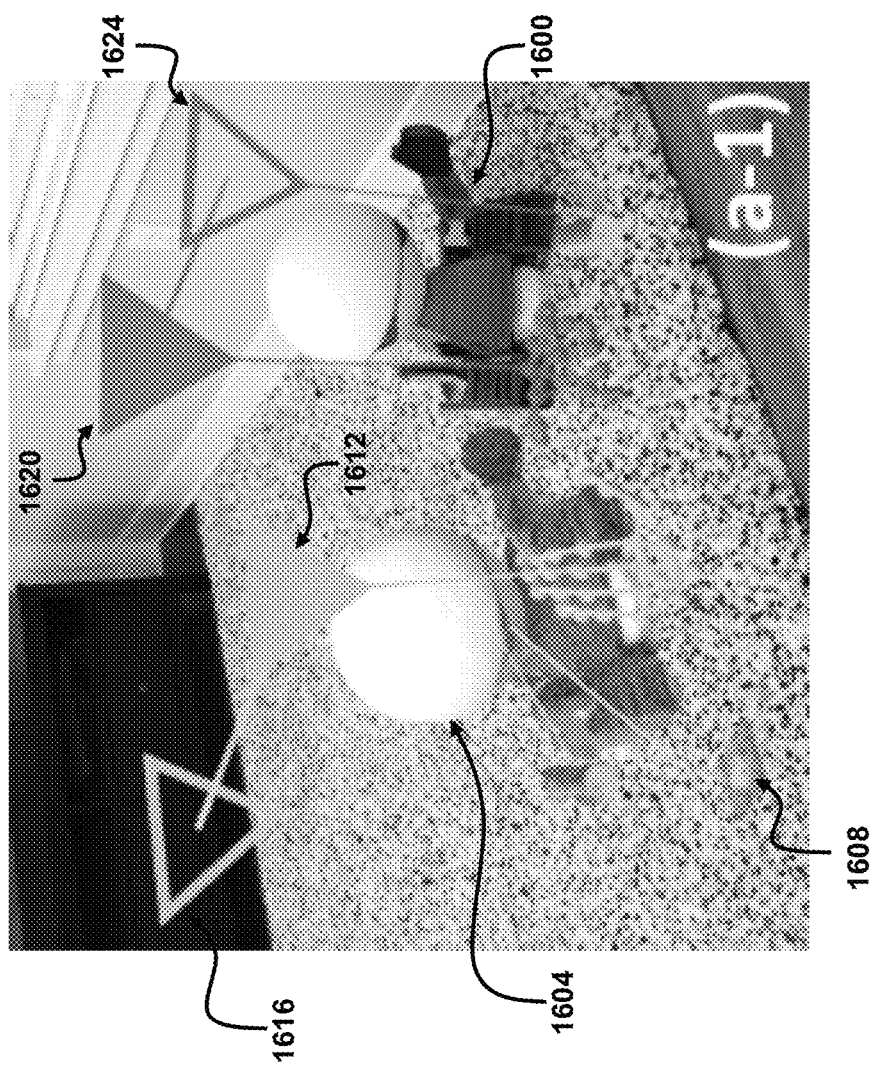
FIGS. 16A-B show a third exemplary freehand interactive AR application that incorporates interactive virtual agents and robots.
Figure 16B:

FIGS. 16A and 16B show a third exemplary freehand interactive AR application that incorporates interactive virtual agents and robots. Particularly, assistant agents and robots, such as robotic pets and virtual assistants, can enrich our daily life with their interactive behaviors. Recently, embodied gestures have been embraced as a popular modality for humans interacting with robots and virtual avatars. Meanwhile, in-situ prototyping of such experience greatly accelerates the process of interaction design for these agents. FIG. 16A illustrates the process of prototyping a virtual mobile robot using the AR application authoring system 10. The user first scans a mock-up robot 1600 as a virtual robot 1604. As shown in FIG. 16A, to better simulate the moving behavior of the virtual robot 1604, the user adds a planar joint 1608 to constrain the virtual robot 1604 to the ground. A "come" dynamic gesture trigger 1612 is connected to a "moving" animation action 1616 to form a dynamic-provoking interaction, while a "pointing" dynamic gesture trigger 1620 is demonstrated in relation to a "rotation" animation action 1624 to form a synchronous interaction. This way, the user can either call the robot to come or let it dance by following the hand movement. Particularly, as shown in FIG. 16B, the toy robot can move towards the user after the user does a "come" gesture and rotates synchronously with the user's "pointing" hand command.

Figure 17A:
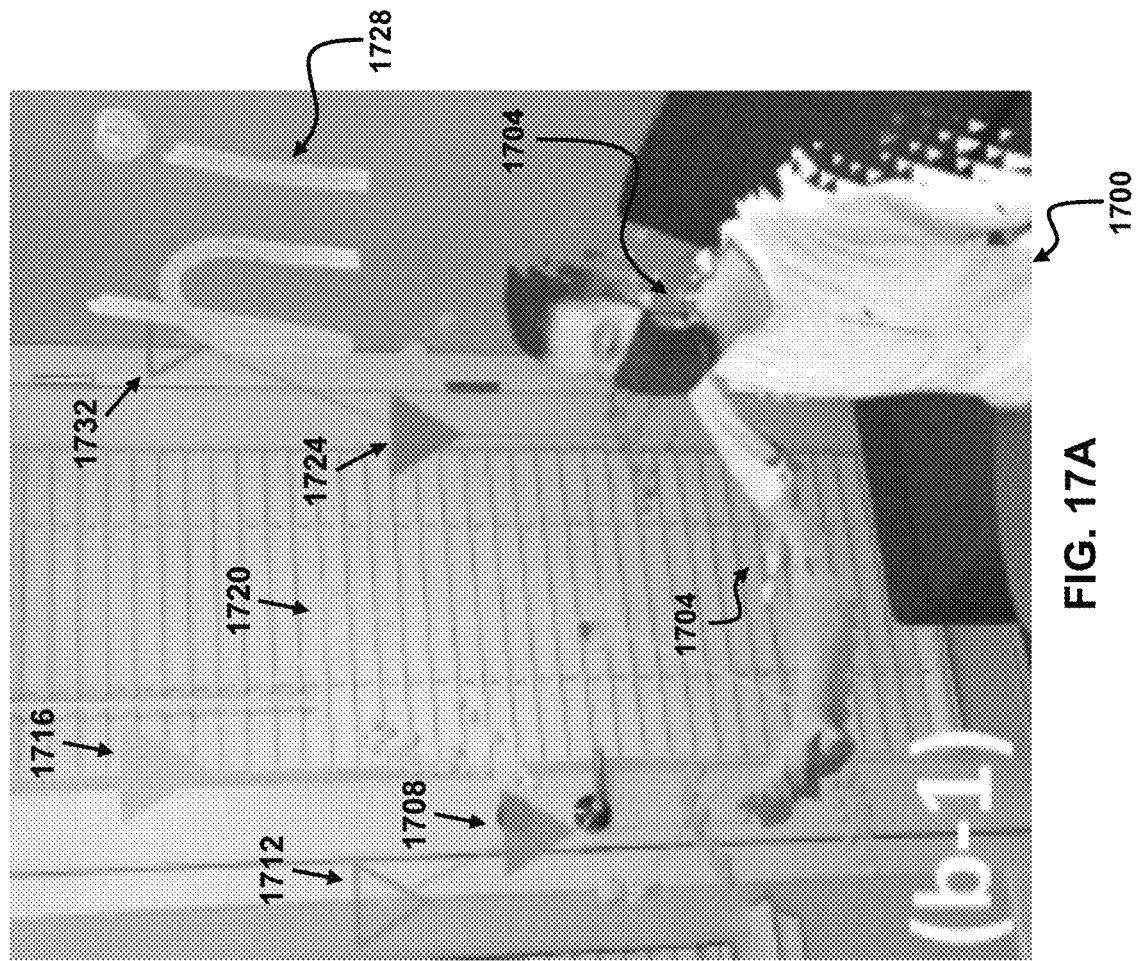
FIGS. 17A-B show a fourth exemplary freehand interactive AR application in which the user plans to prototype a virtual avatar.
Figure 17B:
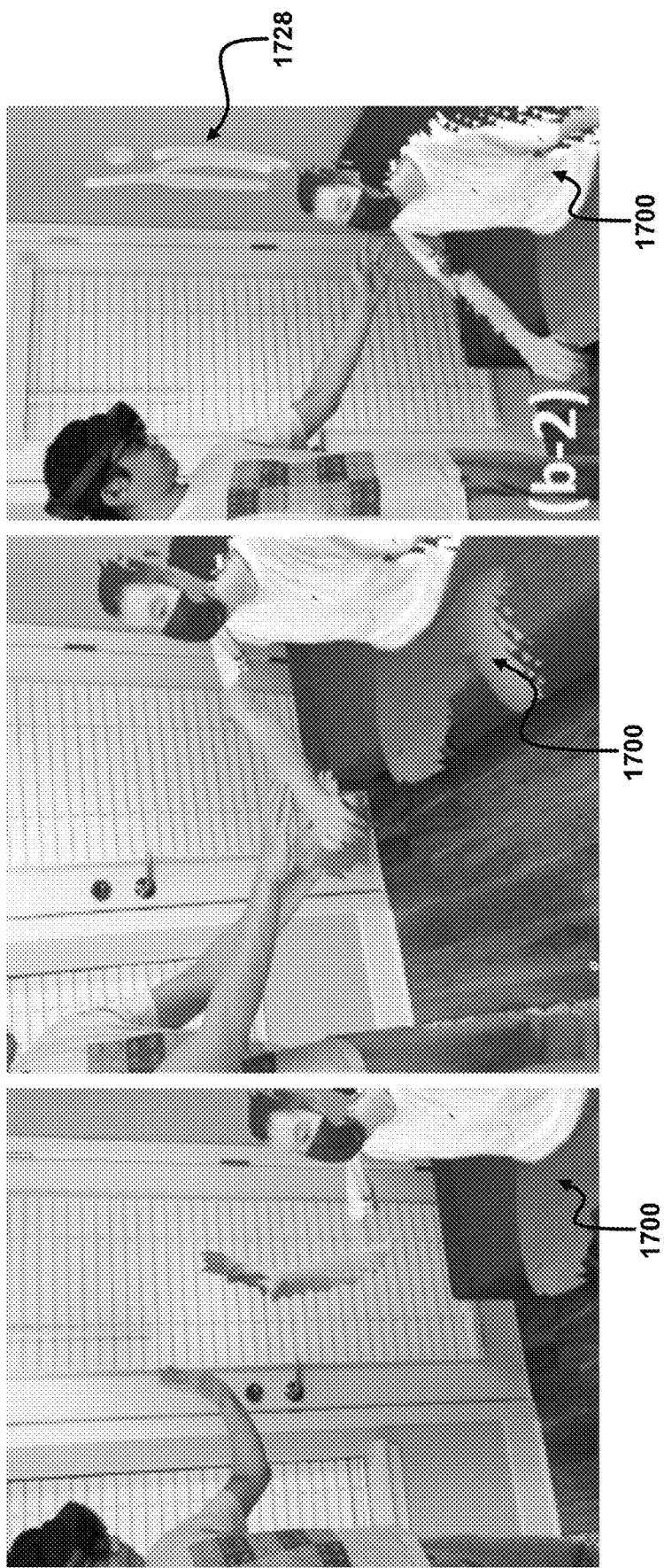

FIGS. 17A and 17B show a fourth exemplary freehand interactive AR application in which the user plans to prototype a virtual avatar 1700. The user can first scan one of his friends into the system. As shown in FIG. 17A, two spherical joints 1704 link the virtual avatar's body, upper, and lower arm. By setting two spherical joints at the agent's elbow and wrist, the agent's arm can move realistically. A double-handed static gesture trigger 1708 is created next to the avatar's hand and connected with a following action 1712. A "waving hand" dynamic gesture trigger 1716 is connected with a similar "waving hand" animation action 1720 of the virtual avatar 1700. An appear action 1724 is associated with sketched "Hi" virtual object 1728 and is linked with a 'patting' static gesture trigger 1732. As shown at FIG. 17B, the virtual avatar 1700 can wave the hand, shake hands with the user, and pop up a sketched "Hi" after the user pat on the agent's shoulder.

Figure 18A:
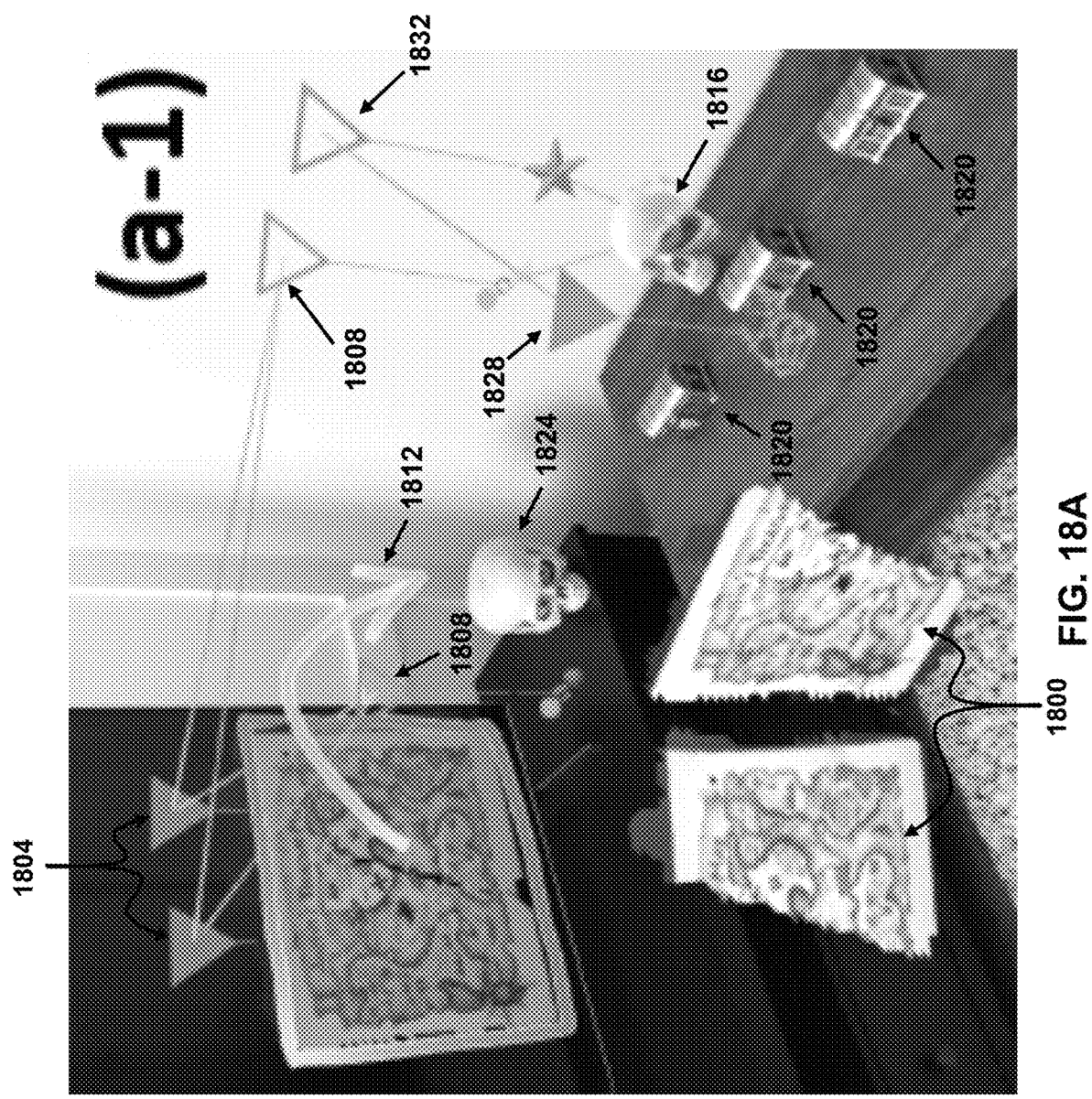
FIGS. 18A-B show a fifth exemplary freehand interactive AR application that comprises a room-level interactive AR game.
Figure 18B:
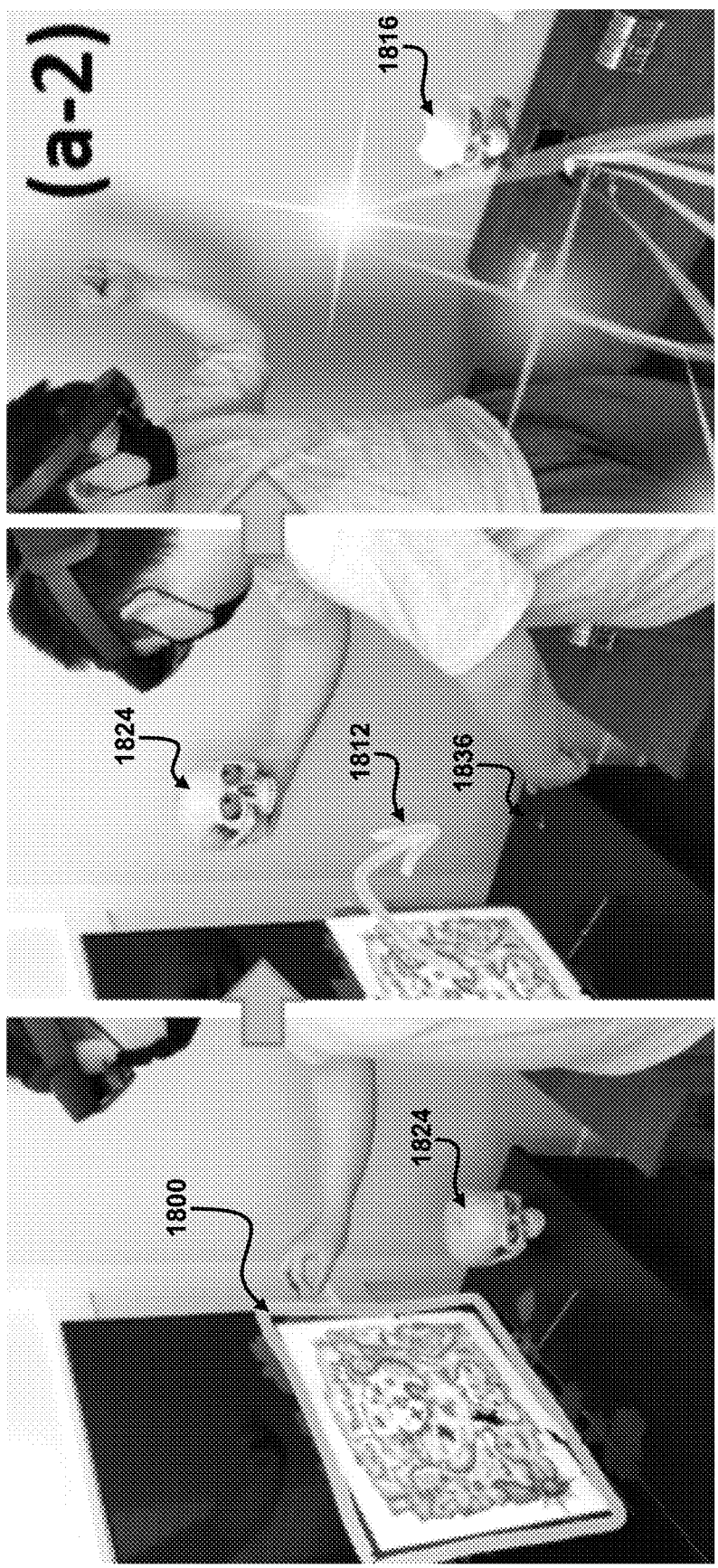

FIGS. 18A and 18B show a fifth exemplary freehand interactive AR application that comprises a room-level interactive AR game. Particularly, besides focusing on the interactions with one single object, a broader application scenario is to make an augmented and interactive living space. For instance, the interactive AR gaming area has witnessed a flourishing development in recent years. With the AR application authoring system 10, the capability of in-situ authoring and object scanning allows end-users to create in-door AR games that exploit the blend of the physical and virtual contexts. In the illustrated example, the user plans to create a treasure hunt game for the guests using some pirate-themed objects he has. A shown in FIG. 18A, two positional triggers 1804 of the scanned map pieces 1800 are connected to two appear actions 1808 of a virtual arrow 1812 and a scanned virtual skull 1816, respectively. Particularly, the user first finds scans a treasure map into two parts 1800 together with a skull 1824. He then places three locked treasure boxes 1820 with only one with treasure on the table and hides the key under the physical skull 1824. Then, the user places the position triggers 1804 within a sketched frame and sketches the virtual arrow 1812 physically pointing to the real skull 1824 as a visual hint for the keys hidden beneath the skull 1824. Meanwhile, the user places the virtual skull 1816 above the correct treasure box 1820 and uses it as the object to attach an 'open' gesture trigger 1828 connected with a 'sparkle' animation action 1832. Throughout the entire authoring process, the AR application authoring system 10 empowers the user to seamlessly interweave the virtual and physical world to rapidly create an immersive AR game. When the guests come, one would enter the Play Mode, and follow the visual hint scattered in the room to find the treasure. A shown in FIG. 18B, the player first restores the broken treasure map 1800, then finds the hidden key 1836 along the virtual arrow 1812, he opens the correct treasure box 1820, and a sparkle animation shows up.

Figure 19A:
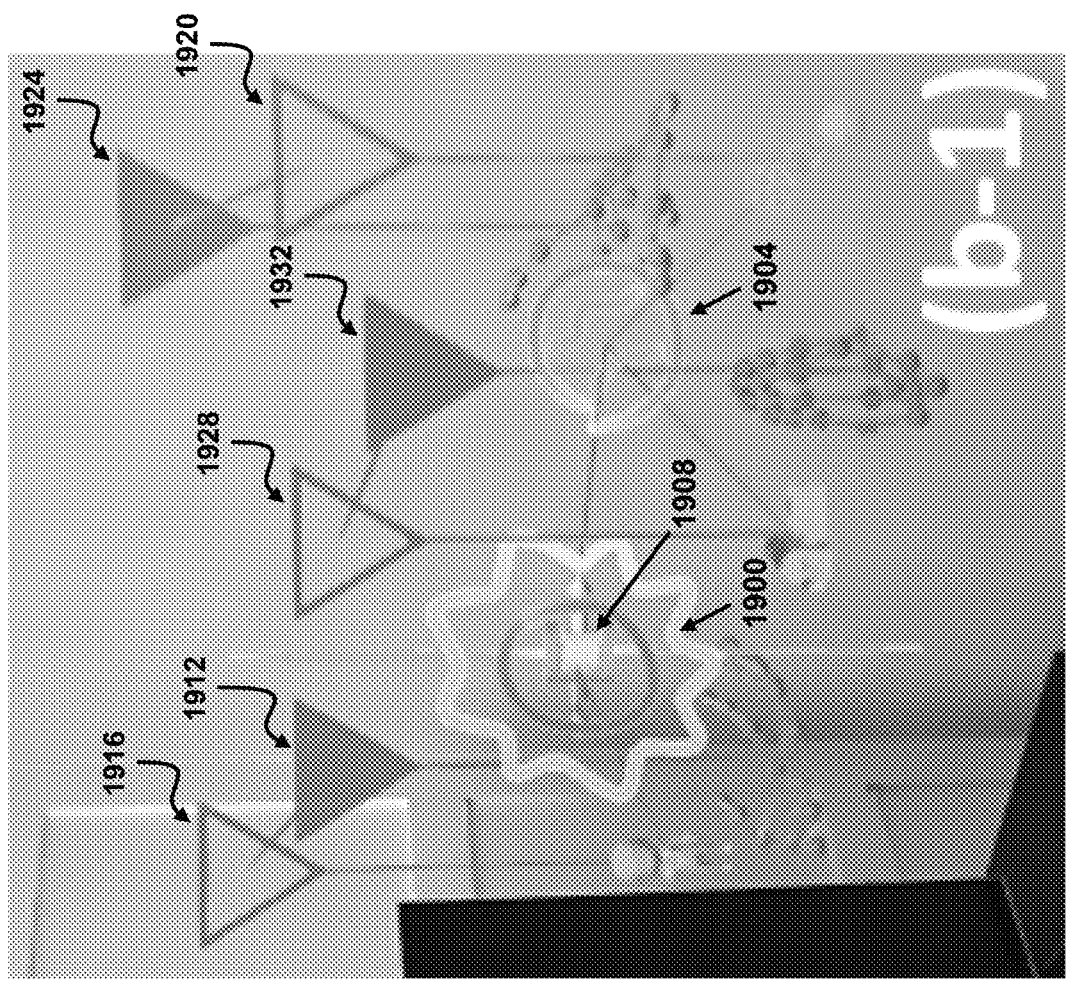
FIGS. 19A-B show a sixth exemplary freehand interactive AR application that incorporates an embodied AR presentation.
Figure 19B:
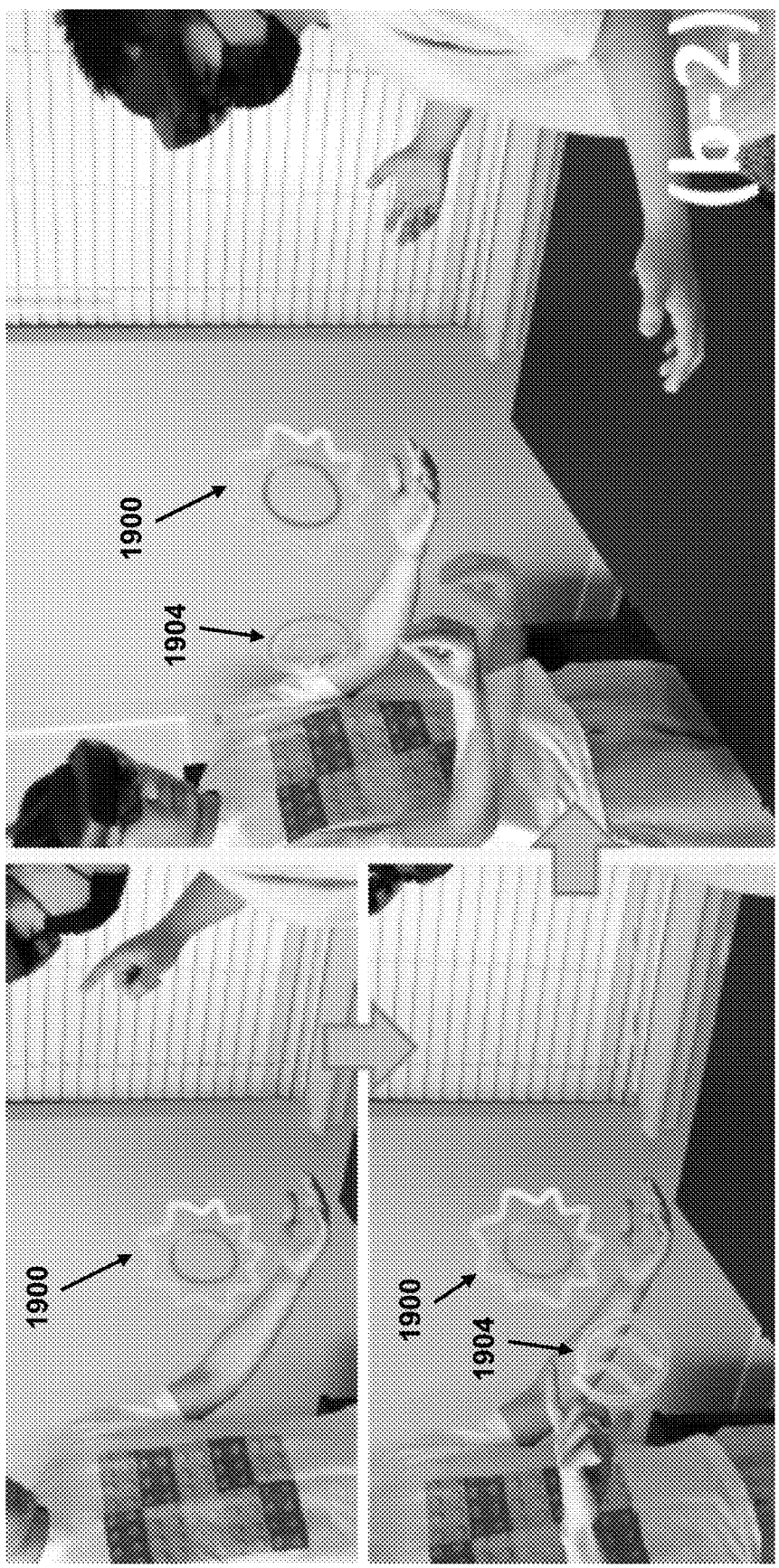

FIGS. 19A and 19B show a sixth exemplary freehand interactive AR application that incorporates an embodied AR presentation. Particularly, performing hand gestures during conversations is a common practice. Yet, plain hand gestures only convey limited information due to the lack of expressiveness. The AR application authoring system 10 improves the efficiency in thought delivery by incorporating embodied hand gestures with in-situ visual representations of dynamic 3D assets and animations in AR. Further, the sketching function enables an immediate and seamless creation of the desired 3D contents for the conversation. Embodied AR presentation is one typical application of the AR application authoring system 10. In the illustrated example, a presenter authors an earth-sun animation to explain the Heliocentric theory. As shown in FIG. 19A, a hinge joint 1908 is connected between the sketched sun 1900 and the sketched earth 1904. A manipulating interaction is implemented on the sun model with a static holding gesture trigger 1912 and a following action 1916. An appear action 1920 is connected with a static gesture trigger 1924 located next to the earth 1904. A "rotation" animation action 1928 of the earth 1904 is linked with a "pinch rotate" dynamic gesture trigger 1932. As shown in FIG. 19B, during the AR presentation, the presenter first talks about the sun while holding it in front of the listener, then reveals the earth with a "touching" gesture. Finally, by performing a "pinch rotation" dynamic gesture, the earth model starts to rotate about the sun to illustrate the theory vividly. From the listener's perspective, the augmented hand gestures clearly explain the ambiguous concept with the help of the in-situ visual representations. Similarly, the AR application authoring system 10 can also be utilized in scenarios such as investor pitches, educational lectures, storytelling, etc.

Figure 20:
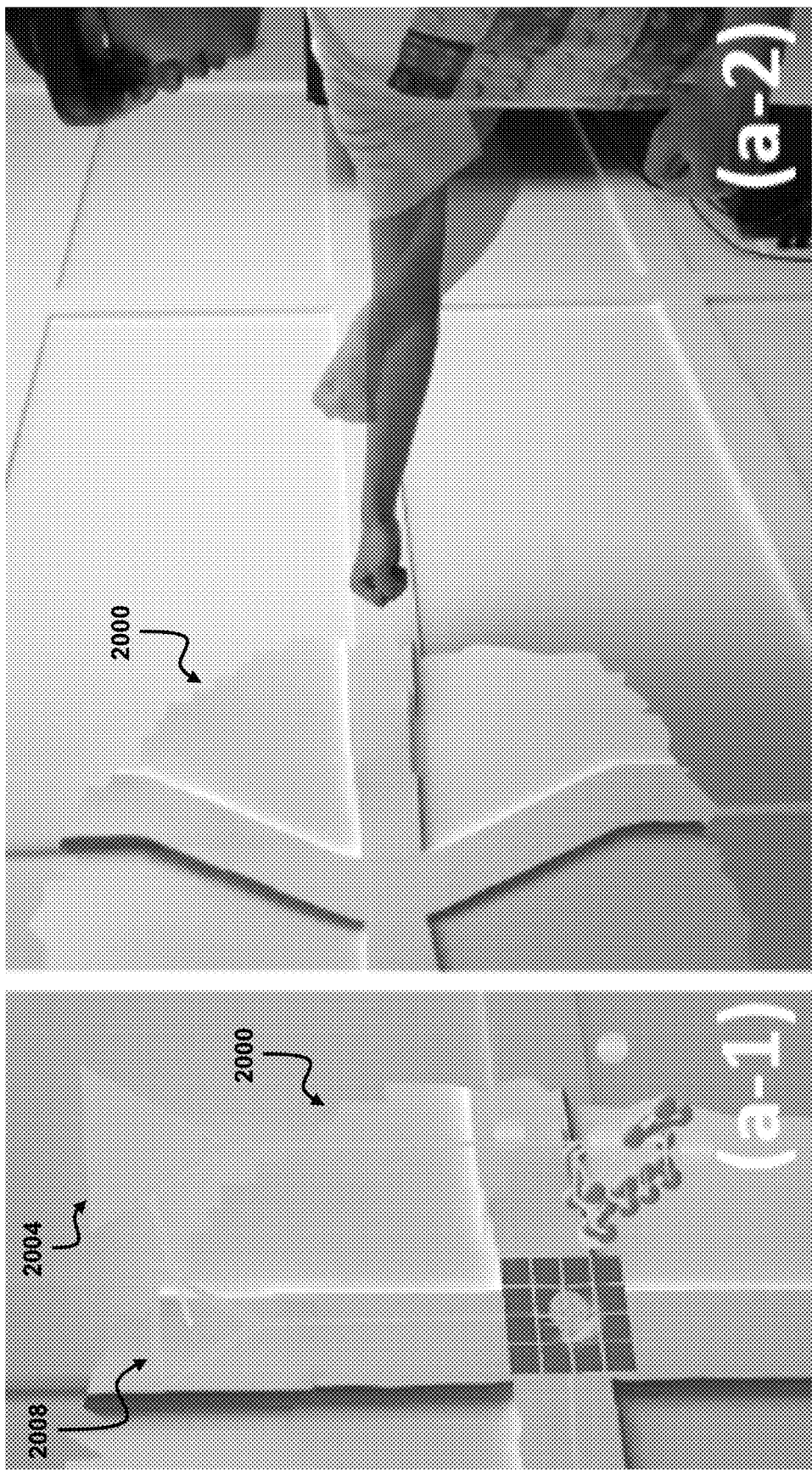
FIG. 20 shows a seventh exemplary freehand interactive AR application that incorporates entertaining embodied hand gestures.

FIG. 20 shows a seventh exemplary freehand interactive AR application that incorporates entertaining embodied hand gestures. Particularly, the AR application authoring system 10 supports the ubiquitous perception of users' spatial and hand gesture information so that end-users can entertain the daily life with their imagination. Leveraging real-time hand gesture detection, users can perform various predefined gestures to trigger entertaining virtual elements or fancy visual effects. For instance, as shown in FIG. 20, a user scans a portion of his wall to create a virtual wall object 2000. Next, the user connects a punching gesture trigger 2004 with a mesh deformation action 2008. Thus, the user can break the room's wall virtually by performing a punching gesture towards the virtual wall object 2000 to trigger the mesh deform action.

Figure 21:
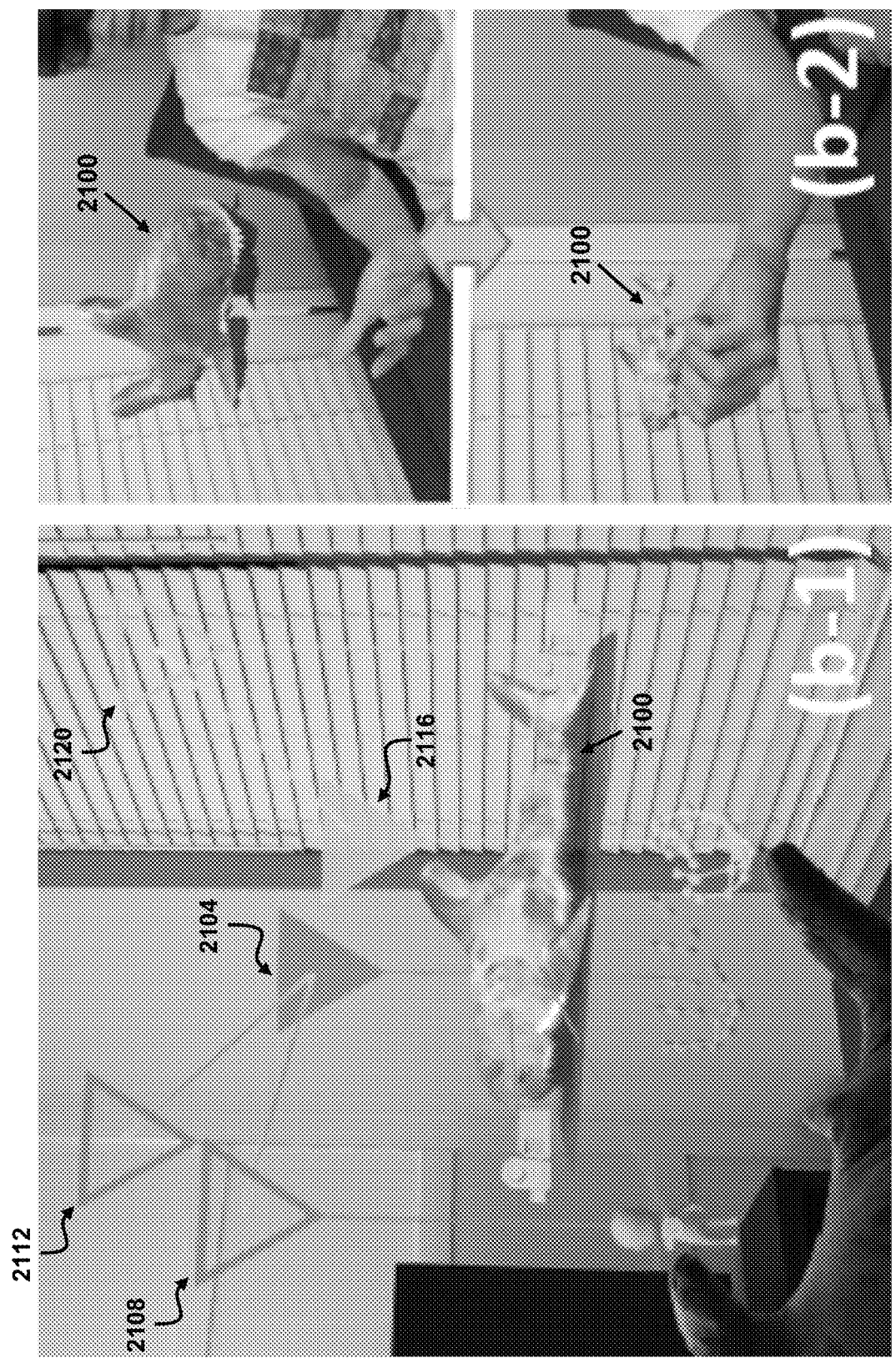
FIG. 21 shows an eighth exemplary freehand interactive AR application in which the user can create a virtual shark.

FIG. 21 shows an eighth exemplary freehand interactive AR application in which the user can create a virtual shark 2100. Particularly, as shown in FIG. 21, a 'supporting' dynamic gesture trigger 2104 connects to a following action 2108 and a 'swimming' animation action 2112 of the scanned shark 2100. A 'grabbing' dynamic gesture 2116 is demonstrated in relation to a 'scaling' animation action 2120 and connected therewith to form a synchronous interaction. So, the user can open and close his hand to control the size of the shark 2100. Further, the user authors a 'swim' animation, so that the toy shark 2100 can be shown above the user's hand and starts to swim.

Figure 22:
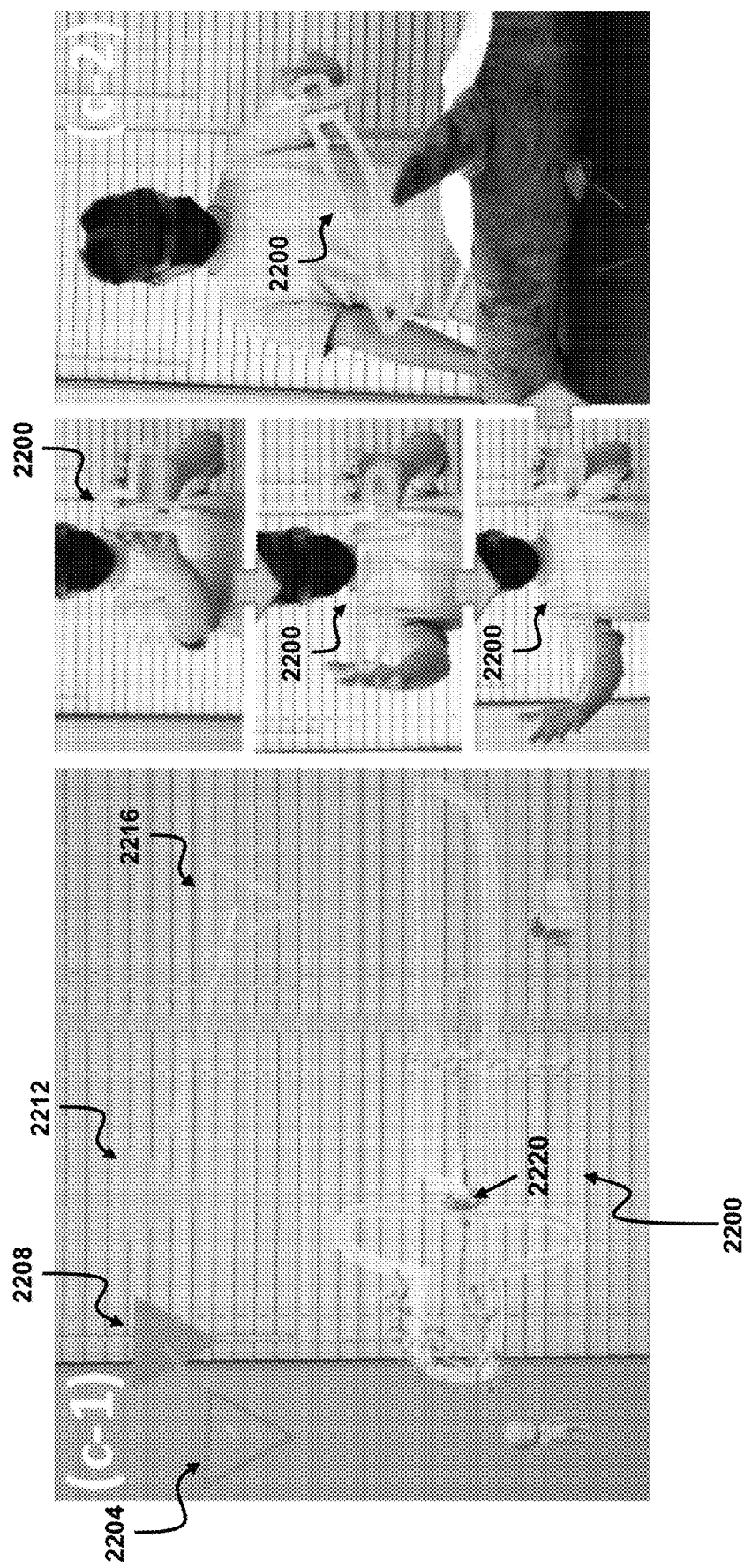
FIG. 22 shows a ninth exemplary freehand interactive AR application in which the user authors a light sword with an adjustable blade.

FIG. 22 shows a ninth exemplary freehand interactive AR application in which the user authors a light sword 2200 with an adjustable blade. The handle of the sword 2200 is connected to the blade of the sword with a fixed joint 2220. The handle of the sword 2200 can be held by the user with a manipulating interaction. To this end, as shown in illustration (c-1) of FIG. 22, a following action 2204 is connected to a 'holding' static gesture trigger 2208. Meanwhile, the user authors a synchronous interaction to the sketched blade of the sword 2200 to change the length using a double-handed dynamic gesture trigger 2212 demonstrated in relation to a blade elongation animation action 2216 and connected therewith. Therefore, as shown in illustration (c-2) of FIG. 22, when the user holds the handle of the sword 2200 and starts to move the other hand away, the blade of the sword 2200 is elongated. After that, the user can withdraw the sword by performing the double-handed dynamic gesture reversely.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for authoring an augmented reality (AR) application, the method comprising:
 defining, with a processor, a user-defined hand gesture by recording a demonstration of a pose of a hand or a sequence of poses of the hand by a user in an environment with at least one sensor, the user-defined hand gesture being characterized by three-dimensional positions and orientations of joints of the hand during the demonstration;
 displaying, on a display, an AR graphical user interface including, superimposed on the environment, (i) a virtual object and (ii) a virtual hand demonstrating the previously defined user-defined hand gesture;
 defining, with the processor, based on user inputs received from the user, an association between the user-defined hand gesture with an animation or a manipulation of the virtual object to be displayed in response to or synchronously with a future performance of the user-defined hand gesture; and
 displaying, in the AR graphical user interface on the display, after defining the association, the animation or the manipulation of the virtual object in response to or synchronously with detecting a real-time performance of the user-defined hand gesture.

2. The method according to claim 1 further comprising: generating the virtual object by scanning a real-world object using at least one sensor.

3. The method according to claim 2, the scanning further comprising:
 detecting a position of the hand of the user near the real-world object; and
 scanning portions of the real-world object near the hand of the user.

4. The method according to claim 1 further comprising:

generating the virtual object by tracking the hand of the user as the user sketches a drawing mid-air in the environment.

5. The method according to claim 1 further comprising:
generating the virtual object by importing a three-dimensional model.

6. The method according to claim 1 further comprising:
generating a virtual object by joining two further virtual objects with a virtual joint, the virtual joint defining a mechanical constraint between the two further virtual objects.

7. The method according to claim 1, the defining the user-defined hand gesture further comprising:
detecting that the hand of the user has remained still during the demonstration for a threshold amount of time; and
defining a static hand gesture as the pose of the hand of the user with which the hand remained still for the threshold amount of time.

8. The method according to claim 1, the defining the user-defined hand gesture further comprising:
detecting that the hand of the user has remained still during the demonstration for a threshold amount of time; and
defining a dynamic hand gesture as the sequence of poses of the hand performed during a period of time prior to the hand remaining still for the threshold amount of time.

9. The method according to claim 1 further comprising:
defining, with the processor, the animation of the virtual object based on user inputs received from the user that manipulate the virtual object.

10. The method according to claim 9, the defining the user-defined hand gesture further comprising:
displaying, in the AR graphical user interface on the display, the animation of the virtual object;
recording the demonstration of the sequence of poses of the user during the displaying of the animation of the virtual object; and
defining a dynamic hand gesture as the sequence of poses of the hand over time in relation to a progression of the animation of the virtual object over time.

11. The method according to claim 1, the associating further comprising:
selecting the user-defined hand gesture based on user inputs received from the user; and
selecting the animation or the manipulation of the virtual object.

12. The method according to claim 1, the associating further comprising:
defining, based on user inputs received from the user, a region of the environment at which the user-defined hand gesture must occur to trigger the animation or the manipulation of the virtual object to be displayed.

13. The method according to claim 12, the displaying the animation or the manipulation of the virtual object further comprising:
displaying, in the AR graphical user interface on the display, the animation or the manipulation of the virtual object in response to or synchronously with detecting the real-time performance of the user-defined hand gesture in the defined region.

14. The method according to claim 1, the displaying the animation or the manipulation of the virtual object further comprising:
providing a triggering signal in response to detecting the real-time performance of the user-defined hand gesture in which the hand of the user has a defined static pose; and
displaying, in the AR graphical user interface on the display, the animation or the manipulation of the virtual object in response to the triggering signal.

15. The method according to claim 1, the displaying the animation or the manipulation of the virtual object further comprising:
providing a triggering signal in response to detecting the real-time performance of the user-defined hand gesture in which the hand of the user has a defined dynamic sequence of poses over time; and
displaying, in the AR graphical user interface on the display, the animation or the manipulation of the virtual object in response to the triggering signal.

16. The method according to claim 1, the displaying the animation or the manipulation of the virtual object further comprising:
detecting the real-time performance of the user-defined hand gesture in which the hand of the user has a defined static pose;
determining a value indicating a transformation of the hand of the user while the hand of the user maintains the defined static pose; and
displaying, in the AR graphical user interface on the display, the animation or the manipulation of the virtual object such that the virtual object maintains a constant pose relative to the hand of the user.

17. The method according to claim 1, the displaying the animation or the manipulation of the virtual object further comprising:
detecting the real-time performance of the user-defined hand gesture in which the hand of the user has a defined dynamic sequence of poses over time;
determining a value indicating a progression of the hand through the defined dynamic sequence of poses; and
displaying, in the AR graphical user interface on the display, the animation or the manipulation of the virtual object such that it progresses synchronously with the progression of the hand through defined dynamic sequence of poses, based on the value.

18. The method according to claim 1, the detecting the real-time performance of the user-defined hand gesture further comprising:
comparing a real-time hand pose of the real-time performance with a demonstrated hand pose of the demonstration using a Siamese neural network.

19. The method according to claim 1, the detecting the real-time performance of the user-defined hand gesture further comprising:
determining a sequence of real-time hand states of the real-time performance; and
comparing the sequence of real-time hand states with a sequence of demonstrated hand states of the demonstration.

20. An augmented reality device for authoring an augmented reality (AR) application, augmented reality device comprising:
a memory;
a display screen configured to display an AR graphical user interface;
at least one sensor configured to measure sensor data; and
a processor operably connected to the memory, the display screen, and the at least one sensor, the processor being configured to:

define, and store in the memory, a user-defined hand gesture by operating at least one sensor to record a demonstration of a pose of a hand or a sequence of poses of the hand by a user in an environment, the user-defined hand gesture being characterized by three-dimensional positions and orientations of joints of the hand during the demonstration;

operate the display screen to display, in the AR graphical user interface, (i) a virtual object and (ii) a virtual hand demonstrating the previously defined user-defined hand gesture;

define, and store in the memory, based on user inputs received from the user, an association between the user-defined hand gesture and an animation or a manipulation of the virtual object to be displayed in response to or synchronously with a future performance of the user-defined hand gesture; and operate the display screen to display, in the AR graphical user interface, after defining the association, the animation or the manipulation of the virtual object in response to or synchronously with detecting a real-time performance of the user-defined hand gesture.

* * * * *